(12) United States Patent
Fullerton et al.

(10) Patent No.: US 8,760,250 B2
(45) Date of Patent: Jun. 24, 2014

(54) SYSTEM AND METHOD FOR ENERGY GENERATION

(75) Inventors: Larry W. Fullerton, New Hope, AL (US); Mark D. Roberts, Huntsville, AL (US); James L. Richards, Fayetteville, TN (US)

(73) Assignee: Correlated Magnetics Rsearch, LLC., New Hope, AL (US)

( * ) Notice: Subject to any disclaimer, the term of this patent is extended or adjusted under 35 U.S.C. 154(b) by 0 days.

(21) Appl. No.: 12/895,589

(22) Filed: Sep. 30, 2010

(65) Prior Publication Data
US 2011/0031839 A1 Feb. 10, 2011
Related U.S. Application Data

(63) Continuation-in-part of application No. 12/476,952, filed on Jun. 2, 2009, now Pat. No. 8,179,219, and a continuation-in-part of application No. 12/885,450, filed on Sep. 18, 2010, now Pat. No. 7,982,568.

(60) Provisional application No. 61/277,900, filed on Sep. 30, 2009, provisional application No. 61/278,767, filed on Oct. 9, 2009, provisional application No. 61/279,094, filed on Oct. 16, 2009, provisional application No. 61/281,160, filed on Nov. 13, 2009, provisional application No. 61/283,780, filed on Dec. 9, 2009, provisional application No. 61/284,385, filed on Dec. 17, 2009, provisional application No. 61/342,988, filed on Apr. 22, 2010, provisional application No. 61/277,214, filed on Sep. 22, 2009.

(51) Int. Cl.
*H01F 7/02* (2006.01)
*H01F 13/00* (2006.01)
*H02K 21/24* (2006.01)

(52) U.S. Cl.
CPC ............... *H01F 7/02* (2013.01); *H01F 7/0273* (2013.01); *H01F 13/003* (2013.01); *H02K 21/24* (2013.01)
USPC ...... 335/306; 335/284; 335/296; 310/156.32; 310/156.35; 310/268

(58) Field of Classification Search
CPC ....... H01F 7/02; H01F 7/0273; H01F 13/003; H02K 21/24
USPC ............. 310/156.01, 156.43–156.47, 156.32, 310/156.35, 268; 335/284, 296, 306
See application file for complete search history.

(56) References Cited

U.S. PATENT DOCUMENTS

| 381,968 A | 5/1888 | Tesla |
|---|---|---|
| 493,858 A | 3/1893 | Edison |

(Continued)

FOREIGN PATENT DOCUMENTS

| CN | 1615573 A | 5/2005 |
|---|---|---|
| DE | 2938782 A1 | 4/1981 |

(Continued)

OTHER PUBLICATIONS

"BNS Series-Compatible Series AES Safety Controller" pp. 1-17, http://www.schmersalusa.com/safety_controllers/drawings/aes.pdf (downloaded on or before Jan. 23, 2009).

(Continued)

*Primary Examiner* — Ramon Barrera
(74) *Attorney, Agent, or Firm* — Kaith W. Saunders; William J. Tucker

(57) ABSTRACT

A magnetic system and related method for generating energy is described. Multiple embodiments are described having different shapes, alternative designs to receive different driving forces, varied magnetic structures, and so forth. In an example implementation, a magnetic structure may include on a single side multiple magnetic sources having different magnetic polarities. Other description herein may be directed to magnetizer printing, adaptable/adjustable correlated magnet devices, entertainment devices having correlated magnet technology, and so forth. Furthermore, description of additional magnet-related technology and example implementations thereof is included herein.

15 Claims, 47 Drawing Sheets

(56) References Cited

U.S. PATENT DOCUMENTS

| | | | |
|---|---|---|---|
| 687,292 A | 11/1901 | Armstrong | |
| 996,933 A | 7/1911 | Lindquist | |
| 1,171,351 A | 2/1916 | Neuland | |
| 1,236,234 A | 8/1917 | Troje | |
| 2,243,555 A | 5/1941 | Faus | |
| 2,389,298 A | 11/1945 | Ellis | |
| 2,438,231 A | 3/1948 | Shultz | |
| 2,471,634 A | 5/1949 | Vennice | |
| 2,570,625 A | 10/1951 | Zimmerman et al. | |
| 2,722,617 A | 11/1955 | Cluwen et al. | |
| 3,055,999 A | 9/1962 | Lucas | |
| 3,102,314 A | 9/1963 | Alderfer | |
| 3,208,296 A | 9/1965 | Baermann | |
| 3,238,399 A | 3/1966 | Johanees et al. | |
| 3,288,511 A | 11/1966 | Tavano | |
| 3,301,091 A | 1/1967 | Reese | |
| 3,382,386 A | 5/1968 | Schlaeppi | |
| 3,408,104 A | 10/1968 | Raynes | |
| 2,932,545 A | 4/1969 | Foley | |
| 3,468,576 A | 9/1969 | Beyer et al. | |
| 3,474,366 A | 10/1969 | Barney | |
| 3,521,216 A | 7/1970 | Tolegian | |
| 3,645,650 A | 2/1972 | Laing | |
| 3,668,670 A | 6/1972 | Andersen | |
| 3,684,992 A | 8/1972 | Huguet et al. | |
| 3,696,258 A | 10/1972 | Anderson et al. | |
| 3,790,197 A | 2/1974 | Parker | |
| 3,791,309 A | 2/1974 | Baermann | |
| 3,802,034 A | 4/1974 | Bookless | |
| 3,803,433 A | 4/1974 | Ingenito | |
| 3,808,577 A | 4/1974 | Mathauser | |
| 3,845,430 A | 10/1974 | Petkewicz et al. | |
| 3,893,059 A | 7/1975 | Nowak | |
| 4,079,558 A | 3/1978 | Forham | |
| 4,117,431 A | 9/1978 | Eicher | |
| 4,129,846 A | 12/1978 | Yablochnikov | |
| 4,209,905 A | 7/1980 | Gillings | |
| 4,222,489 A | 9/1980 | Hutter | |
| 4,296,394 A | 10/1981 | Ragheb | |
| 4,352,960 A | 10/1982 | Dormer et al. | |
| 4,399,595 A | 8/1983 | Yoon et al. | |
| 4,416,127 A | 11/1983 | Gomez-Olea Naveda | |
| 4,453,294 A | 6/1984 | Morita | |
| 4,535,278 A | 8/1985 | Asakawa | |
| 4,547,756 A | 10/1985 | Miller et al. | |
| 4,629,131 A | 12/1986 | Podell | |
| 4,645,283 A | 2/1987 | MacDonald et al. | |
| 4,680,494 A | 7/1987 | Grosjean | |
| 4,837,539 A | 6/1989 | Baker | |
| 4,849,749 A | 7/1989 | Fukamachi et al. | |
| 4,912,727 A | 3/1990 | Schubert | |
| 4,941,236 A | 7/1990 | Sherman et al. | |
| 4,956,625 A | 9/1990 | Cardone et al. | |
| 4,993,950 A | 2/1991 | Mensor, Jr. | |
| 4,996,457 A | 2/1991 | Hawsey et al. | |
| 5,013,949 A | 5/1991 | Mabe, Jr. | |
| 5,020,625 A | 6/1991 | Yamauchi et al. | |
| 5,050,276 A | 9/1991 | Pemberton | |
| 5,062,855 A | 11/1991 | Rincoe | |
| 5,123,843 A | 6/1992 | Van der Zel et al. | |
| 5,179,307 A | 1/1993 | Porter | |
| 5,302,929 A | 4/1994 | Kovacs | |
| 5,309,680 A | 5/1994 | Kiel | |
| 5,345,207 A | 9/1994 | Gebele | |
| 5,367,891 A | 11/1994 | Furuyama | |
| 5,383,049 A | 1/1995 | Carr | |
| 5,394,132 A | 2/1995 | Poil | |
| 5,425,763 A | 6/1995 | Stemmann | |
| 5,440,997 A | 8/1995 | Crowley | |
| 5,461,386 A | 10/1995 | Knebelkamp | |
| 5,492,572 A * | 2/1996 | Schroeder et al. | 148/103 |
| 5,495,221 A | 2/1996 | Post | |
| 5,512,732 A | 4/1996 | Yagnik et al. | |
| 5,570,084 A | 10/1996 | Ritter et al. | |
| 5,582,522 A | 12/1996 | Johnson | |
| 5,604,960 A | 2/1997 | Good | |
| 5,631,093 A | 5/1997 | Perry et al. | |
| 5,631,618 A | 5/1997 | Trumper et al. | |
| 5,633,555 A | 5/1997 | Ackermann et al. | |
| 5,635,889 A | 6/1997 | Stelter | |
| 5,637,972 A | 6/1997 | Randall et al. | |
| 5,682,670 A * | 11/1997 | Bell et al. | 29/609 |
| 5,730,155 A | 3/1998 | Allen | |
| 5,759,054 A | 6/1998 | Spadafore | |
| 5,788,493 A | 8/1998 | Tanaka et al. | |
| 5,852,393 A | 12/1998 | Reznik et al. | |
| 5,935,155 A | 8/1999 | Humayun et al. | |
| 5,956,778 A | 9/1999 | Godoy | |
| 5,983,406 A | 11/1999 | Meyerrose | |
| 6,039,759 A | 3/2000 | Carpentier et al. | |
| 6,047,456 A | 4/2000 | Yao et al. | |
| 6,072,251 A | 6/2000 | Markle | |
| 6,074,420 A | 6/2000 | Eaton | |
| 6,115,849 A | 9/2000 | Meyerrose | |
| 6,118,271 A | 9/2000 | Ely et al. | |
| 6,120,283 A | 9/2000 | Cousins | |
| 6,142,779 A | 11/2000 | Siegel et al. | |
| 6,170,131 B1 | 1/2001 | Shin | |
| 6,187,041 B1 | 2/2001 | Garonzik | |
| 6,205,012 B1 | 3/2001 | Lear | |
| 6,210,033 B1 | 4/2001 | Karkos, Jr. et al. | |
| 6,224,374 B1 | 5/2001 | Mayo | |
| 6,234,833 B1 | 5/2001 | Tsai et al. | |
| 6,273,918 B1 | 8/2001 | Yuhasz et al. | |
| 6,275,778 B1 | 8/2001 | Shimada et al. | |
| 6,285,097 B1 | 9/2001 | Hazelton et al. | |
| 6,387,096 B1 | 5/2002 | Hyde, Jr. | |
| 6,457,179 B1 | 10/2002 | Prendergast | |
| 6,467,326 B1 | 10/2002 | Garrigus | |
| 6,540,515 B1 | 4/2003 | Tanaka | |
| 6,599,321 B2 | 7/2003 | Hyde, Jr. | |
| 6,607,304 B1 | 8/2003 | Lake et al. | |
| 6,652,278 B2 | 11/2003 | Honkura et al. | |
| 6,653,919 B2 | 11/2003 | Shih-Chung et al. | |
| 6,720,698 B2 | 4/2004 | Galbraith | |
| 6,747,537 B1 | 6/2004 | Mosteller | |
| 6,842,332 B1 | 1/2005 | Rubenson et al. | |
| 6,847,134 B2 | 1/2005 | Frissen et al. | |
| 6,850,139 B1 | 2/2005 | Dettmann et al. | |
| 6,862,748 B2 | 3/2005 | Prendergast | |
| 6,913,471 B2 | 7/2005 | Smith | |
| 6,927,657 B1 | 8/2005 | Wu | |
| 6,954,938 B2 | 10/2005 | Emberty et al. | |
| 6,954,968 B1 | 10/2005 | Sitbon | |
| 6,971,147 B2 | 12/2005 | Halstead | |
| 7,016,492 B2 | 3/2006 | Pan et al. | |
| 7,031,160 B2 | 4/2006 | Tillotson | |
| 7,033,400 B2 | 4/2006 | Currier | |
| 7,065,860 B2 | 6/2006 | Aoki et al. | |
| 7,066,739 B2 | 6/2006 | McLeish | |
| 7,066,778 B2 | 6/2006 | Kretzschmar | |
| 7,101,374 B2 | 9/2006 | Hyde, Jr. | |
| 7,137,727 B2 | 11/2006 | Joseph et al. | |
| 7,186,265 B2 | 3/2007 | Sharkawy et al. | |
| 7,224,252 B2 | 5/2007 | Meadow, Jr. et al. | |
| 7,264,479 B1 | 9/2007 | Lee | |
| 7,276,025 B2 | 10/2007 | Roberts et al. | |
| 7,339,790 B2 | 3/2008 | Baker et al. | |
| 7,362,018 B1 | 4/2008 | Kulogo et al. | |
| 7,381,181 B2 | 6/2008 | Lau et al. | |
| 7,402,175 B2 | 7/2008 | Azar | |
| 7,438,726 B2 | 10/2008 | Erb | |
| 7,444,683 B2 | 11/2008 | Prendergast et al. | |
| 7,453,341 B1 | 11/2008 | Hildenbrand | |
| 7,498,914 B2 | 3/2009 | Miyashita et al. | |
| 7,583,500 B2 | 9/2009 | Ligtenberg et al. | |
| 7,775,567 B2 | 8/2010 | Ligtenberg et al. | |
| 7,796,002 B2 | 9/2010 | Hashimoto et al. | |
| 7,808,349 B2 | 10/2010 | Fullerton et al. | |
| 7,812,697 B2 | 10/2010 | Fullerton et al. | |
| 7,817,004 B2 | 10/2010 | Fullerton et al. | |
| 7,821,168 B2 * | 10/2010 | Halstead | 310/156.32 |
| 7,832,897 B2 | 11/2010 | Ku | |
| 7,837,032 B2 | 11/2010 | Smeltzer | |

(56) References Cited

U.S. PATENT DOCUMENTS

| | | | |
|---|---|---|---|
| 7,839,246 | B2 | 11/2010 | Fullerton et al. |
| 7,843,297 | B2 | 11/2010 | Fullerton et al. |
| 7,868,721 | B2 | 1/2011 | Fullerton et al. |
| 7,874,856 | B1 | 1/2011 | Schriefer et al. |
| 7,903,397 | B2 | 3/2011 | McCoy |
| 7,905,626 | B2 | 3/2011 | Shantha et al. |
| 7,960,884 | B2 * | 6/2011 | Miyata et al. ............ 310/156.12 |
| 8,002,585 | B2 | 8/2011 | Zhou |
| 2002/0125977 | A1 | 9/2002 | VanZoest |
| 2003/0170976 | A1 | 9/2003 | Molla et al. |
| 2003/0179880 | A1 | 9/2003 | Pan et al. |
| 2003/0187510 | A1 | 10/2003 | Hyde |
| 2004/0003487 | A1 | 1/2004 | Reiter |
| 2004/0155748 | A1 | 8/2004 | Steingroever |
| 2004/0244636 | A1 | 12/2004 | Meadow et al. |
| 2004/0251759 | A1 * | 12/2004 | Hirzel ........................... 310/114 |
| 2005/0102802 | A1 | 5/2005 | Sitbon et al. |
| 2005/0196484 | A1 | 9/2005 | Khoshnevis |
| 2005/0231046 | A1 | 10/2005 | Aoshima |
| 2005/0240263 | A1 | 10/2005 | Fogarty et al. |
| 2005/0263549 | A1 | 12/2005 | Scheiner |
| 2006/0066428 | A1 | 3/2006 | McCarthy et al. |
| 2006/0189259 | A1 | 8/2006 | Park et al. |
| 2006/0198047 | A1 | 9/2006 | Xue et al. |
| 2006/0214756 | A1 | 9/2006 | Elliott et al. |
| 2006/0226725 | A1 * | 10/2006 | Wise ........................ 310/156.35 |
| 2006/0290451 | A1 | 12/2006 | Prendergast et al. |
| 2006/0293762 | A1 | 12/2006 | Schulman et al. |
| 2007/0072476 | A1 | 3/2007 | Milan |
| 2007/0075594 | A1 | 4/2007 | Sadler |
| 2007/0103266 | A1 | 5/2007 | Wang et al. |
| 2007/0138806 | A1 | 6/2007 | Ligtenberg et al. |
| 2007/0255400 | A1 | 11/2007 | Parravicini et al. |
| 2008/0139261 | A1 | 6/2008 | Cho et al. |
| 2008/0181804 | A1 | 7/2008 | Tanigawa et al. |
| 2008/0186683 | A1 | 8/2008 | Ligtenberg et al. |
| 2008/0218299 | A1 | 9/2008 | Arnold |
| 2008/0224806 | A1 | 9/2008 | Ogden et al. |
| 2008/0272868 | A1 | 11/2008 | Prendergast et al. |
| 2008/0282517 | A1 | 11/2008 | Claro |
| 2009/0021333 | A1 | 1/2009 | Fiedler |
| 2009/0209173 | A1 | 8/2009 | Arledge et al. |
| 2009/0250576 | A1 | 10/2009 | Fullerton et al. |
| 2009/0251256 | A1 | 10/2009 | Fullerton et al. |
| 2009/0254196 | A1 | 10/2009 | Cox et al. |
| 2009/0278642 | A1 | 11/2009 | Fullerton et al. |
| 2009/0289090 | A1 | 11/2009 | Fullerton et al. |
| 2009/0289749 | A1 | 11/2009 | Fullerton et al. |
| 2009/0292371 | A1 | 11/2009 | Fullerton et al. |
| 2010/0033280 | A1 | 2/2010 | Bird et al. |
| 2010/0126857 | A1 | 5/2010 | Polwart et al. |
| 2010/0167576 | A1 | 7/2010 | Zhou |
| 2011/0026203 | A1 | 2/2011 | Ligtenberg et al. |
| 2011/0210636 | A1 | 9/2011 | Kuhlmann-Wilsdorf |
| 2011/0234344 | A1 | 9/2011 | Fullerton et al. |
| 2011/0248806 | A1 | 10/2011 | Michael |
| 2011/0279206 | A1 | 11/2011 | Fullerton et al. |

FOREIGN PATENT DOCUMENTS

| | | |
|---|---|---|
| EP | 0 345 554 A1 | 12/1989 |
| EP | 0 545 737 A1 | 6/1993 |
| FR | 823395 | 1/1938 |
| GB | 1 495 677 A | 12/1977 |
| JP | 60-091011 U | 5/1985 |
| WO | WO-02/31945 A2 | 4/2002 |
| WO | 2007081830 A2 | 7/2007 |
| WO | WO-2007/081830 A2 | 7/2007 |
| WO | WO-2009/124030 A1 | 10/2009 |
| WO | WO-2010/141324 A1 | 12/2010 |

OTHER PUBLICATIONS

"Magnetic Safety Sensors" pp. 1-3, http://farnell.com/datasheets/6465.pdf (downloaded on or before Jan. 23, 2009).

"Series BNS-B20 Coded-Magnet Sensor Safety Door Handle" pp. 1-2, http://www.schmersalusa.com/catalog_pdfs/BNS_B20.pdf (downloaded on or before Jan. 23, 2009).

"Series BNS333 Coded-Magnet Sensors with Integrated Safety Control Module" pp. 1-2, http://www.schmersalusa.com/machine_guarding/coded_magnet/drawings/bns333.pdf (downloaded on or before Jan. 23, 2009).

Series BNS, Compatible Series AES Safety Controllers, http://www.schmersalusa.com/safety_controllers/drawings/aes.pdf, pp. 159-175, date unknown.

BNS 33 Range, Magnetic safety sensors, Rectangular design, http://www.farnell.com/datasheets/36449.pdf, 3 pages, date unknown.

Series BNS-B20, Coded-Magnet Sensor Safety Door Handle, http://www.schmersalusa.com/catalog_pdfs/BNS_B20.pdf, 2 pages, date unknown.

Series BNS333, Coded-Magnet Sensors with Integral Safety Control Module, http://www.schmersalusa.com/machine_guarding/coded_magnet/drawings/bns333.pdf, 2 pages, date unknown.

Wikipedia, "Barker Code", Web article, last modified Aug. 2, 2008, 2 pages.

Wikipedia, "Kasami Code", Web article, last modified Jun. 11, 2008, 1 page.

Wikipedia, "Linear feedback shift register", Web article, last modified Nov. 11, 2008, 6 pages.

Wikipedia, "Golomb Ruler", Web article, last modified Nov. 4, 2008, 3 pages.

Wikipedia, "Costas Array", Web article, last modified Oct. 7, 2008, 4 pages.

Wikipedia, "Walsh Code", Web article, last modified Sep. 17, 2008, 2 pages.

Wikipedia, "Gold Code", Web article, last modified Jul. 27, 2008, 1 page.

Wikipedia, "Bitter Electromagnet", Web article, last modified Aug. 2011, 1 page.

Pill-soo Kim, "A future cost trends of magnetizer systems in Korea", Industrial Electronics, Control, and Instrumentation, 1996, vol. 2, Aug. 5, 1996, pp. 991-996.

United States Office Action, dated Aug. 26, 2011, issued in counterpart U.S. Appl. No. 12/206,270.

United States Office Action, dated Mar. 12, 2012, issued in counterpart U.S. Appl. No. 12/206,270.

United States Office Action, dated Feb. 22, 2011, issued in counterpart U.S. Appl. No. 12/476,952.

United States Office Action, dated Oct. 12, 2011, issued in counterpart U.S. Appl. No. 12/476,952.

United States Office Action, dated Mar. 9, 2012, issued in counterpart U.S. Appl. No. 13/371,280.

International Search Report and Written Opinion, dated May 14, 2009, issued in related International Application No. PCT/US2009/038925.

International Search Report and Written Opinion, dated Jul. 13, 2010, issued in related International Application No. PCT/US2010/021612.

International Search Report and Written Opinion dated Jun. 1, 2009, issued in related International Application No. PCT/US2009/002027.

International Search Report and Written Opinion, dated Aug. 18, 2010, issued in related International Application No. PCT/US2010/036443.

International Search Report and Written Opinion, dated Apr. 8, 2011 issued in related International Application No. PCT/US2010/049410.

Atallah, K., Calverley, S.D., D. Howe, 2004, "Design, analysis and realisation of a high-performance magnetic gear", IEE Proc.—Electr. Power Appl., vol. 151, No. 2, Mar. 2004.

Atallah, K., Howe, D. 2001, "A Novel High-Performance Magnetic Gear", IEEE Transactions on Magnetics, vol. 37, No. 4, Jul. 2001, p. 2844-46.

Bassani, R., 2007, "Dynamic Stability of Passive Magnetic Bearings", Nonlinear Dynamics, V. 50, p. 161-68.

Boston Gear 221S-4, One-stage Helical Gearbox, http://www.bostongear.com/pdf/product_sections/200_series_helical.pdf, referenced Jun. 2010.

(56) References Cited

OTHER PUBLICATIONS

Charpentier et al., 2001, "Mechanical Behavior of Axially Magnetized Permanent-Magnet Gears", IEEE Transactions on Magnetics, vol. 37, No. 3, May 2001, p. 1110-17.

Chau et al., 2008, "Transient Analysis of Coaxial Magnetic Gears Using Finite Element Comodeling", Journal of Applied Physics, vol. 103.

Choi et al., 2010, "Optimization of Magnetization Directions in a 3-D Magnetic Structure", IEEE Transactions on Magnetics, vol. 46, No. 6, Jun. 2010, p. 1603-06.

Correlated Magnetics Research, 2009, Online Video, "Innovative Magnetics Research in Huntsville", http://www.youtube.com/watch?v=m4m81JjZCJo.

Correlated Magnetics Research, 2009, Online Video, "Non-Contact Attachment Utilizing Permanent Magnets", http://www.youtube.com/watch?v=3xUm25CNNgQ.

Correlated Magnetics Research, 2010, Company Website, http://www.correlatedmagnetics.com.

Furlani 1996, "Analysis and optimization of synchronous magnetic couplings", J. Appl. Phys., vol. 79, No. 8, p. 4692.

Furlani 2001, "Permanent Magnet and Electromechanical Devices", Academic Press, San Diego.

Furlani, E.P., 2000, "Analytical analysis of magnetically coupled multipole cylinders", J. Phys. D: Appl. Phys., vol. 33, No. 1, p. 28-33.

General Electric DP 2.7 Wind Turbine Gearbox, http://www.gedrivetrain.com/insideDP27.cfm, referenced Jun. 2010.

Ha et al., 2002, "Design and Characteristic Analysis of Non-Contact Magnet Gear for Conveyor by Using Permanent Magnet", Conf. Record of the 2002 IEEE Industry Applications Conference, p. 1922-27.

Huang et al., 2008, "Development of a Magnetic Planetary Gearbox", IEEE Transactions on Magnetics, vol. 44, No. 3, p. 403-12.

International Search Report and Written Opinion of the International Searching Authority issued in Application No. PCT/US12/61938 dated Feb. 26, 2013.

International Search Report and Written Opinion of the International Searching Authority issued in Application No. PCT/US2013/028095 dated May 13, 2013.

Jian et al., "Comparison of Coaxial Magnetic Gears With Different Topologies", IEEE Transactions on Magnetics, vol. 45, No. 10, Oct. 2009, p. 4526-29.

Jian, L., Chau, K.T., 2010, "A Coaxial Magnetic Gear With Halbach Permanent-Magnet Arrays", IEEE Transactions on Energy Conversion, vol. 25, No. 2, Jun. 2010, p. 319-28.

Jørgensen et al., "The Cycloid Permanent Magnetic Gear", IEEE Transactions on Industry Applications, vol. 44, No. 6, Nov./Dec. 2008, p. 1659-65.

Jørgensen et al., 2005, "Two dimensional model of a permanent magnet spur gear", Conf. Record of the 2005 IEEE Industry Applications Conference, p. 261-5.

Krasil'nikov et al., 2008, "Calculation of the Shear Force of Highly Coercive Permanent Magnets in Magnetic Systems With Consideration of Affiliation to a Certain Group Based on Residual Induction", Chemical and Petroleum Engineering, vol. 44, Nos. 7-8, p. 362-65.

Krasil'nikov et al., 2009, "Torque Determination for a Cylindrical Magnetic Clutch", Russian Engineering Research, vol. 29, No. 6, pp. 544-47.

Liu et al., 2009, "Design and Analysis of Interior-magnet Outer-rotor Concentric Magnetic Gears", Journal of Applied Physics, vol. 105.

Lorimer, W., Hartman, A., 1997, "Magnetization Pattern for Increased Coupling in Magnetic Clutches", IEEE Transactions on Magnetics, vol. 33, No. 5, Sep. 1997.

Mezani, S., Atallah, K., Howe, D. , 2006, "A high-performance axial-field magnetic gear", Journal of Applied Physics vol. 99.

Mi, "Magnetreater/Charger Model 580" Magnetic Instruments Inc. Product specification, May 4, 2009, http://web.archive.org/web/20090504064511/http://www.maginst.com/specifications/580_magnetreater.htm, 2 pages.

Neugart PLE-160, One-Stage Planetary Gearbox, http://www.neugartusa.com/ple_160_gb.pdf, referenced Jun. 2010.

Notice of Allowance issued in U.S. Appl. No. 13/471,189 dated Apr. 3, 2013.

Tsurumoto 1992, "Basic Analysis on Transmitted Force of Magnetic Gear Using Permanent Magnet", IEEE Translation Journal on Magnetics in Japan, Vo 7, No. 6, Jun. 1992, p. 447-52.

United States Office Action issued in U.S. Appl. No. 13/104,393 dated Apr. 4, 2013.

United States Office Action issued in U.S. Appl. No. 13/236,413 dated Jun. 6, 2013.

United States Office Action issued in U.S. Appl. No. 13/374,074 dated Feb. 21, 2013.

United States Office Action issued in U.S. Appl. No. 13/470,994 dated Jan. 7, 2013.

United States Office Action issued in U.S. Appl. No. 13/529,520 dated Sep. 28, 2012.

United States Office Action issued in U.S. Appl. No. 13/530,893 dated Mar. 22, 2013.

United States Office Action issued in U.S. Appl. No. 13/855,519 dated Jul. 17, 2013.

United States Office Action issued in U.S. Appl. No. 13/470,994 dated Aug. 8, 2013.

United States Office Action issued in U.S. Appl. No. 13/430,219 dated Aug. 13, 2013.

\* cited by examiner

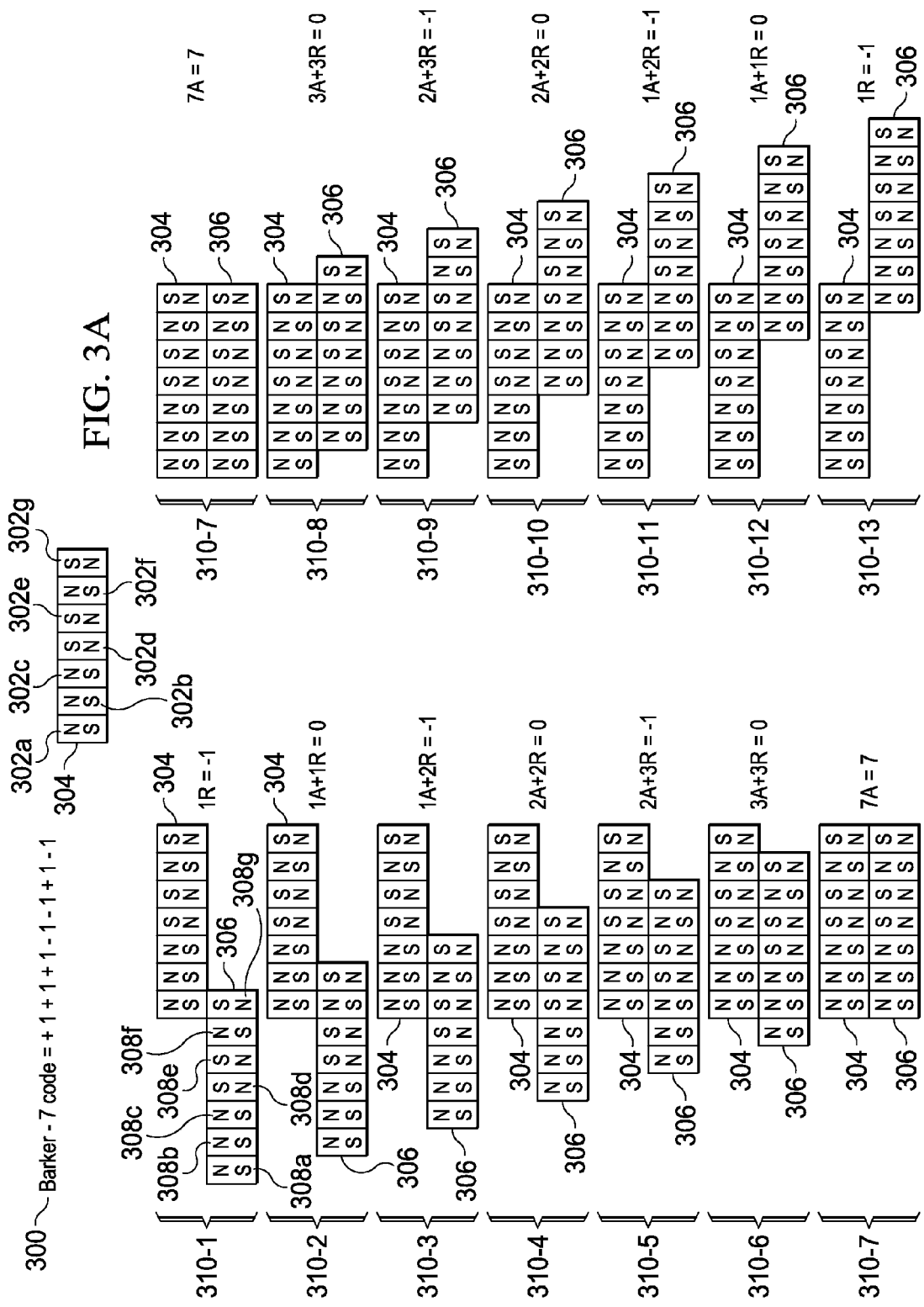

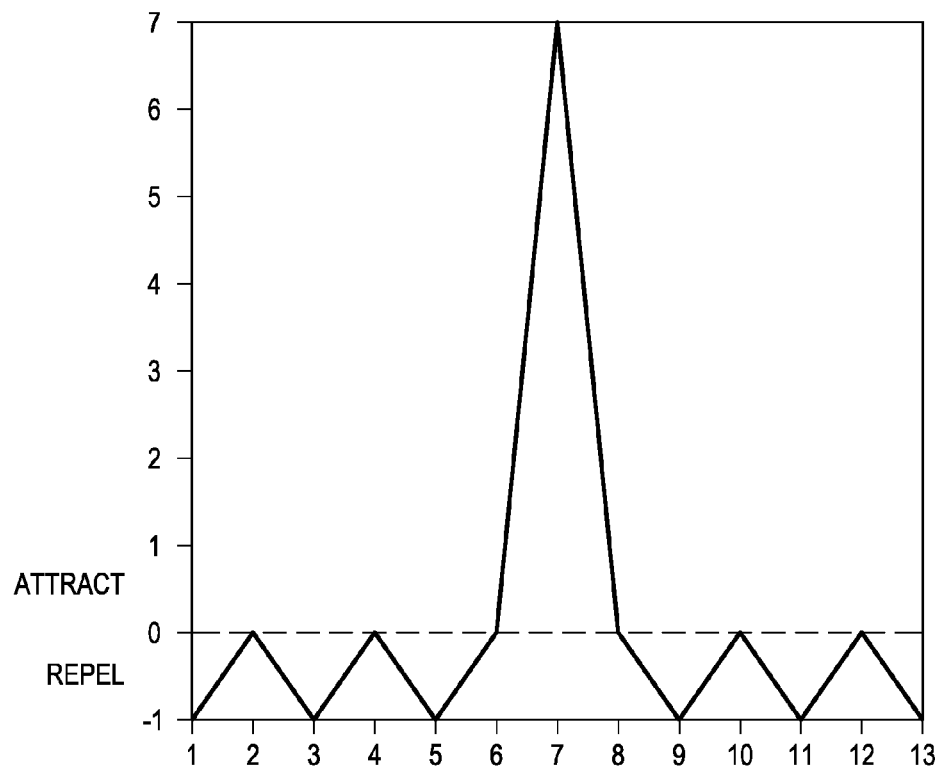
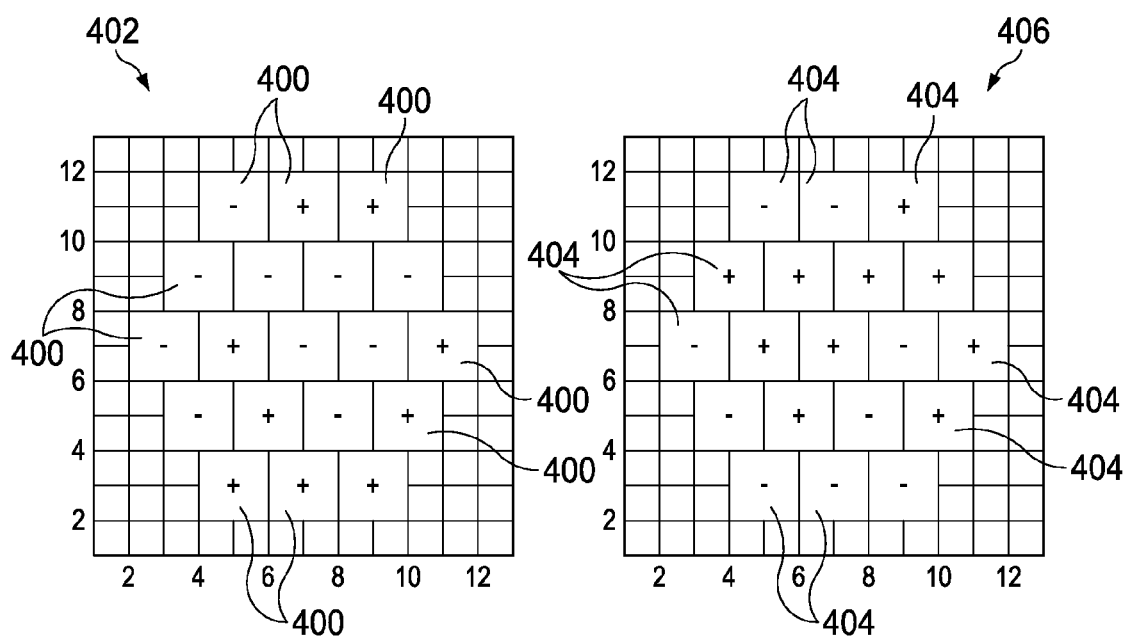

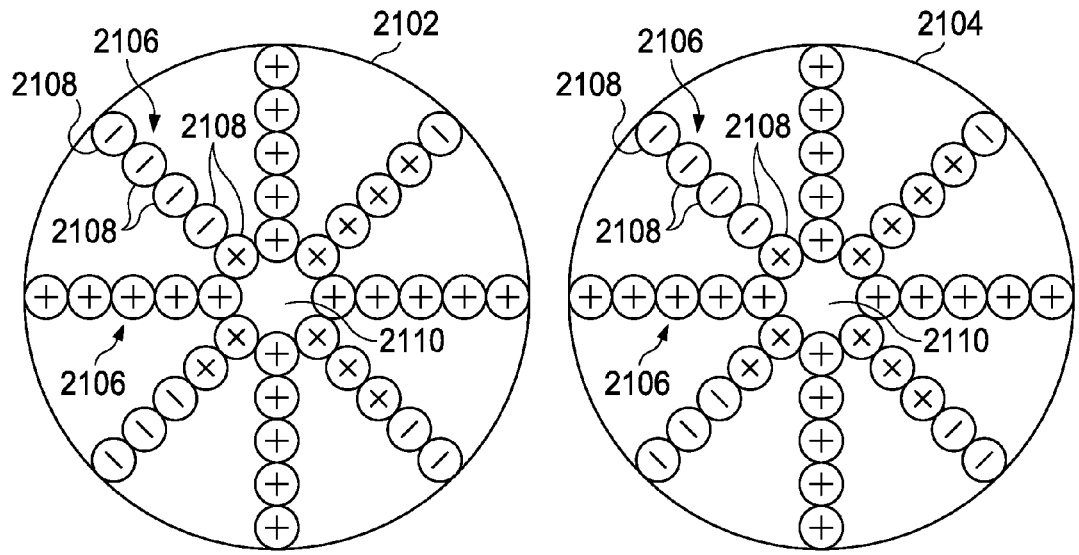
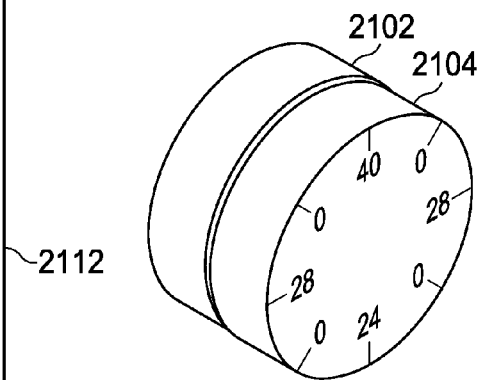
FIG. 21

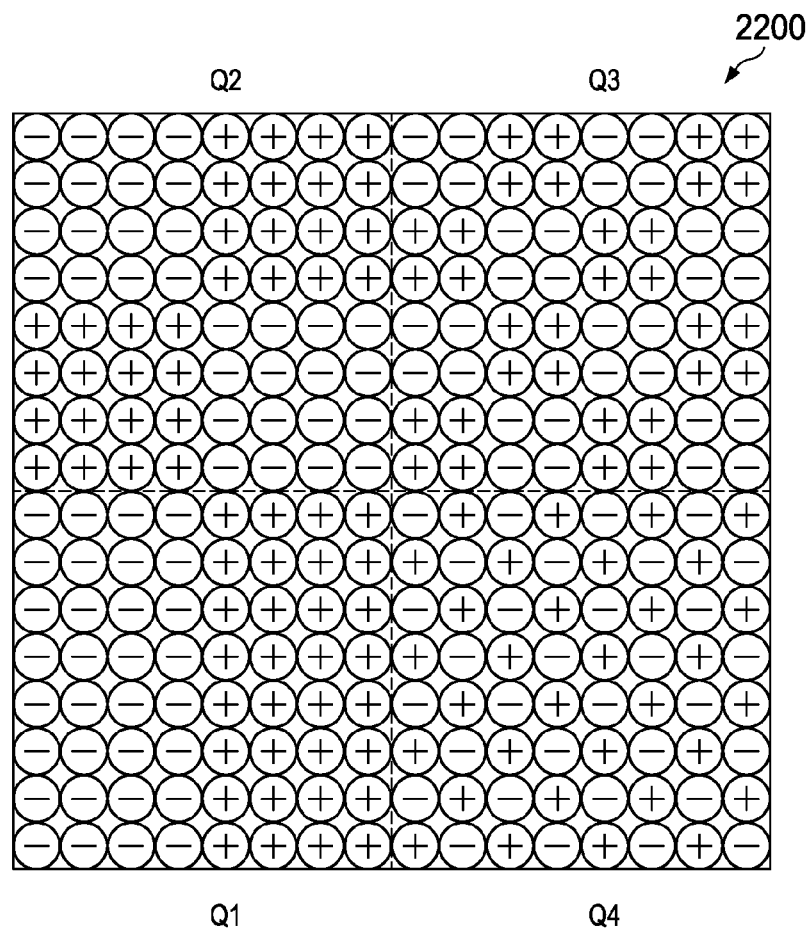
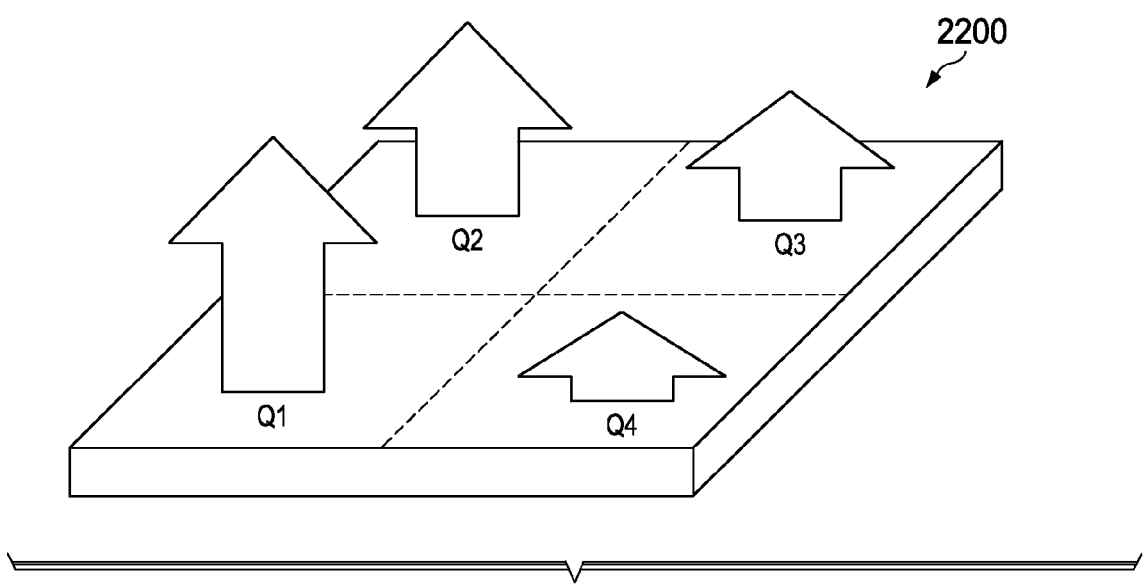
FIG. 22A

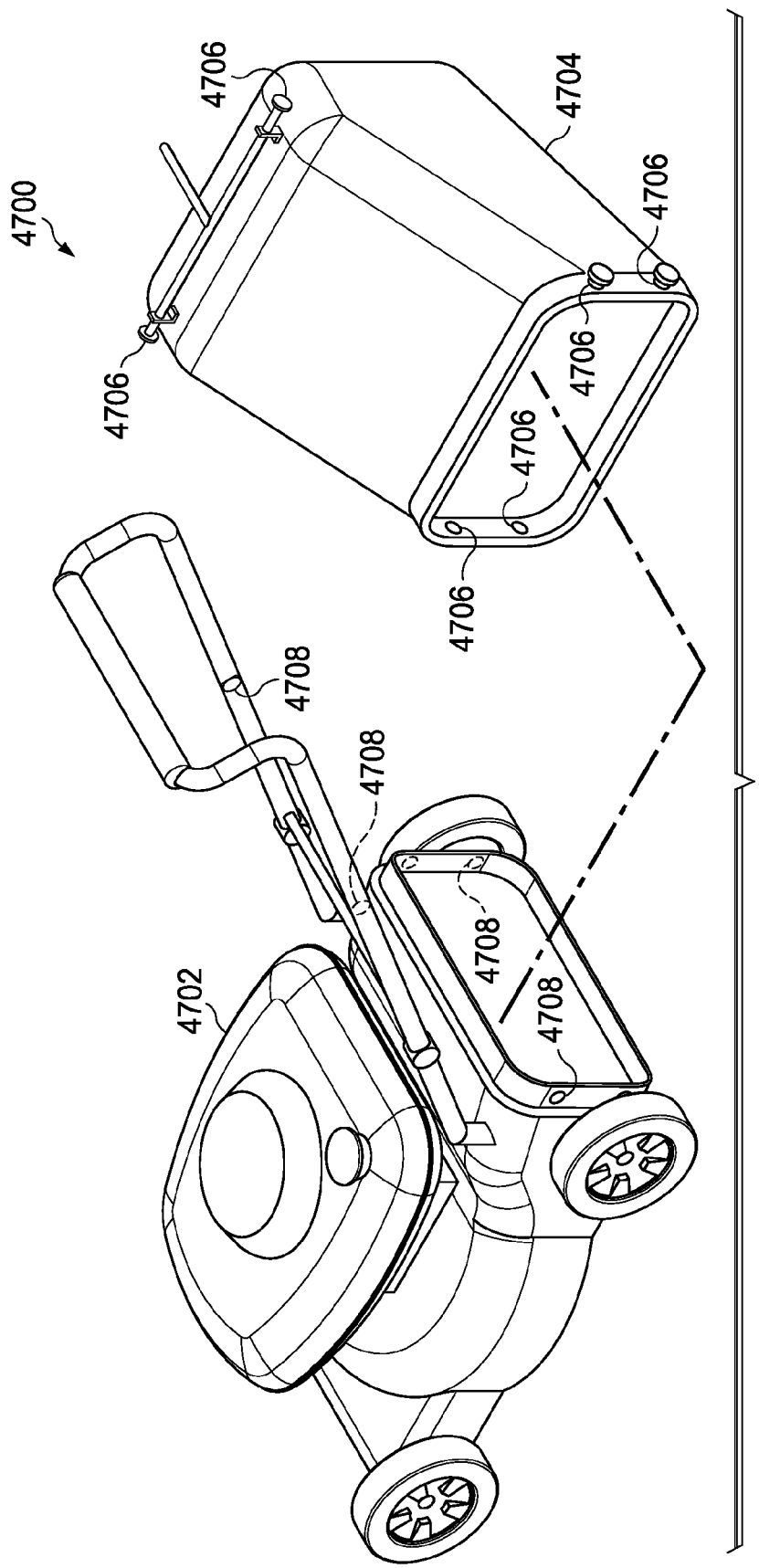
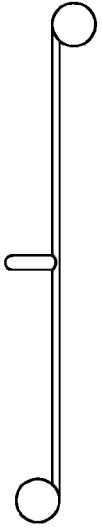
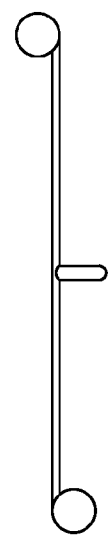
FIG. 47
FIG. 47a
FIG. 47b

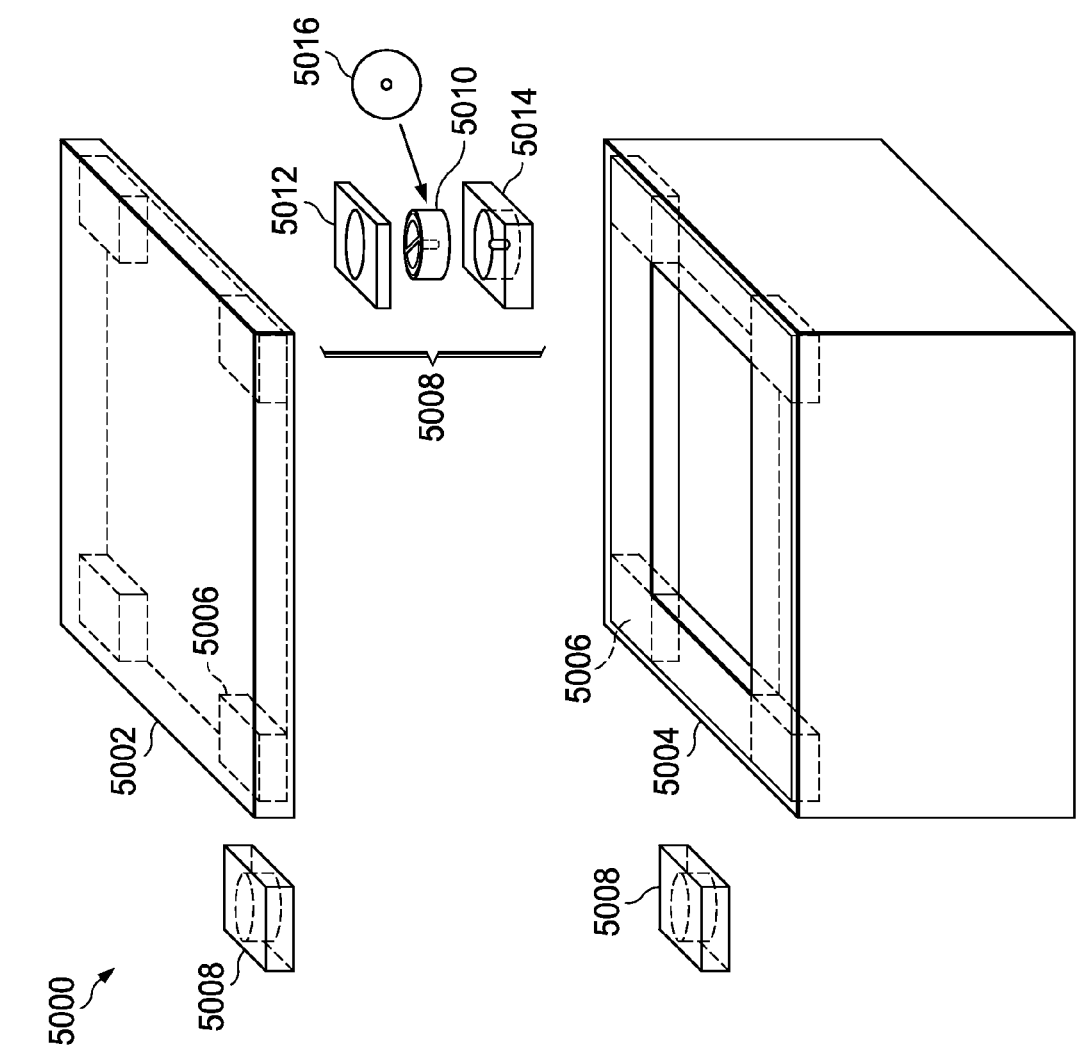

SYSTEM AND METHOD FOR ENERGY GENERATION

CLAIMING BENEFIT OF PRIOR FILED U.S. APPLICATIONS

This patent application claims the benefit of U.S. Provisional Patent Application Nos. 61/277,214 (filed Sep. 22, 2009), 61/277,900 (filed Sep. 30, 2009), 61/278,767 (filed Oct. 9, 2009), 61/279,094 (filed Oct. 16, 2009), 61/281,160 (filed Nov. 13, 2009), 61/283,780 (filed Dec. 9, 2009), 61/284,385 (filed Dec. 17, 2009) and 61/342,988 (filed Apr. 22, 2010); and this patent application is a continuation-in-part of U.S. Nonprovisional patent application Ser. Nos. 12/885,450 (filed Sep. 18, 2010) and 12/476,952 (filed Jun. 2, 2009). The contents of these eight provisional patent applications and two nonprovisional patent applications are hereby incorporated by reference in their entirety herein.

TECHNICAL FIELD

The disclosure herein relates generally to magnetic technologies. By way of example but not limitation, certain portions of the disclosure relate to energy generation using magnetic structures.

SUMMARY

In one aspect, an example embodiment is directed to an electrical energy generation apparatus, which may comprise a first structure and a second structure. The first structure may include multiple magnetic sources that are disposed on a first side of the first structure. The multiple magnetic sources may produce one or more magnetic fields. The multiple magnetic sources may include at least one first magnetic source having a first polarity and at least one second magnetic source having a second polarity, with the first polarity differing from the second polarity. The second structure may include at least one coil, and the second structure may be configured to enable the at least one coil to be positioned at least partially within the one or more magnetic fields. At least one of the multiple magnetic sources of the first structure or the at least one coil of the second structure may be capable of movement relative to the other responsive to a force.

In another aspect, an example embodiment may be directed to a method that comprises forming a magnetic structure that includes multiple magnetic sources having different polarities disposed on a single side of the magnetic structure, with the multiple magnetic sources arranged in a pattern and producing one or more magnetic fields. At least one conductive coil that is capable of interacting with the one or more magnetic fields may be provided. An apparatus may be constructed that enables the magnetized structure and the at least one conductive coil to move relative to each other such that the at least one conductive coil is to interact with the one or more magnetic fields based at least partly on a relative movement of the at least one conductive coil and the magnetized structure.

In yet another aspect, an example embodiment may be directed to a method that comprises ascertaining a targeted set of magnetic characteristics. A coded magnet configuration may be formulated responsive at least partly to the targeted set of magnetic characteristics, with the coded magnet configuration including at least two adjacent magnetic field sources having opposite polarities. Magnetic field properties for the coded magnet configuration may be modeled based, at least in part, on a shortest path effect exhibited with respect to the at least two adjacent magnetic field sources having the opposite polarities. A coded magnetic structure may be built based, at least in part, on the coded magnet configuration and the modeling.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of described embodiments may be obtained by reference to the following detailed description when taken in conjunction with the accompanying drawings wherein:

FIGS. 1-9 are various diagrams used to help explain different example concepts about correlated magnetic technology which can be utilized in certain embodiments;

FIG. 21 depicts a device comprising example circularly-coded magnetic structures having coding to enable a user to rotate one structure relative to the other to produce a desired force;

FIGS. 22A-22C depict example uses of code density coding to control force curve properties of regions of a magnetic structure in order to convey information or to effect movement;

FIGS. 47, 47a, and 47b depict example approaches to using correlated magnetics with landscaping equipment;

FIG. 50 depicts an example approach to securing a lid to a container using coded magnets.

DETAILED DESCRIPTION

Certain described embodiments may relate to a multilevel correlated magnetic system and method for using the multilevel correlated magnetic system. The multilevel correlated magnetic system is made possible, in part, by the use of an emerging, revolutionary technology that is called correlated magnetics. This revolutionary technology referred to herein as correlated magnetics was first fully described and enabled in the co-assigned U.S. patent application Ser. No. 12/123, 718 filed on May 20, 2008 and entitled "A Field Emission System and Method". The contents of this document are hereby incorporated herein by reference. A second generation of a correlated magnetic technology is described and enabled in the co-assigned U.S. patent application Ser. No. 12/358, 423 filed on Jan. 23, 2009 and entitled "A Field Emission System and Method". The contents of this document are hereby incorporated herein by reference. A third generation of a correlated magnetic technology is described and enabled in the co-assigned U.S. patent application Ser. No. 12/476, 952 filed on Jun. 2, 2009 and entitled "A Field Emission System and Method". The contents of this document are hereby incorporated herein by reference. Another technology known as correlated inductance, which is related to correlated magnetics, has been described and enabled in the co-assigned U.S. patent application Ser. No. 12/322,561 filed on Feb. 4, 2009 and entitled "A System and Method for Producing an Electric Pulse". The contents of this document are hereby incorporated by reference.

A brief discussion about correlated magnetics technology is provided first before a discussion is provided about multilevel correlated magnetic technology. Multiple example embodiments are further described herein below. It should be understood that the section (subsection, etc.) headings are for informational purposes and the convenience of the reader only. They are not intended to be limiting. For example, some material described under one particular heading may be equally (or more) applicable to other heading(s). For instance, electricity generators may also be considered machines, and an exploding toy described with particular reference to FIG. 27 may also be considered an energy storage unit. Furthermore, certain descriptive portions may have more or less relevance to a particular heading under which they may be found.

I. Correlated Magnetics Technology

This section is provided to introduce the reader to basic magnets and the new and revolutionary correlated magnetic technology. This section includes subsections relating to basic magnets, correlated magnets, and correlated electromagnetics. It should be understood that this section is provided to assist the reader with understanding the present invention, and should not be used to limit the scope of the present invention.

A. Magnets

Figure 1:
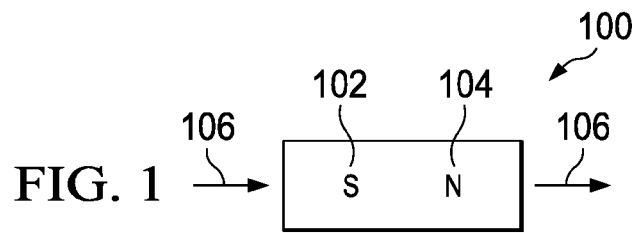

A magnet is a material or object that produces a magnetic field which is a vector field that has a direction and a magnitude (also called strength). Referring to FIG. 1, there is illustrated an exemplary magnet 100 which has a South pole 102 and a North pole 104 and magnetic field vectors 106 that represent the direction and magnitude of the magnet's moment. The magnet's moment is a vector that characterizes the overall magnetic properties of the magnet 100. For a bar magnet, the direction of the magnetic moment points from the South pole 102 to the North pole 104. The North and South poles 104 and 102 are also referred to herein as positive (+) and negative (−) poles, respectively.

Figure 2A:
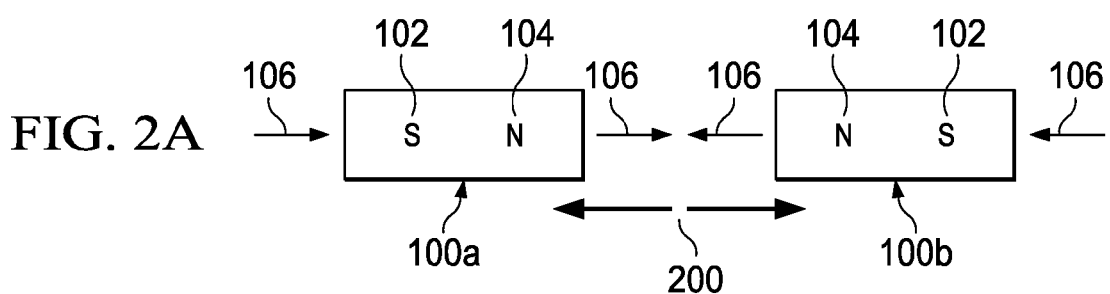
Figure 2B:
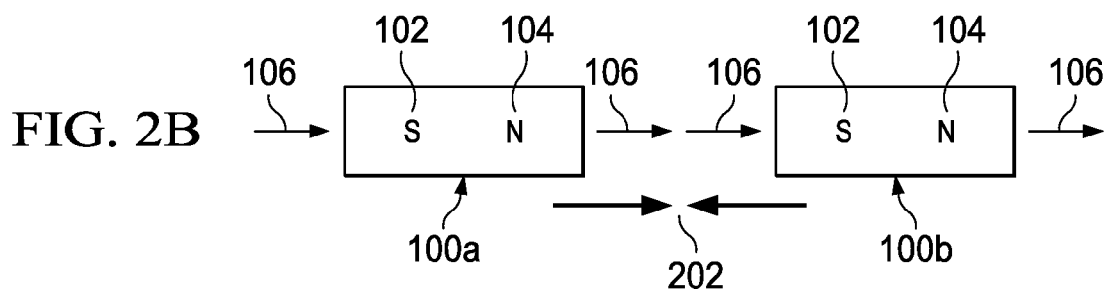
Figure 2C:
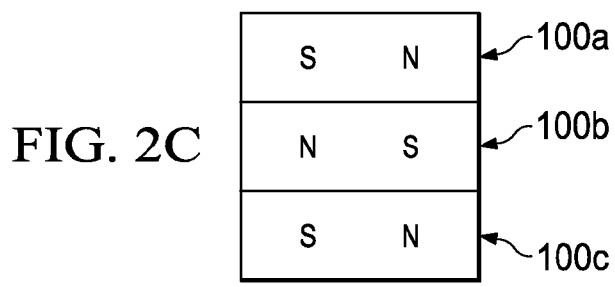

Referring to FIG. 2A, there is a diagram that depicts two magnets 100a and 100b aligned such that their polarities are opposite in direction resulting in a repelling spatial force 200 which causes the two magnets 100a and 100b to repel each other. In contrast, FIG. 2B is a diagram that depicts two magnets 100a and 100b aligned such that their polarities are in the same direction resulting in an attracting spatial force 202 which causes the two magnets 100a and 100b to attract each other. In FIG. 2B, the magnets 100a and 100b are shown as being aligned with one another but they can also be partially aligned with one another where they could still "stick"

to each other and maintain their positions relative to each other. FIG. 2C is a diagram that illustrates how magnets 100a, 100b and 100c will naturally stack on one another such that their poles alternate.

B. Correlated Magnets

Correlated magnets can be created in a wide variety of ways depending on the particular application as described in the aforementioned U.S. patent application Ser. Nos. 12/123, 718, 12/358,432, and 12/476,952 by using a unique combination of magnet arrays (referred to herein as magnetic field emission sources), correlation theory (commonly associated with probability theory and statistics) and coding theory (commonly associated with communication systems and radar systems). A brief discussion is provided next to explain how these widely diverse technologies are used in a unique and novel way to create correlated magnets.

Basically, correlated magnets are made from a combination of magnetic (or electric) field emission sources which have been configured in accordance with a pre-selected code having desirable correlation properties. Thus, when a magnetic field emission structure is brought into alignment with a complementary, or mirror image, magnetic field emission structure the various magnetic field emission sources will all align causing a peak spatial attraction force to be produced, while the misalignment of the magnetic field emission structures cause the various magnetic field emission sources to substantially cancel each other out in a manner that is a function of the particular code used to design the two magnetic field emission structures. In contrast, when a magnetic field emission structure is brought into alignment with a duplicate magnetic field emission structure then the various magnetic field emission sources all align causing a peak spatial repelling force to be produced, while the misalignment of the magnetic field emission structures causes the various magnetic field emission sources to substantially cancel each other out in a manner that is a function of the particular code used to design the two magnetic field emission structures.

The aforementioned spatial forces (attraction, repelling) have a magnitude that is a function of the relative alignment of two magnetic field emission structures and their corresponding spatial force (or correlation) function, the spacing (or distance) between the two magnetic field emission structures, and the magnetic field strengths and polarities of the various sources making up the two magnetic field emission structures. The spatial force functions can be used to achieve precision alignment and precision positioning not possible with basic magnets. Moreover, the spatial force functions can enable the precise control of magnetic fields and associated spatial forces thereby enabling new forms of attachment devices for attaching objects with precise alignment and new systems and methods for controlling precision movement of objects. An additional unique characteristic associated with correlated magnets relates to the situation where the various magnetic field sources making-up two magnetic field emission structures can effectively cancel out each other when they are brought out of alignment which is described herein as a release force. This release force is a direct result of the particular correlation coding used to configure the magnetic field emission structures.

A person skilled in the art of coding theory will recognize that there are many different types of codes that have different correlation properties which have been used in communications for channelization purposes, energy spreading, modulation, and other purposes. Many of the basic characteristics of such codes make them applicable for use in producing the magnetic field emission structures described herein. For example, Barker codes are known for their autocorrelation properties and can be used to help configure correlated magnets. Although, a Barker code is used in an example below with respect to FIGS. 3A-3B, other forms of codes which may or may not be well known in the art are also applicable to correlated magnets because of their autocorrelation, cross-correlation, or other properties including, for example, Gold codes, Kasami sequences, hyperbolic congruential codes, quadratic congruential codes, linear congruential codes, Welch-Costas array codes, Golomb-Costas array codes, pseudorandom codes, chaotic codes, Optimal Golomb Ruler codes, deterministic codes, designed codes, one dimensional codes, two dimensional codes, three dimensional codes, or four dimensional codes, combinations thereof, and so forth.

Generally, the spatial force functions described herein may be in accordance with a code, where the code corresponding to a code modulo of first field emission sources and a complementary code modulo of second field emission sources. The code defines a peak spatial force corresponding to substantial alignment of the code modulo of the first field emission sources with the complementary code modulo of the second field emission sources. The code also defines a plurality of off peak spatial forces corresponding to a plurality of different misalignments of the code modulo of the first field emission sources and the complementary code modulo of the second field emission sources. The plurality of off peak spatial forces have a largest off peak spatial force, where the largest off peak spatial force is less than half of the peak spatial force.

Referring to FIG. 3A, there are diagrams used to explain how a Barker length 7 code 300 can be used to determine polarities and positions of magnets 302a, 302b . . . 302g making up a first magnetic field emission structure 304. Each magnet 302a, 302b . . . 302g has the same or substantially the same magnetic field strength (or amplitude), which for the sake of this example is provided as a unit of 1 (where A=Attract, R=Repel, A=−R, A=1, R=−1). A second magnetic field emission structure 306 (including magnets 308a, 308b . . . 308g) that is identical to the first magnetic field emission structure 304 is shown in 13 different alignments 310-1 through 310-13 relative to the first magnetic field emission structure 304. For each relative alignment, the number of magnets that repel plus the number of magnets that attract is calculated, where each alignment has a spatial force in accordance with a spatial force function based upon the correlation function and magnetic field strengths of the magnets 302a, 302b . . . 302g and 308a, 308b . . . 308g. With the specific Barker code used, the spatial force varies from −1 to 7, where the peak occurs when the two magnetic field emission structures 304 and 306 are aligned which occurs when their respective codes are aligned. The off peak spatial force, referred to as a side lobe force, varies from 0 to −1. As such, the spatial force function causes the magnetic field emission structures 304 and 306 to generally repel each other unless they are aligned such that each of their magnets are correlated with a complementary magnet (i.e., a magnet's South pole aligns with another magnet's North pole, or vice versa). In other words, the two magnetic field emission structures 304 and 306 substantially correlate with one another when they are aligned to substantially mirror each other.

In FIG. 3B, there is a plot that depicts the spatial force function of the two magnetic field emission structures 304 and 306 which results from the binary autocorrelation function of the Barker length 7 code 300, where the values at each alignment position 1 through 13 correspond to the spatial force values that were calculated for the thirteen alignment positions 310-1 through 310-13 between the two magnetic field emission structures 304 and 306 depicted in FIG. 3A. As the true autocorrelation function for correlated magnet field structures is repulsive, and most of the uses envisioned will have attractive correlation peaks, the usage of the term 'autocorrelation' herein will refer to complementary correlation unless otherwise stated. That is, the interacting faces of two such correlated magnetic field emission structures 304 and 306 will be complementary to (i.e., mirror images of) each other. This complementary autocorrelation relationship can be seen in FIG. 3A where the bottom face of the first magnetic field emission structure 304 having the pattern 'S S S N N S N' is shown interacting with the top face of the second magnetic field emission structure 306 having the pattern 'N N N S S N S', which is the mirror image (pattern) of the bottom face of the first magnetic field emission structure 304.

Figure 4B:
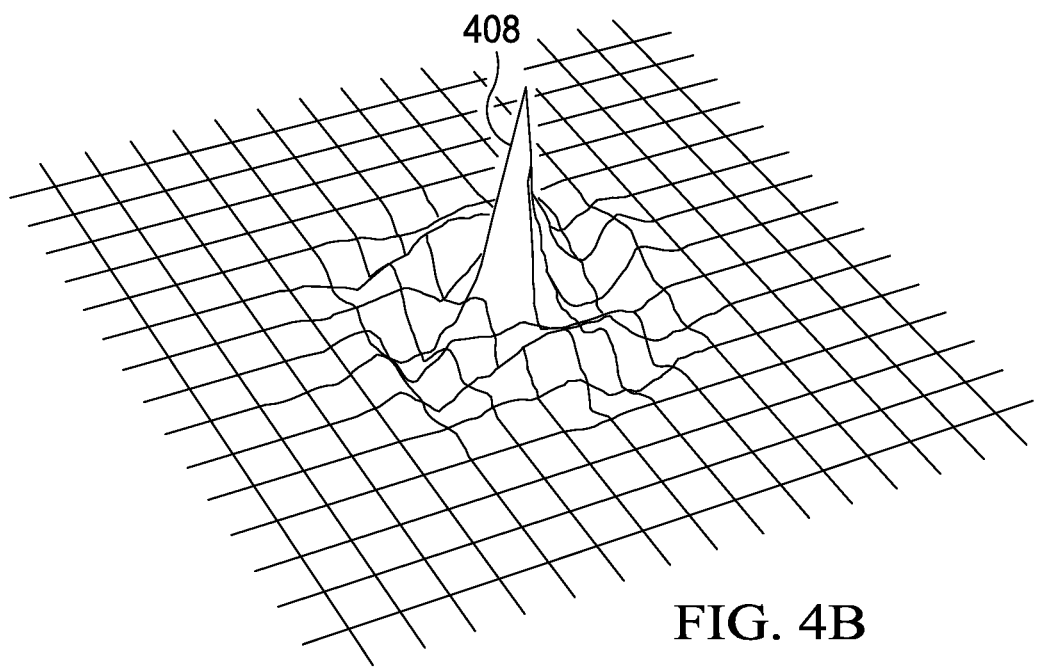
Figure 4C:
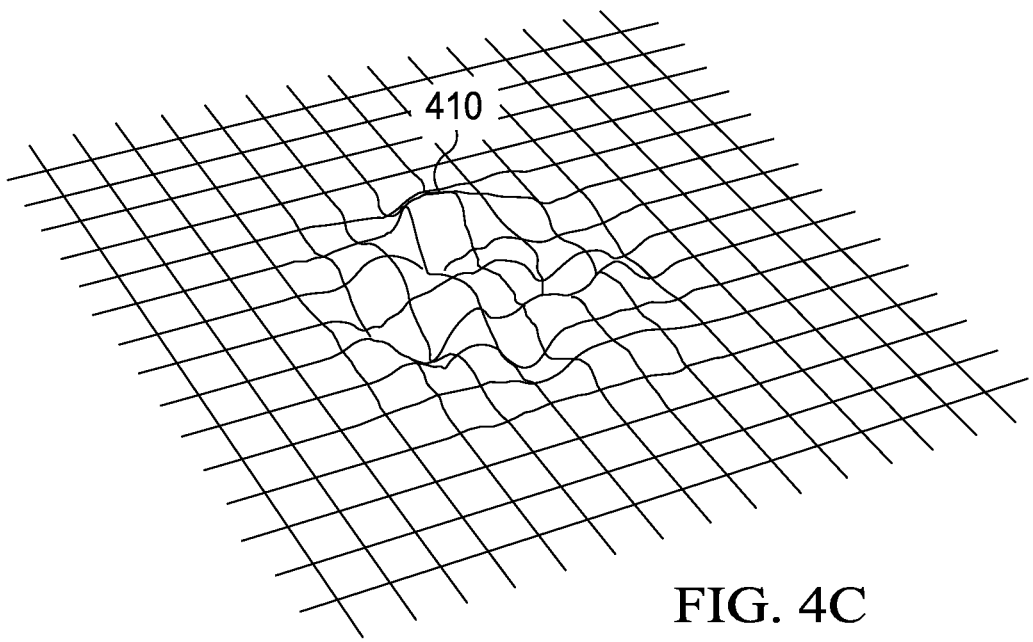

Referring to FIG. 4A, there is a diagram of an array of 19 magnets 400 positioned in accordance with an exemplary code to produce an exemplary magnetic field emission structure 402 and another array of 19 magnets 404 which is used to produce a mirror image magnetic field emission structure 406. In this example, the exemplary code was intended to produce the first magnetic field emission structure 402 to have a first stronger lock when aligned with its mirror image magnetic field emission structure 406 and a second weaker lock when it is rotated 90° relative to its mirror image magnetic field emission structure 406. FIG. 4B depicts a spatial force function 408 of the magnetic field emission structure 402 interacting with its mirror image magnetic field emission structure 406 to produce the first stronger lock. As can be seen, the spatial force function 408 has a peak which occurs when the two magnetic field emission structures 402 and 406 are substantially aligned. FIG. 4C depicts a spatial force function 410 of the magnetic field emission structure 402 interacting with its mirror magnetic field emission structure 406 after being rotated 90°. As can be seen, the spatial force function 410 has a smaller peak which occurs when the two magnetic field emission structures 402 and 406 are substantially aligned but one structure is rotated 90°. If the two magnetic field emission structures 402 and 406 are in other positions then they could be easily separated.

Figure 5:
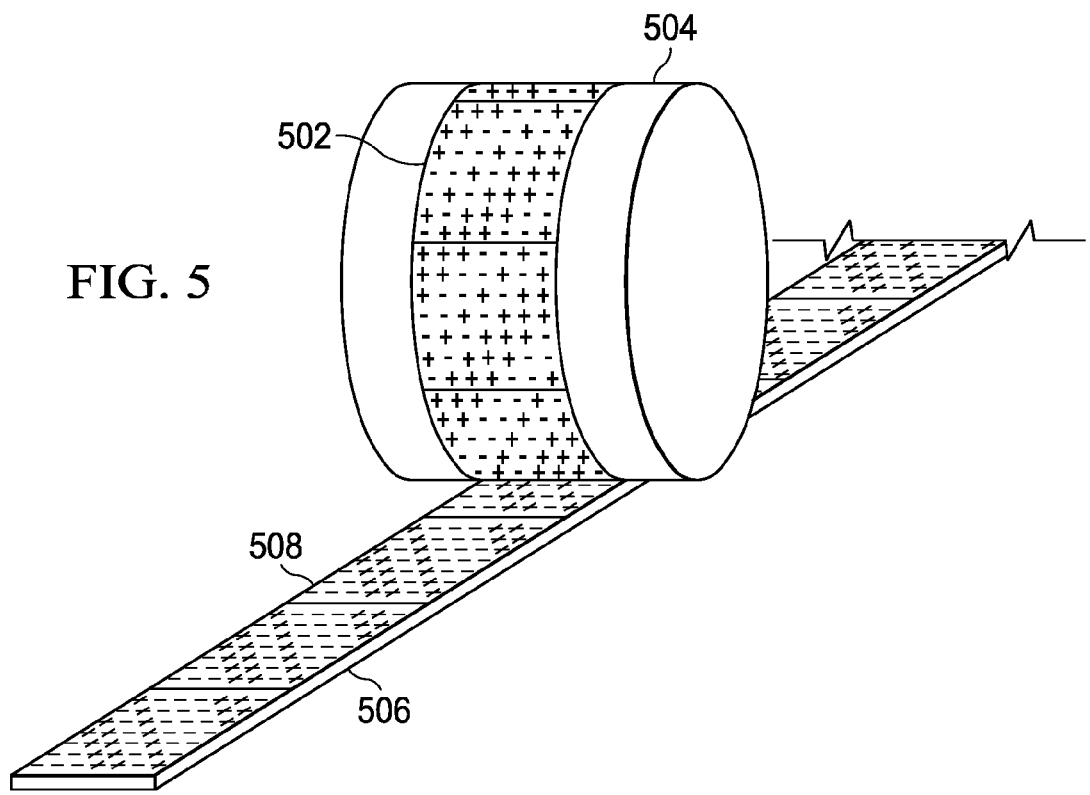

Referring to FIG. 5, there is a diagram depicting a correlating magnet surface 502 being wrapped back on itself on a cylinder 504 (or disc 504, wheel 504) and a conveyor belt/tracked structure 506 having located thereon a mirror image correlating magnet surface 508. In this case, the cylinder 504 can be turned clockwise or counter-clockwise by some force so as to roll along the conveyor belt/tracked structure 506. The fixed magnetic field emission structures 502 and 508 provide a traction and gripping (i.e., holding) force as the cylinder 504 is turned by some other mechanism (e.g., a motor). The gripping force would remain substantially constant as the cylinder 504 moved down the conveyor belt/tracked structure 506 independent of friction or gravity and could therefore be used to move an object about a track that moved up a wall, across a ceiling, or in any other desired direction within the limits of the gravitational force (as a function of the weight of the object) overcoming the spatial force of the aligning magnetic field emission structures 502 and 508. If desired, this cylinder 504 (or other rotary devices) can also be operated against other rotary correlating surfaces to provide a gear-like operation. Since the hold-down force equals the traction force, these gears can be loosely connected and still give positive, non-slipping rotational accuracy. Plus, the magnetic field emission structures 502 and 508 can have surfaces which are perfectly smooth and still provide positive, non-slip traction. In contrast to legacy friction-based wheels, the traction force provided by the magnetic field emission structures 502 and 508 is largely independent of the friction forces between the traction wheel and the traction surface and can be employed with low friction surfaces. Devices moving about based on magnetic traction can be operated independently of gravity for example in weightless conditions including space, underwater, vertical surfaces and even upside down.

Figure 6:
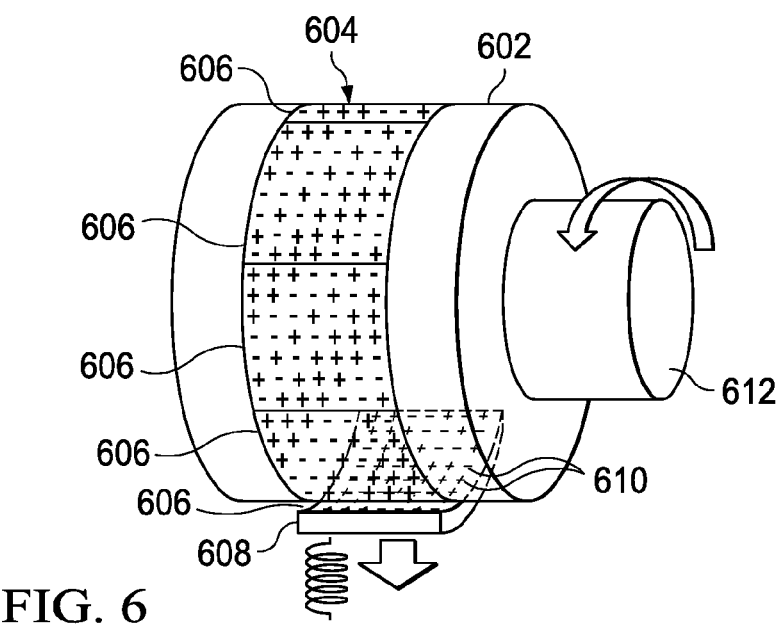

Referring to FIG. 6, there is a diagram depicting an exemplary cylinder 602 having wrapped thereon a first magnetic field emission structure 604 with a code pattern 606 that is repeated six times around the outside of the cylinder 602. Beneath the cylinder 602 is an object 608 having a curved surface with a slightly larger curvature than the cylinder 602 and having a second magnetic field emission structure 610 that is also coded using the code pattern 606. Assume, the cylinder 602 is turned at a rotational rate of 1 rotation per second by shaft 612. Thus, as the cylinder 602 turns, six times a second the first magnetic field emission structure 604 on the cylinder 602 aligns with the second magnetic field emission structure 610 on the object 608 causing the object 608 to be repelled (i.e., moved downward) by the peak spatial force function of the two magnetic field emission structures 604 and 610. Similarly, had the second magnetic field emission structure 610 been coded using a code pattern that mirrored code pattern 606, then 6 times a second the first magnetic field emission structure 604 of the cylinder 602 would align with the second magnetic field emission structure 610 of the object 608 causing the object 608 to be attracted (i.e., moved upward) by the peak spatial force function of the two magnetic field emission structures 604 and 610. Thus, the movement of the cylinder 602 and the corresponding first magnetic field emission structure 604 can be used to control the movement of the object 608 having its corresponding second magnetic field emission structure 610. One skilled in the art will recognize that the cylinder 602 may be connected to a shaft 612 which may be turned as a result of wind turning a windmill, a water wheel or turbine, ocean wave movement, and other methods whereby movement of the object 608 can result from some source of energy scavenging. As such, correlated magnets enables the spatial forces between objects to be precisely controlled in accordance with their movement and also enables the movement of objects to be precisely controlled in accordance with such spatial forces.

In the above examples, the correlated magnets 304, 306, 402, 406, 502, 508, 604 and 610 overcome the normal 'magnet orientation' behavior with the aid of a holding mechanism such as an adhesive, a screw, a bolt & nut, etc. . . . In other cases, magnets of the same magnetic field emission structure could be sparsely separated from other magnets (e.g., in a sparse array) such that the magnetic forces of the individual magnets do not substantially interact, in which case the polarity of individual magnets can be varied in accordance with a code without requiring a holding mechanism to prevent magnetic forces from 'flipping' a magnet. However, magnets are typically close enough to one another such that their magnetic forces would substantially interact to cause at least one of them to 'flip' so that their moment vectors align but these magnets can be made to remain in a desired orientation by use of a holding mechanism such as an adhesive, a screw, a bolt & nut, etc. . . . As such, correlated magnets often utilize some sort of holding mechanism to form different magnetic field emission structures which can be used in a wide-variety of applications like, for example, a drill head assembly, a hole cutting tool assembly, a machine press tool, a gripping apparatus, a slip ring mechanism, and a structural assembly. Moreover, magnetic field emission structures may include a turning mechanism, a tool insertion slot, alignment marks, a latch mechanism, a pivot mechanism, a swivel mechanism, or a lever.

C. Correlated Electromagnetics

Correlated magnets can entail the use of electromagnets which is a type of magnet in which the magnetic field is produced by the flow of an electric current. The polarity of the magnetic field is determined by the direction of the electric current and the magnetic field disappears when the current ceases. Following are a couple of examples in which arrays of electromagnets are used to produce a first magnetic field emission structure that is moved over time relative to a second magnetic field emission structure which is associated with an object thereby causing the object to move.

Figure 7:
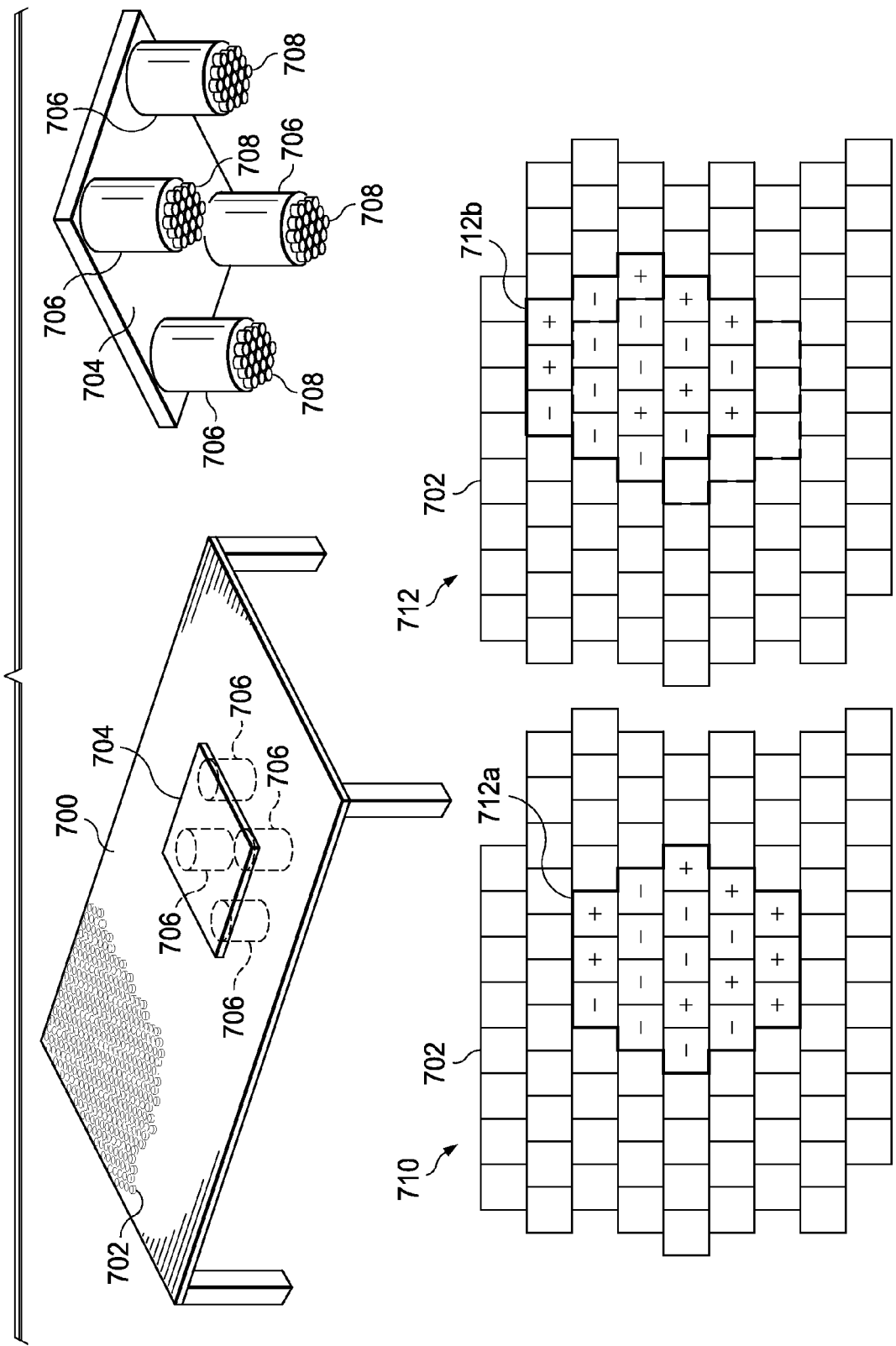

Referring to FIG. 7, there are several diagrams used to explain a 2-D correlated electromagnetics example in which there is a table 700 having a two-dimensional electromagnetic array 702 (first magnetic field emission structure 702) beneath its surface and a movement platform 704 having at least one table contact member 706. In this example, the movement platform 704 is shown having four table contact members 706 each having a magnetic field emission structure 708 (second magnetic field emission structures 708) that would be attracted by the electromagnetic array 702. Computerized control of the states of individual electromagnets of the electromagnet array 702 determines whether they are on or off and determines their polarity. A first example 710 depicts states of the electromagnetic array 702 configured to cause one of the table contact members 706 to attract to a subset 712a of the electromagnets within the magnetic field emission structure 702. A second example 712 depicts different states of the electromagnetic array 702 configured to cause the one table contact member 706 to be attracted (i.e., move) to a different subset 712b of the electromagnets within the field emission structure 702. Per the two examples, one skilled in the art can recognize that the table contact member(s) 706 can be moved about table 700 by varying the states of the electromagnets of the electromagnetic array 702.

Figure 8:
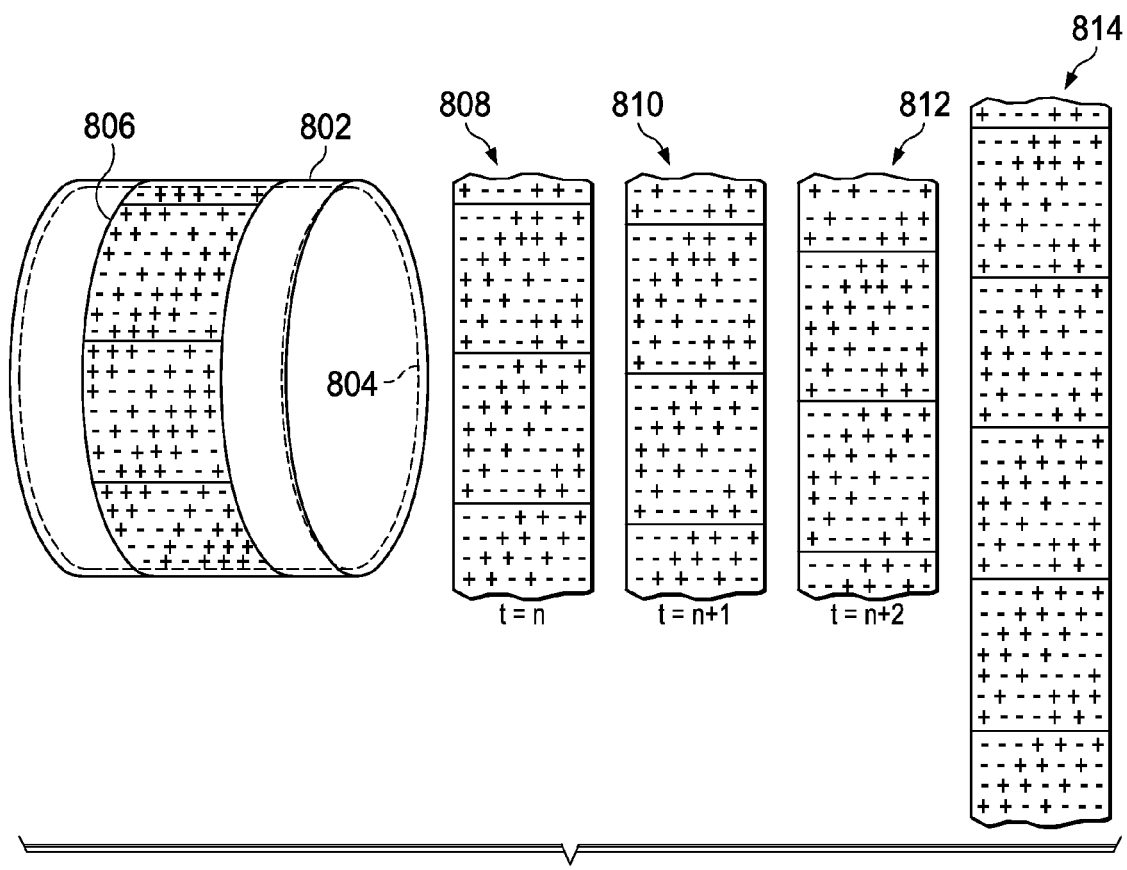

Referring to FIG. 8, there are several diagrams used to explain a 3-D correlated electromagnetics example where there is a first cylinder 802 which is slightly larger than a second cylinder 804 that is contained inside the first cylinder 802. A magnetic field emission structure 806 is placed around the first cylinder 802 (or optionally around the second cylinder 804). An array of electromagnets (not shown) is associated with the second cylinder 804 (or optionally the first cylinder 802) and their states are controlled to create a moving mirror image magnetic field emission structure to which the magnetic field emission structure 806 is attracted so as to cause the first cylinder 802 (or optionally the second cylinder 804) to rotate relative to the second cylinder 804 (or optionally the first cylinder 802). The magnetic field emission structures 808, 810, and 812 produced by the electromagnetic array on the second cylinder 804 at time t=n, t=n+1, and t=n+2, show a pattern mirroring that of the magnetic field emission structure 806 around the first cylinder 802. The pattern is shown moving downward in time so as to cause the first cylinder 802 to rotate counterclockwise. As such, the speed and direction of movement of the first cylinder 802 (or the second cylinder 804) can be controlled via state changes of the electromagnets making up the electromagnetic array. Also depicted in FIG. 8 there is an electromagnetic array 814 that corresponds to a track that can be placed on a surface such that a moving mirror image magnetic field emission structure can be used to move the first cylinder 802 backward or forward on the track using the same code shift approach shown with magnetic field emission structures 808, 810, and 812 (compare to FIG. 5).

Figure 9:
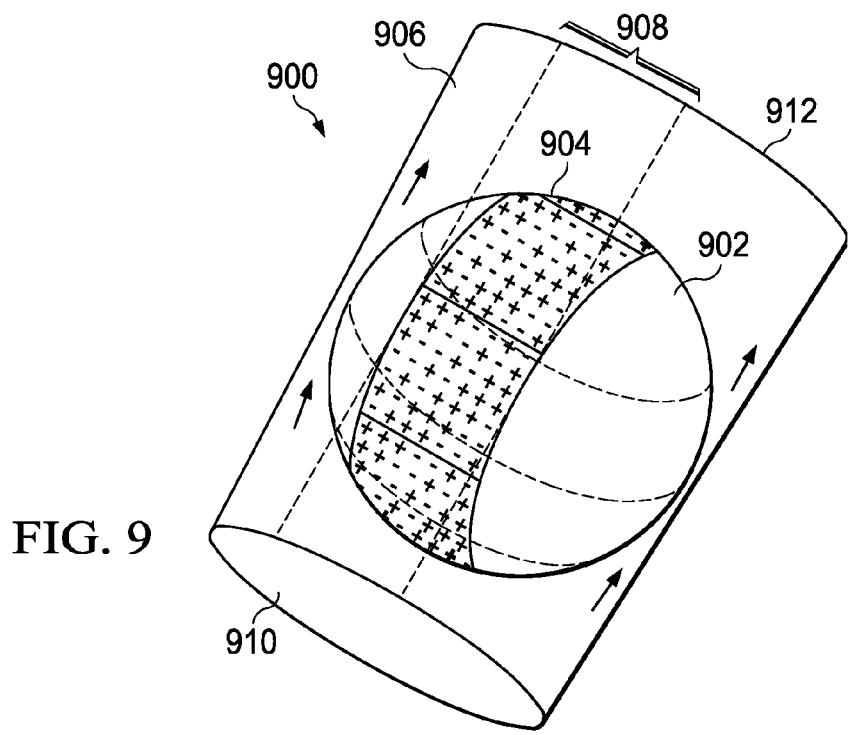

Referring to FIG. 9, there is illustrated an exemplary valve mechanism 900 based upon a sphere 902 (having a magnetic field emission structure 904 wrapped thereon) which is located in a cylinder 906 (having an electromagnetic field emission structure 908 located thereon). In this example, the electromagnetic field emission structure 908 can be varied to move the sphere 902 upward or downward in the cylinder 906 which has a first opening 910 with a circumference less than or equal to that of the sphere 902 and a second opening 912 having a circumference greater than the sphere 902. This configuration is desirable since one can control the movement of the sphere 902 within the cylinder 906 to control the flow rate of a gas or liquid through the valve mechanism 900. Similarly, the valve mechanism 900 can be used as a pressure control valve. Furthermore, the ability to move an object within another object having a decreasing size enables various types of sealing mechanisms that can be used for the sealing of windows, refrigerators, freezers, food storage containers, boat hatches, submarine hatches, etc., where the amount of sealing force can be precisely controlled. One skilled in the art will recognize that many different types of seal mechanisms that include gaskets, o-rings, and the like can be employed with the use of the correlated magnets. Plus, one skilled in the art will recognize that the magnetic field emission structures can have an array of sources including, for example, a permanent magnet, an electromagnet, an electro-permanent magnet, an electret, a magnetized ferromagnetic material, a portion of a magnetized ferromagnetic material, a soft magnetic material, or a superconductive magnetic material, some combination thereof, and so forth.

II. Multilevel Correlated Magnetic Technology

Material presented herein describes a multilevel correlated magnetic system and method for using the multilevel correlated magnetic system. It involves multilevel magnetic techniques related to those described in U.S. patent application Ser. No. 12/476,952, filed Jun. 2, 2009, and U.S. Provisional Patent Application 61/277,214, titled "A System and Method for Contactless Attachment of Two Objects", filed Sep. 22, 2009, and U.S. Provisional Patent Application 61/278,900, titled "A System and Method for Contactless Attachment of Two Objects", filed Sep. 30, 2009, and U.S. Provisional Patent Application 61/278,767 titled "A System and Method for Contactless Attachment of Two Objects", filed Oct. 9, 2009, U.S. Provisional Patent Application 61/280,094, titled "A System and Method for Producing Multi-level Magnetic Fields", filed Oct. 16, 2009, U.S. Provisional Patent Application 61/281,160, titled "A System and Method for Producing Multi-level Magnetic Fields", filed Nov. 13, 2009, U.S. Provisional Patent Application 61/283,780, titled "A System and Method for Producing Multi-level Magnetic Fields", filed Dec. 9, 2009, U.S. Provisional Patent Application 61/284, 385, titled "A System and Method for Producing Multi-level Magnetic Fields", filed Dec. 17, 2009, and U.S. Provisional Patent Application 61/342,988, titled "A System and Method for Producing Multi-level Magnetic Fields", filed Apr. 22, 2010, which are all incorporated herein by reference in their entirety. Such systems and methods described in U.S. patent application Ser. No. 12/322,561, filed Feb. 4, 2009, U.S. patent application Ser. Nos. 12/479,074, 12/478,889, 12/478, 939, 12/478,911, 12/478,950, 12/478,969, 12/479,013, 12/479,073, 12/479,106, filed Jun. 5, 2009, U.S. patent application Ser. Nos. 12/479,818, 12/479,820, 12/479,832, and 12/479,832, file Jun. 7, 2009, U.S. patent application Ser. No. 12/494,064, filed Jun. 29, 2009, U.S. patent application Ser. No. 12/495,462, filed Jun. 30, 2009, U.S. patent application Ser. No. 12/496,463, filed Jul. 1, 2009, U.S. patent application Ser. No. 12/499,039, filed Jul. 7, 2009, U.S. patent application Ser. No. 12/501,425, filed Jul. 11, 2009, and U.S. patent application Ser. No. 12/507,015, filed Jul. 21, 2009 are all incorporated by reference herein in their entirety.

A. Introduction to Multilevel Correlated Magnetism

In accordance with one embodiment, the multilevel correlated magnetic system includes a first correlated magnetic structure and a second correlated magnetic structure each having a first portion comprising a plurality of complementary coded magnetic sources and each having a second portion comprising one or more magnetic sources intended to only repel or to only attract. The magnetic sources employed may be permanent magnetic sources, electromagnets, electro-permanent magnets, or combinations thereof. In accordance with another embodiment, both portions of the two correlated magnetic structures may comprise a plurality of complementary coded magnetic sources. For both embodiments, when the first correlated magnetic structure is a certain separation distance apart from the second correlated magnetic structure (i.e., at a transition distance), the multilevel correlated magnetic system transitions from either a repel mode to an attract mode or from an attract mode to a repel mode. Thus, the multilevel correlated magnetic system has a repel level and an attract level.

The first portion of each of the two correlated magnetic structures, which has a plurality of coded magnetic sources, can be described as being a short range portion, and the second portion of each of the two correlated magnetic structures can be described as being a long range portion, where the short range portion and the long range portion produce opposing forces that effectively work against each other. The short range portion produces a magnetic field having a higher near field density and a lesser far field density than the magnetic field produced by the long range portion. Because of these near field and far field density differences, the short range portion produces a higher peak force than the long range portion yet has a faster field extinction rate such that the short range portion is stronger than the long range portion at separation distances less than the transition distance and weaker than the long range portion at separation distance greater than the transition distance, where the forces produced by two portions cancel each other when the two correlated magnetic structures are separated by a distance equal to the transition distance. Thus, the first and second portions of the two correlated magnetic structures produce two opposite polarity force curves corresponding to the attractive force versus the separation distance between the two correlated magnetic structures and the repulsive force versus the separation distance between the two correlated magnetic structures.

In accordance with another embodiment, the first (short range) portions of the two correlated magnetic structures produce an attractive force and the second (long range) portions of the two correlated magnetic structures produce a repulsive force. With this arrangement, as the two complementary structures are brought near each other they initially repel each other until they are at a transition distance, where they neither attract nor repel, and then when they are brought together closer than the transition distance they begin to attract strongly, behaving as a "snap." With this embodiment, the attraction curve is shorter range but its peak force is stronger than the longer range repulsive force curve.

In accordance with still another embodiment, the polarities of the force curves are reversed with the shorter range, but stronger peak force curve being repulsive and the longer range but weaker peak force curve being attractive. With this arrangement, the two structures attract each other beyond the transition distance and repel each other when within the transition distance, which results in the two correlated magnetic structures achieving a contactless attachment where they are locked in relative position and in relative alignment yet they are separated by the transition distance.

In one embodiment, the short range portion and the long range portion of the multi-level correlated magnetic system could both produce attractive forces to produce correlated magnetic structures having both a strong near field attractive force and a strong far field attractive force, where the transition point corresponds to a point at which the two attractive force curves cross. Similarly, the short range portion and the long range portion could both produce repulsive forces to produce correlated magnetic structures having both a strong near field repulsive force and a strong far field repulsive force, where the transition point corresponds to a point at which the two repulsive force curves cross.

In accordance with a further embodiment, the two correlated magnetic field structures are attached to one or more movement constraining structures. A movement constraining structure may only allow motion of the two correlated magnetic structures to or away from each other where the two correlated magnetic structures are always parallel to each other. The movement constraining structure may not allow twisting (or rotation) of either correlated magnetic field structure. Similarly, the movement constraining structure may not allow sideways motion. Alternatively, one or more such movement constraining structures may have variable states whereby movement of the two correlated magnetic structures is constrained in some manner while in a first state but not constrained or constrained differently during another state. For example, the movement constraining structure may not allow rotation of either correlated magnetic structure while in a first state but allow rotation of one or both of the correlated magnetic structures while in another state.

One embodiment comprises a circular correlated magnetic structure having an annular ring of single polarity that surrounds a circular area within which resides an ensemble of coded magnetic sources. Under one arrangement corresponding to the snap behavior, the ensemble of coded magnetic sources would generate the shorter range, more powerful peak attractive force curve and the annular ring would generate the longer range, weaker peak repulsive force curve. Under a second arrangement corresponding to the contactless attachment behavior, these roles would be reversed.

In another embodiment, the configuration of the circular correlated magnetic structure would be reversed, with the coded ensemble of coded magnetic sources occupying the outer annular ring and the inner circle being of a single polarity. Under one arrangement corresponding to the snap behavior, the ensemble of coded magnetic sources present in the outer annular ring would generate the shorter range, more powerful peak attractive force curve and the inner circle would generate the longer range, weaker peak repulsive force curve. Under a second arrangement corresponding to the contactless attachment behavior, these roles would be reversed.

In a further embodiment, an additional modulating element that produces an additional magnetic field can be used to increase or decrease the transition distance of a multilevel magnetic field system 1000.

If one or more of the first portion and the second portion is implemented with electromagnets or electro-permanent magnets then a control system could be used to vary either the short range force curve or the long range force curve.

The spatial force functions described herein can be designed to allow movement (e.g., rotation) of at least one of the correlated magnetic structures of the multilevel correlated magnetic system to vary either the short range force curve or the long range force curve.

Figure 10:
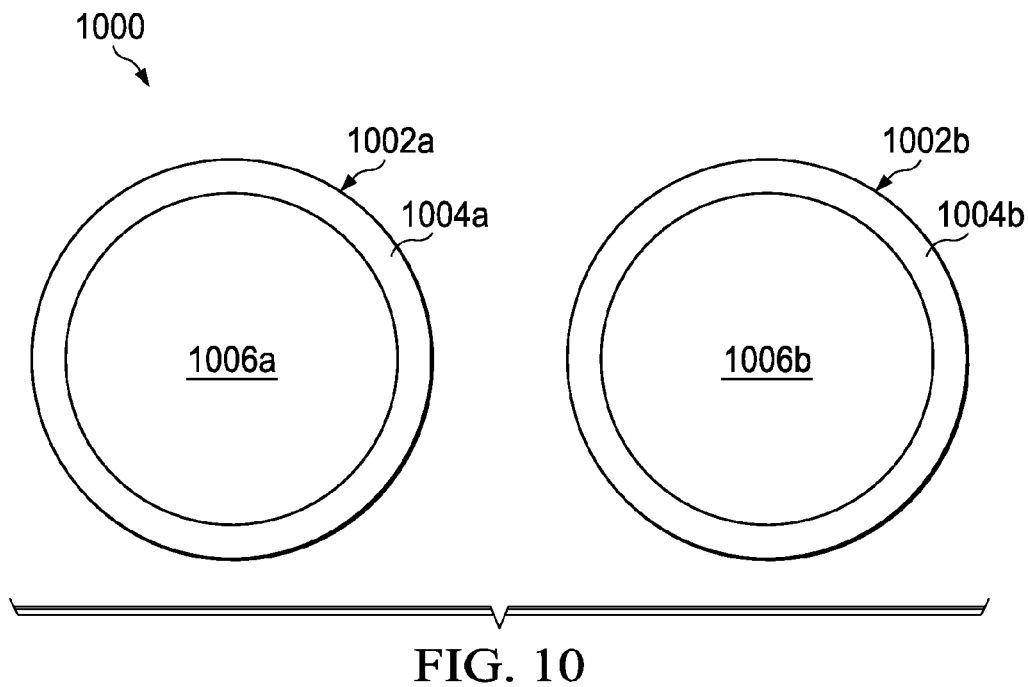
FIG. 10 depicts an example multilevel correlated magnetic structure or system.

Referring to FIG. 10, there is shown an exemplary multilevel correlated magnetic system 1000 that comprises a first correlated magnetic structure 1002*a* and a second magnetic structure 1002*b*. The first correlated magnetic structure 1002*a* is divided into an outer portion 1004*a* and an inner portion 1006*a*. Similarly, the second correlated magnetic structure 1002*b* is divided into an outer portion 1004*b* and an inner portion 1006*b*. The outer portion 1004*a* of the first correlated magnetic structure 1002*a* and the outer portion 1004*b* of the second correlated magnetic structure 1002*b* each have one or more magnetic sources having positions and polarities that are coded in accordance with a first code corresponding to a first spatial force function. The inner portion 1006*a* of the first correlated magnetic structure 1002*a* and the inner portion 1006*b* of the second correlated magnetic structure 1002*b* each have one or more magnetic sources having positions and polarities that are coded in accordance with a second code corresponding to a second spatial force function.

Under one arrangement, the outer portions 1004*a*, 1004*b* each comprise a plurality of magnetic sources that are complementary coded so that they will produce an attractive force when their complementary (i.e., opposite polarity) source pairs are substantially aligned and which have a sharp attractive force versus separation distance (or throw) curve, and the inner portions 1006*a*, 1006*b* also comprise a plurality of magnetic sources that are anti-complementary coded such that they produce a repulsive force when their anti-complementary (i.e., same polarity) source pairs are substantially aligned but have a broader, less sharp, repulsive force versus separation distance (or throw) curve. As such, when brought into proximity with each other and substantially aligned the first and second correlated magnetic field structures 1002*a*, 1002*b* will have a snap behavior whereby their spatial forces transition from a repulsive force to an attractive force. Alternatively, the inner portions 1006*a*, 1006*b* could each comprise multiple magnetic sources having the same polarity orientation or could each be implemented using just one magnetic source in which case a similar snap behavior would be produced.

Under another arrangement, the outer portions 1004*a*, 1004*b* each comprise a plurality of magnetic sources that are anti-complementary coded so that they will produce a repulsive force when their anti-complementary (i.e., same polarity) source pairs are substantially aligned and which have a sharp repulsive force versus separation distance (or throw) curve, and the inner portions 1006*a*, 1006*b* also comprise a plurality of magnetic sources that are complementary coded such that they produce an attractive force when their complementary (i.e., opposite polarity) source pairs are substantially aligned but have a broader, less sharp, attractive force versus separation distance (or throw) curve. As such, when brought into proximity with each other and substantially aligned the first and second correlated magnetic field structures 1002*a*, 1002*b* will have a contactless attachment behavior where they achieve equilibrium at a transition distance where their spatial forces transition from an attractive force to a repulsive force. Alternatively, the outer portions 1004*a*, 1004*b* could each comprise multiple magnetic sources having the same polarity orientation or could each be implemented using just one magnetic source in which case a similar contactless attachment behavior would be produced.

For arrangements where both the outer portions 1004*a*, 1004*b* and the inner portions 1006*a*, 1006*b* comprise a plurality of coded magnetic sources, there can be greater control over their response to movement due to the additional correlation. For example, when twisting one correlated magnetic structure relative to the other, the long range portion can be made to de-correlate at the same or similar rate as the short rate portion thereby maintaining a higher accuracy on the lock position. Alternatively, the multilevel correlated magnetic system 1000 may use a special configuration of non-coded magnetic sources, as is discussed in detail in U.S. Nonprovisional patent application Ser. No. 12/885,450 (filed Sep. 18, 2010) entitled "MULTILEVEL CORRELATED MAGNETIC SYSTEM AND METHOD FOR USING SAME".

Figure 11:
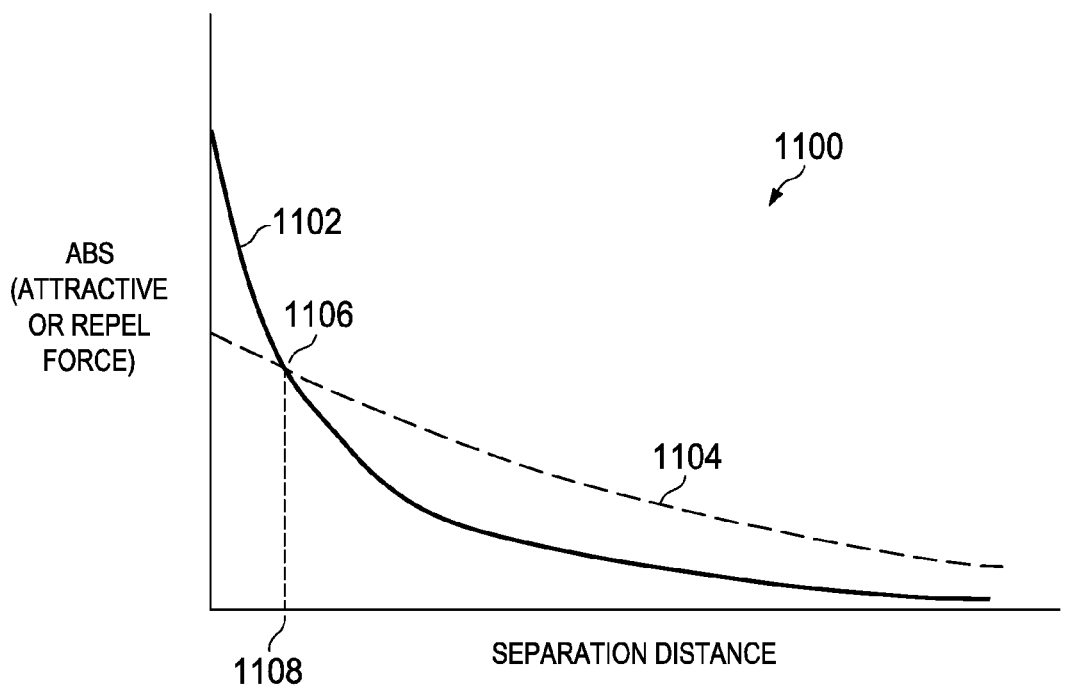
FIG. 11 depicts an example multilevel transition distance determination plot.

FIG. 11 depicts a multilevel transition distance determination plot 1100, which plots the absolute value of a first force versus separation distance curve 1102 corresponding to the short range portions of the two correlated magnetic structures 1002*a*, 1002*b* making up the multilevel magnetic field structure 1000, and the absolute value of a second force versus separation distance curve 1104 corresponding to the long range portions of the two correlated magnetic structures 1002*a*, 1002*b*. The two curves cross at an transition point 1106, which while the two correlated magnetic structures 1002*a*, 1002*b* approach each other corresponds to a transition distance 1108 at which the two correlated magnetic structures 1002*a*, 1002*b* will transition from a repel mode to an attract mode or from an attract mode to a repel mode depending on whether the short range portions are configured to attract and the long range portions are configured to repel or vice versa.

B. Example Implementation Arrangements for Multilevel Magnetism

Figure 12:
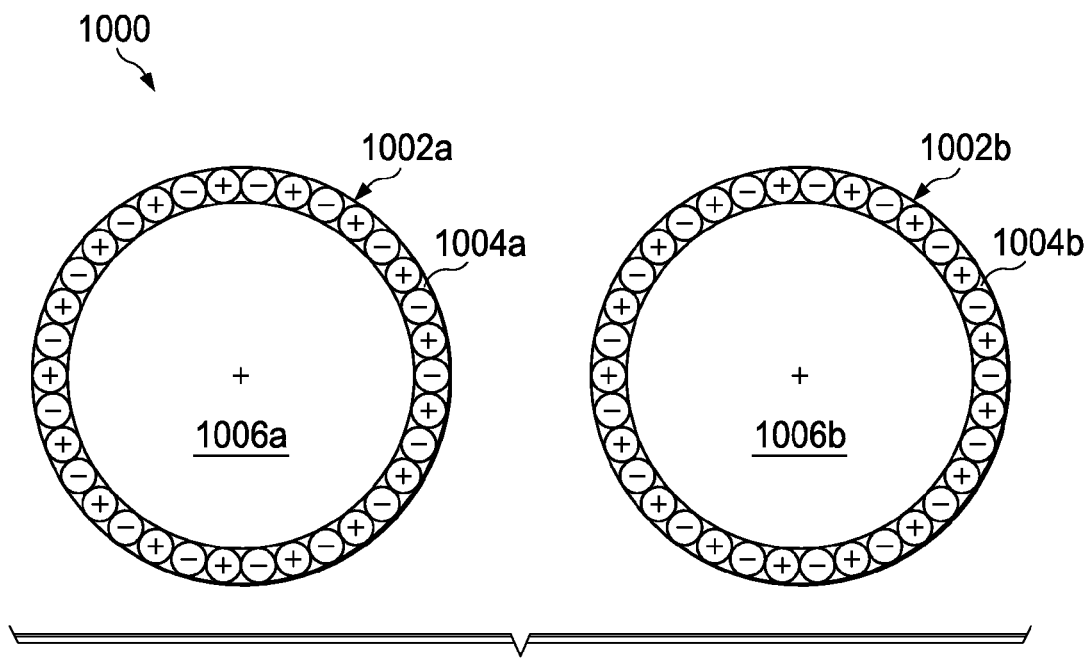
FIG. 12 depicts an example multilevel correlated magnetic system.

FIG. 12 depicts an exemplary embodiment of a multilevel magnetic field structure 1000 having first and second correlated magnetic structures 1002*a*, 1002*b* that each have outer portions 1004*a*, 1004*b* having magnetic sources in an alternating positive-negative pattern and each have inner portions 1006*a*, 1006*b* having one positive magnetic source. As such, the first and second magnetic field structures 1002*a*, 1002*b* are substantially identical. Alternatively, the coding of the two correlated magnetic structures 1002*a*, 1002*b* could be complementary yet not in an alternating positive-negative pattern in which case the two structures 1002*a*, 1002*b* would not be identical.

Figure 13A:
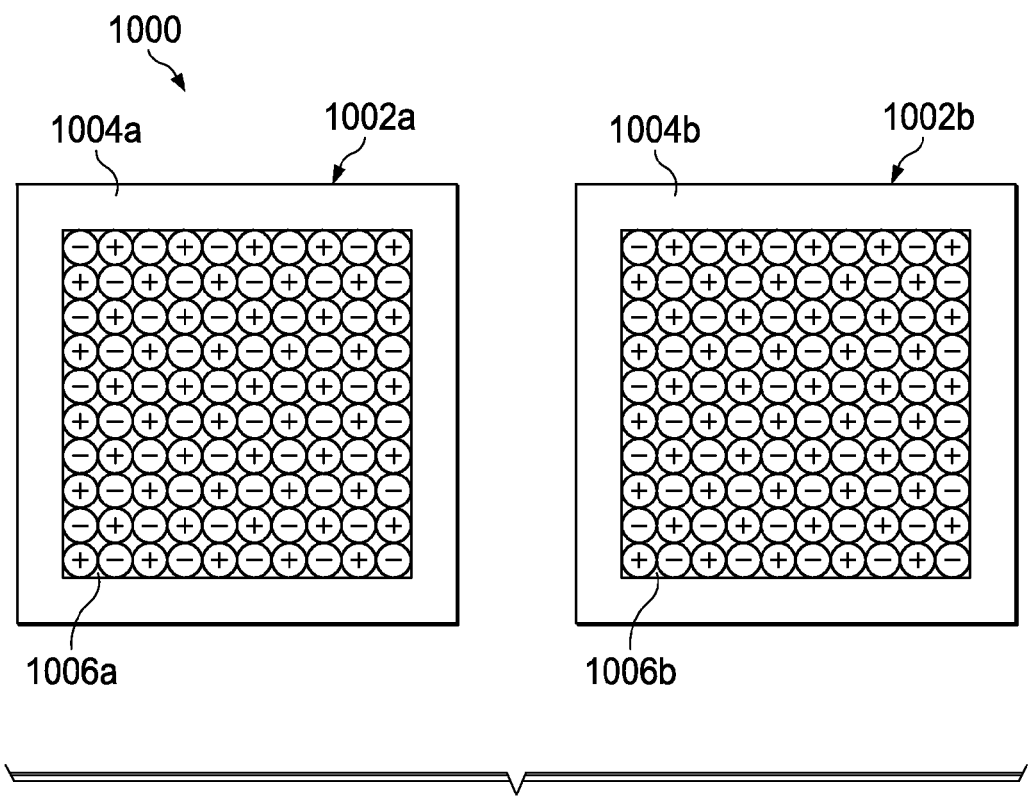
FIG. 13A depicts an example multilevel correlated magnetic system.

FIG. 13A depicts yet another embodiment of a multilevel magnetic field structure 1000 having first and second correlated magnetic structures 1002*a*, 1002*b* that each have inner portions 1006*a*, 1006*b* having magnetic sources in an alternating positive-negative pattern and each have outer portions 1004*a*, 1004*b* having one negative magnetic source. As such, the first and second magnetic field structures 1002*a*, 1002*b* are identical but can be combined to produce a short range attractive force and a long range repulsive force.

Figure 13B:
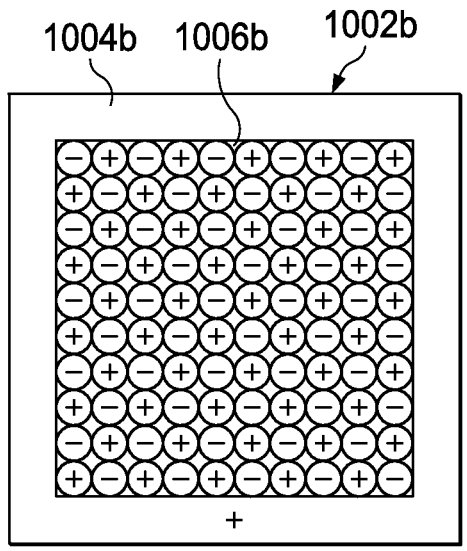
FIGS. 13B and 13C depict alternative example correlated magnetic structures.

FIG. 13B depicts an alternative to the correlated magnetic structure 1002*b* of FIG. 13A which is almost the same except the outer portion 1004*b* has a positive polarity. The two correlated magnetic structures 1002a, 1002b can be combined to produce a short range repulsive force and a long range attractive force.

Figure 13C:
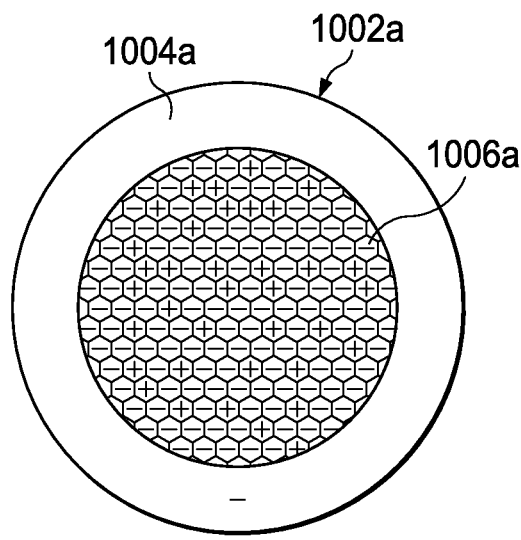

FIG. 13C depicts yet another alternative to the correlated magnetic structure 1002a of FIG. 13A, where the correlated magnetic structure 1002a is circular and the coding of the inner portion 1006a does not correspond to an alternating positive-negative pattern. To complete the multilevel magnetic field system 1000, a second circular correlated magnetic structure 1002b would be used which has an inner portion 1006b having complementary coding and which has a outer portion 1006b having the same polarity as the outer portion 1006a of the first circular correlated magnetic field structure 1002a.

C. Additional Example Embodiments for Multilevel Correlated Magnetism

In one aspect, certain embodiments may provide a multi-level correlated magnetic system, comprising: (a) a first correlated magnetic structure including a first portion which has a plurality of coded magnetic sources and a second portion which has one or more magnetic sources; (b) a second correlated magnetic structure including a first portion which has a plurality of complementary coded magnetic sources and a second portion which has one or more magnetic sources; (c) wherein the first correlated magnetic structure is aligned with the second correlated magnetic structure such that the first portions and the second portions are respectively located across from one another; and (d) wherein the first portions each produce a higher peak force than the second portions while the first portions each have a faster field extinction rate than the second portions such that (1) the first portions produce a magnetic force that is cancelled by a magnetic force produced by the second portions when the first and second correlated magnetic structures are separated by a distance equal to a transition distance, (2) the first portions produce a stronger magnetic force than the magnetic force produced by the second portions when the first and second correlated magnetic structures have a separation distance from one another that is less than the transition distance, and (3) the first portions have a weaker magnetic force than the magnetic force produced by second portions when the separation distance between the first and second correlated magnetic structures is greater than the transition distance.

In another aspect, certain embodiments may provide a momentary snap switch, comprising: (a) a snap multilevel correlated magnetic system having: (i) a first correlated magnetic structure including a first portion which has a plurality of coded magnetic sources and a second portion which has one or more magnetic sources; (ii) a second correlated magnetic structure including a first portion which has a plurality of complementary coded magnetic sources and a second portion which has one or more magnetic sources; and (iii) the first correlated magnetic structure is aligned with the second correlated magnetic structure such that the first portions and the second portions are respectively located across from one another; and (b) a repulsive device attached to the first correlated magnetic structure; (c) a first contact attached to the first correlated magnetic structure; (d) a second contact that contacts the first contact when the first correlated magnetic structure is a predetermined distance from the second correlated magnetic structure; and (e) a spacer to prevent the first correlated magnetic structure from completely contacting the second correlated magnetic structure.

In yet another aspect, certain embodiments may provide a cushioning device comprising: (a) a female component including a first correlated magnetic structure including a first portion which has a plurality of coded magnetic sources and a second portion which has one or more magnetic sources; and (b) a male component including a second correlated magnetic structure including a first portion which has a plurality of complementary coded magnetic sources and a second portion which has one or more magnetic sources; (c) the first correlated magnetic structure is aligned with the second correlated magnetic structure such that the first portions and the second portions are respectively located across from one another; (d) the female component is movably positioned over the male component; and (e) a spacer to prevent the first correlated magnetic structure from completely contacting the second correlated magnetic structure.

In still yet another aspect, certain embodiments may provide a device (e.g., exploding toy, trigger) comprising: (a) a first correlated magnetic structure including a first portion which has a plurality of coded magnetic sources and a second portion which has one or more magnetic sources; (b) a second correlated magnetic structure including a first portion which has a plurality of complementary coded magnetic sources and a second portion which has one or more magnetic sources; (c) the first correlated magnetic structure is aligned with the second correlated magnetic structure such that the first portions and the second portions are respectively located across from one another; (d) a spacer to prevent the first correlated magnetic structure from completely contacting the second correlated magnetic structure; and (e) the spacer is sized such that if the first and second correlated magnetic structures are attached to one another and then if a force is applied to the first correlated magnetic structure or to the second correlated magnetic structure then this causes the first and second correlated magnetic structures to repel each other.

In yet another aspect, certain embodiments may provide a multi-level magnetic system comprising: (a) a correlated magnetic structure including a first portion which has a plurality of coded magnetic sources and a second portion which has one or more magnetic sources; and (b) a magnetic structure having a first portion with a first polarity and a second portion with a second polarity.

In still yet another aspect, certain embodiments may provide a method for using a multilevel correlated magnetic system. The method comprising the steps of: (a) providing the multilevel correlated magnetic system having: (1) a first correlated magnetic structure including a first portion which has a plurality of coded magnetic sources and a second portion which has one or more magnetic sources; (2) a second correlated magnetic structure including a first portion which has a plurality of complementary coded magnetic sources and a second portion which has one or more magnetic sources; (b) aligning the first correlated magnetic structure with the second correlated magnetic structure such that the first portions and the second portions are respectively located across from one another; and (c) wherein the first portions each produce a higher peak force than the second portions while the first portions each have a faster field extinction rate than the second portions such that (1) the first portions produce a magnetic force that is cancelled by a magnetic force produced by the second portions when the first and second correlated magnetic structures are separated by a distance equal to a transition distance, (2) the first portions produce a stronger magnetic force than the magnetic force produced by the second portions when the first and second correlated magnetic structures have a separation distance from one another that is less than the transition distance, and (3) the first portions have a weaker magnetic force than the magnetic force produced by second portions when the separation distance between the first and second correlated magnetic structures is greater than the transition distance.

III. Electricity Generation/Scavenging

Figure 14A:
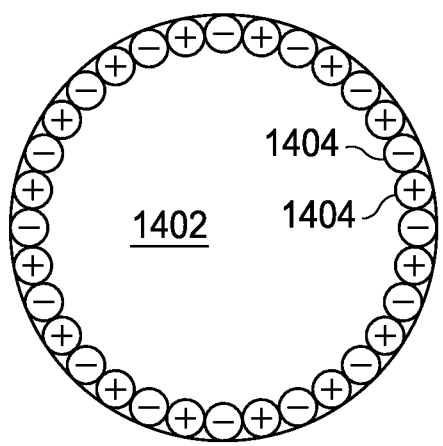
FIG. 14A depicts a round magnetizable material having been programmed in an example manner about its outer perimeter with alternating polarity maxels.
Figure 14B:
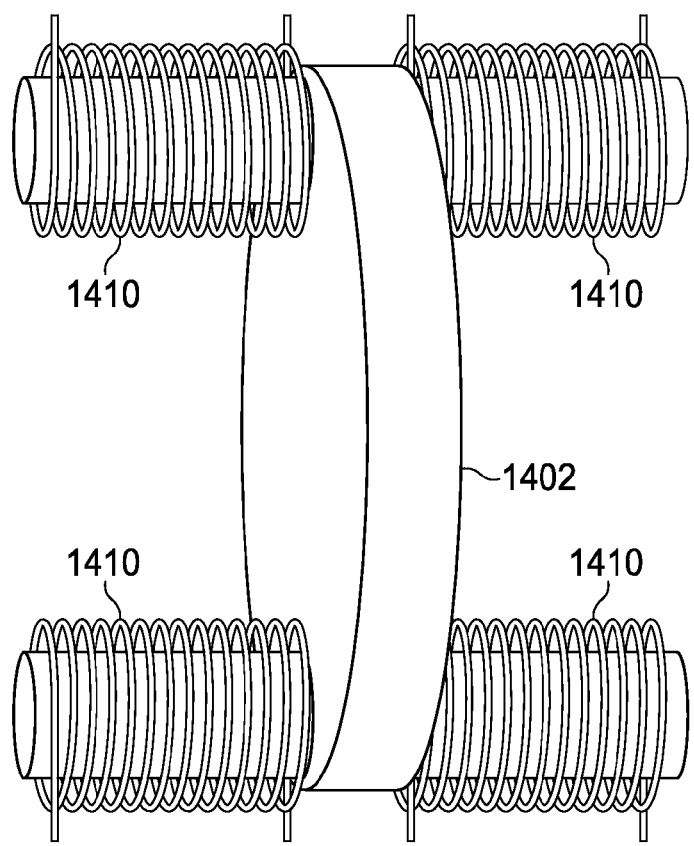
FIG. 14B depicts the round magnetizable material of FIG. 14A relative to example field coils.
Figure 14C:
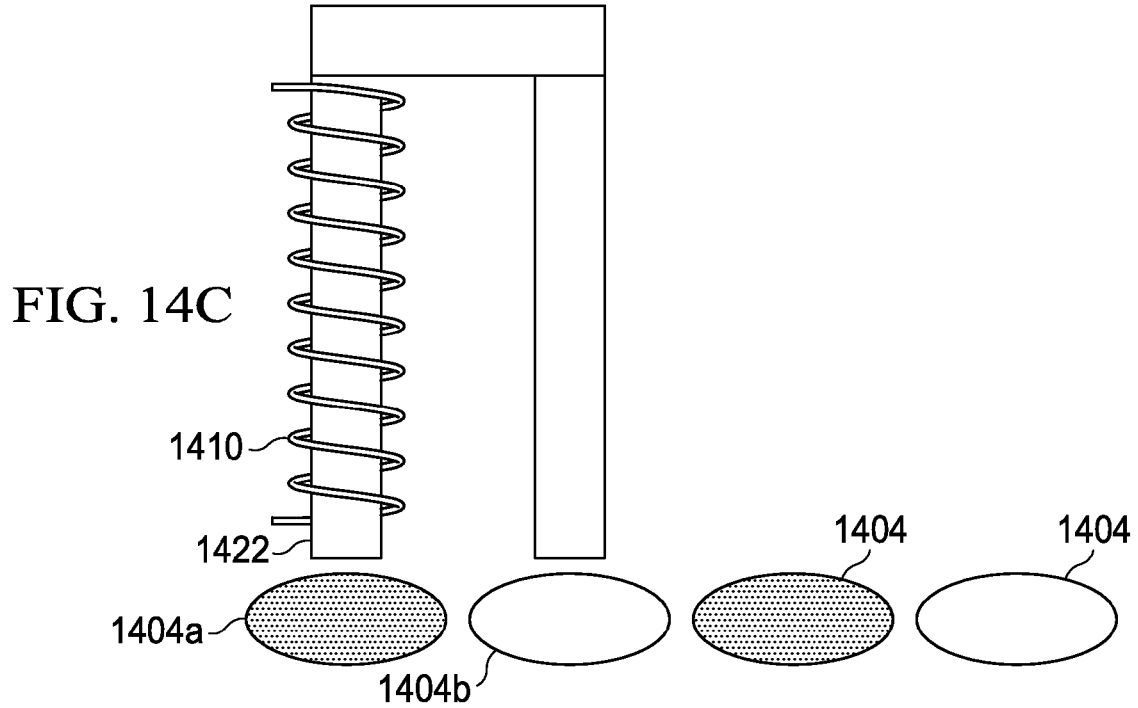
FIG. 14C depicts an example arrangement including a metal bar extending from a solenoid coil over a first magnetic source to an adjacent magnetic source.

Electricity may be generated and/or scavenged using, for example, at least one solenoid and one or more programmed magnets. FIGS. 14A-14C depict an example electrical generator apparatus that is capable of generating electricity based on the movement of at least one field coil with respect to at least one multi-pole magnetic structure (e.g., programmed magnet) printed into a magnetized material. Referring to FIG. 14A, multiple poles 1404, or maxels 1404, are shown as having been programmed around the perimeter of a round magnetizable material 1402. Maxels 1404 of one polarity are shown with plus ("+") indications, and maxels 1404 of an opposite polarity are shown with a minus ("−") indication. As such, whenever a field coil is moved relative to the magnetizable material and the maxels thereof, electricity may be generated. More specifically, electricity may be generated when a coil moves from a positive polarity maxel to a negative polarity maxel and/or vice versa.

FIG. 14B shows a programmed magnet 1402 in conjunction with one or more coils 1410. As shown, one or multiple coils 1410 may be used on either side of the programmed magnet 1402, where the programmed magnet 1402 can be moved or the coils 1410 may be moved or some combination thereof that involves moving both to some degree.

An example embodiment may include a monopole field coil where one pole of a solenoid is in proximity to alternating magnetic polarities provided by one side of a programmed magnetizable material. Yet another embodiment may include a second solenoid in proximity to alternating magnetic polarities provided by a second side of a programmed magnetizable material. A solenoid may comprise a coil of a conductor (e.g., wire(s), trace(s), plate(s), etc.) that surrounds a core. Such a core may comprise air, a metal, a vacuum, any combination thereof, and so forth. It should be noted that a magnetizable material may be patterned (e.g., printed, constructed, or otherwise formed) with maxels of differing polarities that do not necessarily alternate. Other patterns (e.g., codes generally, correlative codes, random placement, etc.) may alternatively be used.

FIG. 14C shows how a core 1422 (e.g., a metal) can extend from a coil 1410 next to a maxel 1404a to an adjoining maxel 1404b. Implementing such a coil may increase an amount of electricity being generated. In FIG. 14C, one polarity is depicted with white oval maxels, and an opposite polarity is depicted with shaded oval maxels. Another embodiment may include a magnetic circuit from a backside of a solenoid connecting to an adjacent maxel where the coil may extend between both of the two magnetic poles. Alternatively, two solenoids may be connected in series or in parallel between two such magnetic poles. Such methods may be employed with coils on either side of (or both sides of) a programmed magnet.

Although magnetizable material (e.g., of programmed magnet 1402) is shown in FIGS. 14A and 14B to be round, one skilled in the art will recognize that different shapes of magnetizable material and corresponding patterns of maxels can be employed as appropriate to accommodate different types of movement. Examples of such movements may include, but are not limited to, circular movement, partial circular movement, linear movement, or any definable, predictable, and/or random movement relative to maxels of a printed (or programmed) magnet.

For an example embodiment, generator devices may be designed to work with relatively slowly moving objects, for example a wind mill, without requiring the gears that are currently being used in order to achieve adequate power generation.

For certain example embodiments, an IQ (e.g., inphase (I) and in quadrature (Q)) power generation device may be built so as to include movement of field coils relative to a plurality of magnetic field sources (e.g., printed maxels, conventional magnets, combinations thereof, and so forth) where one or more pairs of field coils are each 90 degrees out of phase with respect to a spacing of the magnetic field sources.

In an example embodiment, an IQ motor may include a substantially equal number of solenoids (e.g., mono or bipolar solenoids) that are at least approximately equally-coupled to a load and that are positioned inphase (I) and in quadrature (Q) with respect to magnetic sources (e.g., the maxels or conventional magnets forming at least part of a patterned magnetic structure). The separate (e.g., I & Q) circuits may thus be driven with sine and cosine functions to produce relatively low-ripple torque (e.g., substantially constant torque).

In accordance with an example embodiment, a so-called slow-motor may be produced such that I and Q portions are excited with a 90 degree phase shift to permit "full" torque to be generated, for example from a stationary condition up to a highest speed at which it can work. This approach may provide directional control by selecting which coil (e.g., of any two coils) is sine and which is cosine. This approach may further provide relatively fine control over an angular position, whether rotating or stationary, at a resolution that is finer than the magnet pole spacing. One set (e.g., pair) of IQ coils is sufficient to be employed for such a motor, but multiple sets may instead be applied across a surface of a magnet structure in order to create a desired amount of torque for a given application.

In accordance with certain example embodiments, a spacing between magnetic sources (e.g., maxels) may be tuned for Inphase and Quadrature applications. For instance, a spacing between centers of adjacent magnetic sources may be approximately equal to a width of each such magnetic source. Hence, printing maxels may provide a finer level of control and/or precision as compared to using discrete magnetic sources. Furthermore, an inner set and an outer set may be implemented in which each is offset by approximately one-half a maxel. During relative movement between coil(s) and at least one magnetic structure, transitions between two maxels generate power, and it may do so for each pair of opposite poles. When generating power through a sine wave with one-quarter offset spacing, the resulting electrical power may be relatively constant because when one is going down, the other is going up.

Figure 14D:
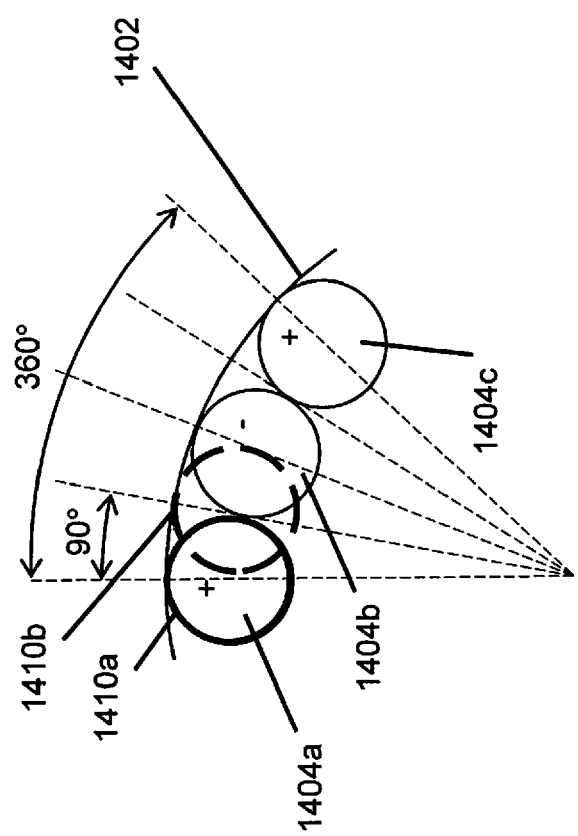
FIG. 14D depicts an exemplary programmed magnet with two coils that are 90 degrees out of phase with respect to the spacing of magnetic sources of the programmed magnet.

FIG. 14D depicts a portion of an exemplary round programmed magnet 1402 having three magnetic elements 1404a-1404c that have been magnetically printed on the perimeter of the programmed magnet 1402. The magnetic elements 1404a-1404c have an alternating polarity pattern of +−+. A first coil 1410a on the front side of the programmed magnet as represented by a bolded circle is positioned to align with the first magnetic element 1404a while a second coil 1410b on the back side of the programmed magnet as represented by a dashed bolded circle is positioned half-way between the first magnetic element 1404a and the second magnetic element 1404b. One skilled in the art of generators will understand that the sinusoidal output of a given coil will cycle 360° from the first magnetic element 1404a to the third magnetic element 1404c. As such, the relative positions of the first coil 1410a to the second coil 1410b represent a 90 degree out of phase relationship.

Figure 15A:
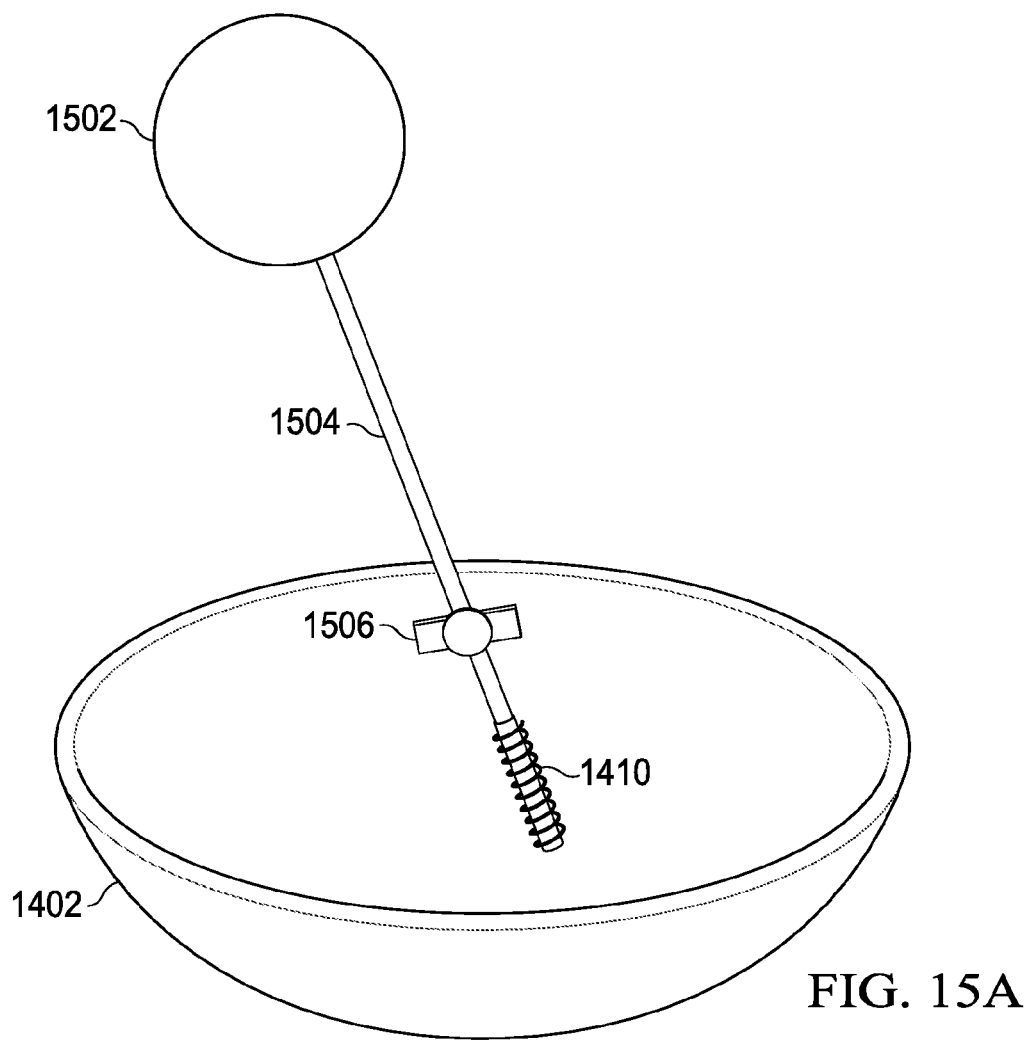
FIG. 15A depicts an example electrical generator that may use random wave motion to generate electricity.
Figure 15B:
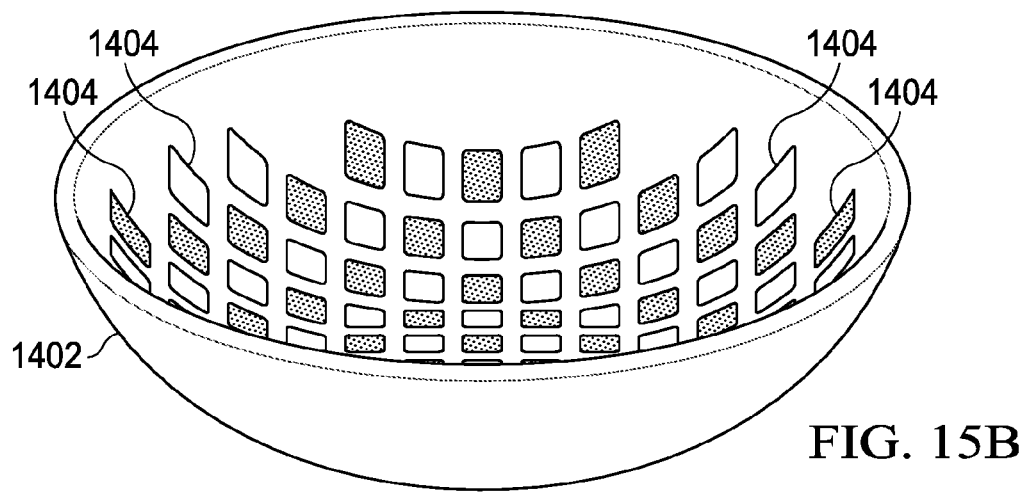
FIG. 15B depicts an example curved structure that may be employed in the electrical generator of FIG. 15A.

Movement used to generate electricity using an electrical generation apparatus in accordance with certain embodiments may be via a hand (e.g., a crank or shaking), wind, waves, or any other movement where there is differential motion. For example, FIG. 15A depicts an electrical generator apparatus comprising a buoy 1502, a shaft 1504, a pivot apparatus 1506, and a magnetizable material 1402, which may be shaped similarly to a bowl and which may have a pattern of maxels programmed into it, and one or more coils 1410. Such an electrical generator apparatus may produce electricity regardless of the movement of buoy 1502 due to waves because coil 1410 may be continuously moved (e.g., randomly or not) across the maxels (e.g., as shown in FIG. 15B) in the magnetizable material 1402. Generally, all sorts of similar and/or analogous devices may be employed to capture, scavenge, or otherwise generate electricity based on known or random movement whereby the movement of one or more coils relative to maxels is leveraged. Example implementation environments may include, but are not limited to, clothing, bags/backpacks, shoes, cars, bikes, portable electronics, locations/facilities with steam or other heat-induced movements, any combination thereof, and so forth.

FIG. 15B depicts an example curved structure 1402 that may be employed in the electrical generator of FIG. 15A. For example, maxels 1404 may be formed so as to line an interior of curved structure 1402. Such maxel formation may involve constructing discrete maxels and co-locating them to be adjacent to one another, may involve printing maxels using a magnetizing printer (e.g., as described further herein below with particular reference to FIGS. 19A-20). A pattern of maxels used in such electrical generation devices may comprise, by way of example but not limitation, alternating polarities or coded polarities. Coded versions may be particularly useful, for example, to match a load that is periodic or aperiodic.

In accordance with an example embodiment, electric motors may be built in which their conventional coils are replaced by substantially flat inductor cores, such as high voltage inductor coils that are described for use by a magnetizing circuit employed to program a magnetizable material. Such an example approach to programming a magnetizable material via printing with a magnetizing circuit is described further herein below with particular reference to FIGS. 19A-20.

In accordance with another example embodiment, a brake system may include magnets on a rotor where there is at least one solenoid on one or both sides of the rotor. In operation, pressing a brake pedal activates the one or more solenoids to dissipate energy in the rotor to thereby slow a vehicle down. Such a brake system may also include a conventional friction-based brake that engages at, for instance, low speeds. The magnetic portion of the brake system can thereby generate electricity whenever it is engaged. The generated electricity may be collected and stored (e.g., in a battery system).

Figure 16:
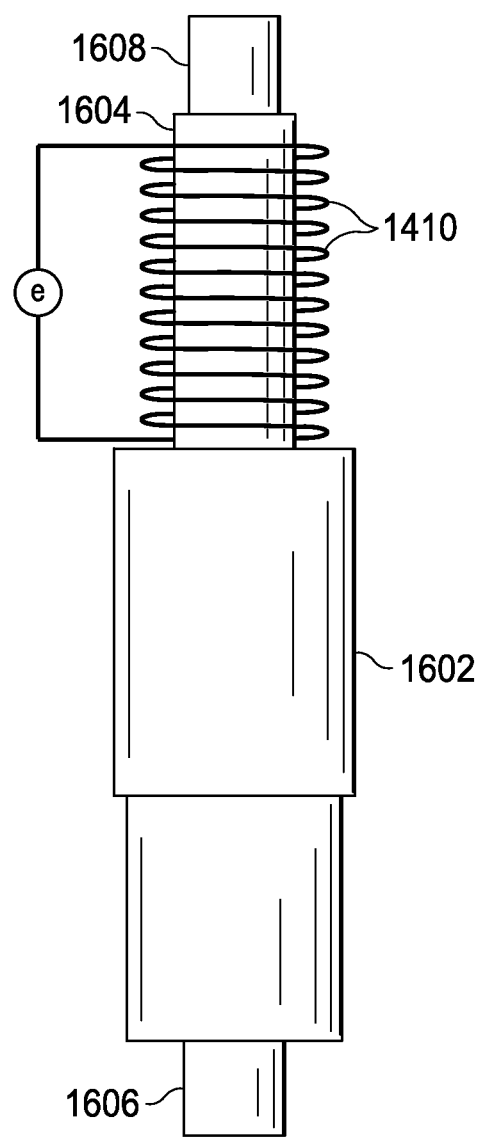
FIG. 16 depicts an example shock absorber that produces electricity while absorbing shock using multi-level magnetism.

Similarly, a shock absorber (e.g., of a vehicle) may be provided power generation capabilities in which the shock absorber utilizes two magnets and a spacer (e.g., such as a cushioning device as described below with particular reference to FIGS. 17A-17C) and one or more other magnetic sources and corresponding coil(s) to generate electricity. FIG. 16 depicts such an example shock absorber that can generate electricity while absorbing shocks using multi-level magnetism (e.g., in the cushioning portion).

FIG. 16 depicts an example of a cushioning device 1602 and a coil 1410 around a magnet 1604 that is surrounding a shaft 1608 of a shock absorber, where the shaft may be attached to a frame of a vehicle (not shown). In an example embodiment, the shock absorber has power generation capabilities. The example shock absorber may utilize a cushioning device 1602 (which may include two magnets and a spacer) and one or more other magnets 1604 and corresponding coils 1410 to generate electricity. As shown, the shock absorber has one shaft 1606 attached to one end of cushioning device 1602, and at another end there is attached shaft 1608 which has a magnet 1604 present thereat (e.g., surrounding at least a portion of it) and a coil 1410 surrounding magnet 1604.

Figure 17C:
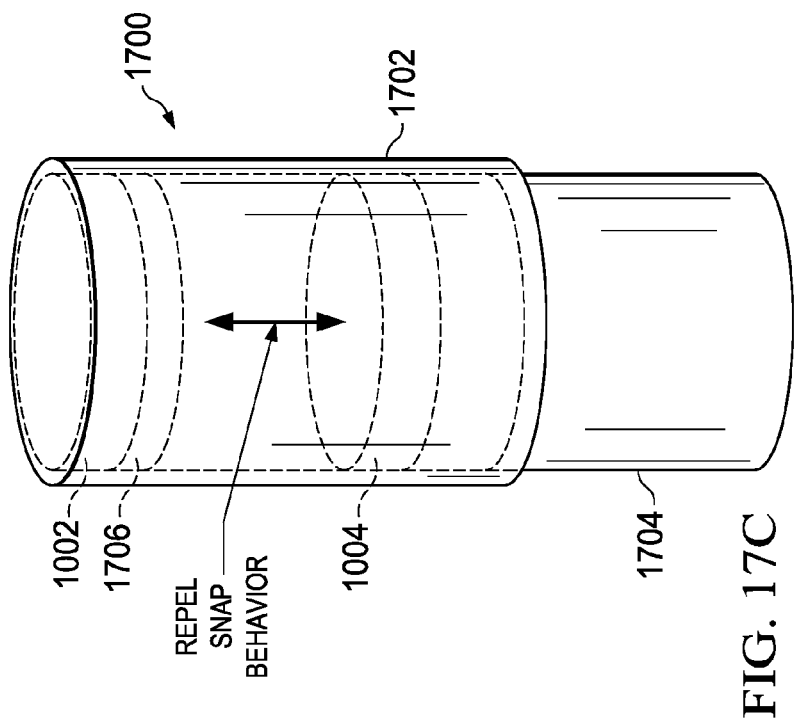
FIG. 17C depicts an assembled version of the example magnetic cushioning device.
Figure 17A:
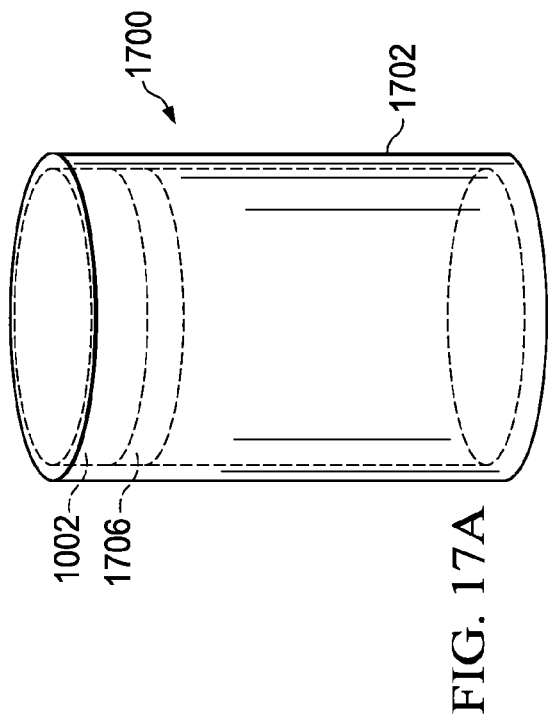
FIG. 17A depicts a female component of an example magnetic cushioning device.
Figure 17B:
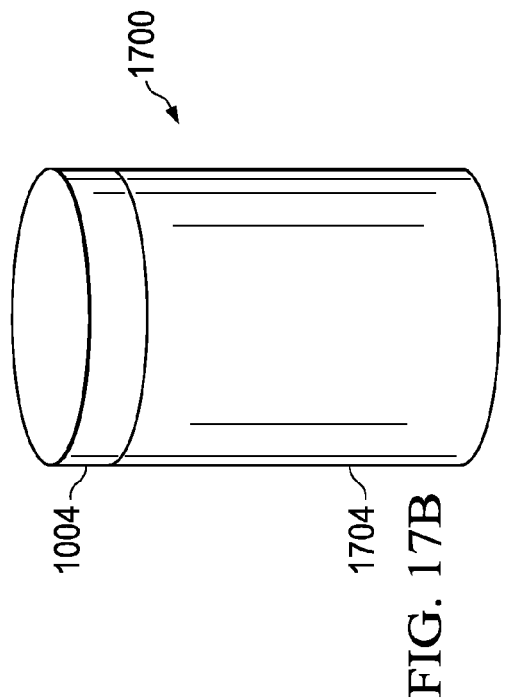
FIG. 17B depicts a male component of the example magnetic cushioning device.

FIGS. 17A-17C illustrate an example cushioning device 1700. Cushioning device 1602 (of FIG. 16) may be realized in accordance with, for example, cushioning device 1700. FIG. 17A depicts a female component 1702 of example magnetic cushioning device 1700, wherein the female component 1702 may include a magnet 1002 and a space 1706. FIG. 17B depicts a male component 1704 (e.g., piston 1704) of the example magnetic cushioning device 1700, wherein the male component 1704 may include a magnet 1004. FIG. 17C depicts an assembled version of the example magnetic cushioning device 1700 in which the female component 1702 (e.g, including magnet 1002 and spacer 1706) is movably positioned over the male component 1704 (e.g., including magnet 1004).

The magnetic cushioning device 1700 may thus include two magnets 1002 and 1004 plus spacer 1706, which together may produce a multi-level repel snap behavior that has a repeatable hysteresis behavior. However, because it is not being implemented as a switch here, the magnetic cushioning device 1700 of FIGS. 17A-17C does not require circuitry for a switch. It instead acts much like a shock absorber that utilizes magnetism instead of a spring. The magnetic cushioning device 1700 can be used for all sorts of applications that use a spring for cushioning, including, by way of example but not limitation, beds such as home beds or hospital beds; seats or backs of chairs in a home, an airplane, a vehicle, a race car, a bus, a train, etc.; shock absorbers for vehicles; bumpers for vehicles; protective shielding for vehicles; and the like. Unlike a spring, however, where the force of the spring continues to increase as an external force is applied, the magnetic cushioning device 1700 may exhibit a peak repel force and then a reduction in the repel force as the magnets 1002 and 1004 move together until held apart by the spacer 1706. The spacer 1706 can be attached to either one of the magnets 1002 and 1004, or otherwise positioned therebetween.

Figure 18:
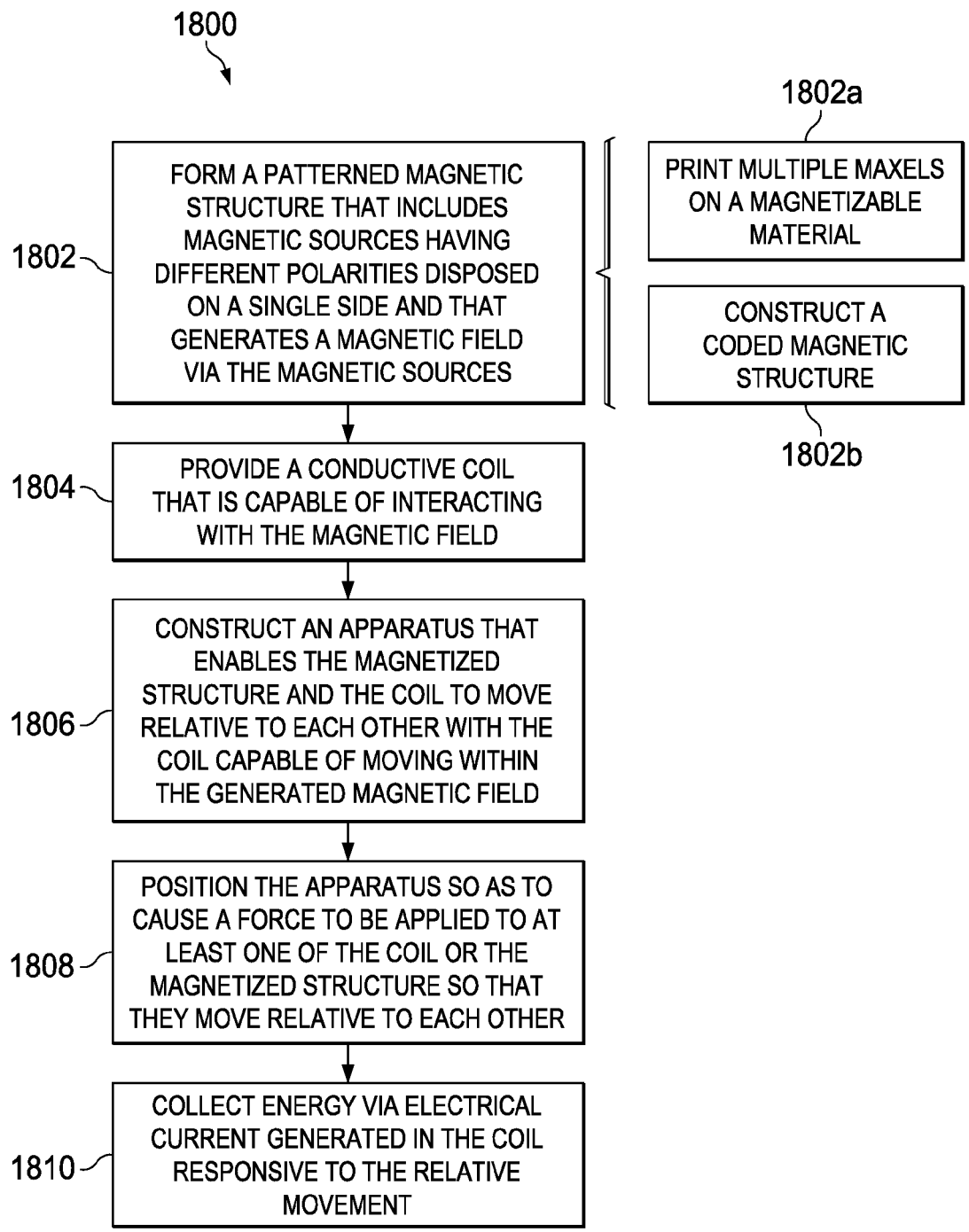
FIG. 18 depicts a flow diagram illustrating example methods relating to electrical generating apparatuses.

FIG. 18 depicts a flow diagram 1800 illustrating example methods relating to electrical generating apparatuses. As shown, flow diagram 1800 may include five stages/operations 1802-1810, plus two stages/operations 1802a and 1802b. Although stages/operations are shown in a particular order in flow diagram 1800, embodiments may be performed in different orders and/or with one or more stages/operations fully or partially overlapping with other stage(s)/operation(s). Moreover, a different number of operations (e.g, more or fewer) may alternatively be implemented.

For certain example embodiments, at stage/operation 1802, a patterned magnetic structure that includes magnetic sources having different polarities disposed on a single side and that generates a magnetic field via the magnetic sources may be formed. For example, at least two magnetic sources having both positive and negative magnetic polarity representation may be formed on a single side of a magnetic structure (e.g., a multipolar magnetic structure may be created). At stage/operation 1802a, multiple maxels (having different polarities) may be printed on a single side of a magnetizable material. Such printing of magnetic elements (or maxels) effectively embeds (e.g., infuses, grows, or otherwise creates) a "new" magnetic polarity in the magnetizable material. Examples approaches to printing maxels are described herein below with particular reference to FIGS. 19A-20. At stage/operation 1802b, a coded magnetic structure may be constructed using discrete magnets such that different polarities are present on a single side of the coded magnetic structure.

At stage/operation 1804, a conductive coil that is capable of interacting with the magnetic field may be provided. For example, a conductive coil having multiple turns (e.g., around a core) may be provided. Such a conductive coil may be capable of entering and/or leaving (fully and/or partially) the magnetic field generated by the magnetic structure and experiencing electrical current as a result.

At stage/operation 1806, an apparatus that enables the magnetized structure and the coil to move relative to each other with the coil capable of moving within the generated magnetic field may be constructed. For example, a rotational movement apparatus (e.g., as shown in FIG. 14B), a random movement apparatus (e.g., as shown in FIG. 15A), apparatuses with other available movements, combinations thereof, and so forth may be constructed.

At stage/operation 1808, the apparatus may be positioned so as to cause a force to be applied to at least one of the coil or the magnetized structure so that they move relative to each other. For example, the apparatus of FIG. 14B may be positioned such that a force (e.g., wind, steam, etc.) turns magnetic structure 1402. Alternatively, the apparatus of FIG. 15A may be positioned such that wave motion moves buoy 1502 such that coil 1410 is moved relative to magnetic structure 1402.

At stage/operation 1810, energy may be collected via electrical current generated in the coil responsive to the relative movement between at least the coil and the magnetized structure. For example, electrical current may be detected/measured, electricity may be stored (e.g., in a battery or other storage system), electricity may be forwarded (e.g., transmitted to another location), some combination thereof, and so forth, just to name a few examples.

IV. Magnetizing Printer and Magnetizer Print Head

Figure 19A:
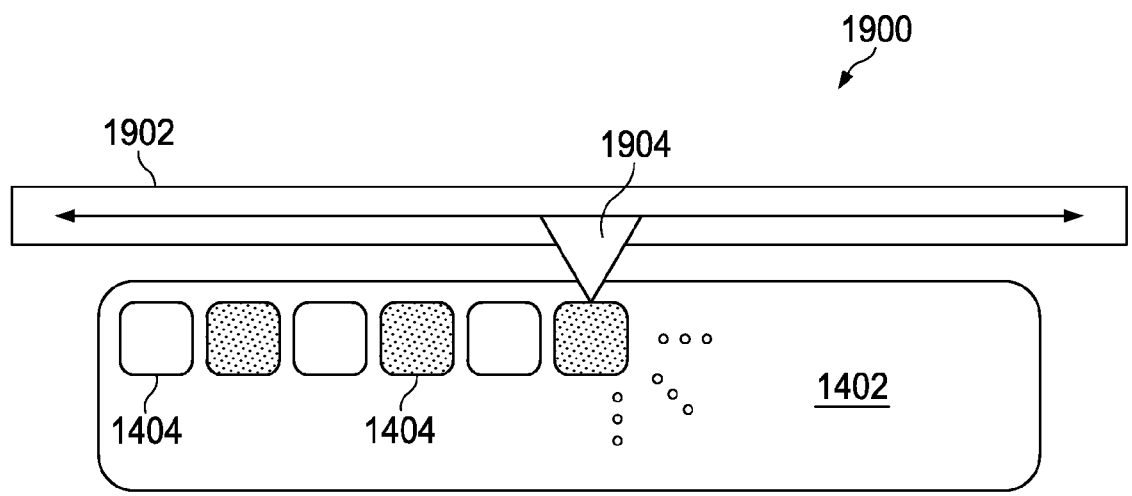
FIG. 19A depicts an example magnetizing printer.

FIG. 19A depicts an example magnetizing printer 1900. For an example embodiment, magnetizing printer 1900 may include a movement handler 1902 and a magnetizer print head 1904. In operation, magnetizing printer 1900 may print maxels 1404 on a magnetizable structure 1402. As shown, movement handler 1902 is capable of moving magnetizer print head 1904 around magnetizable structure 1402, which may remain fixed. However, movement handler 1902 may alternatively be capable of moving magnetizable structure 1402 while magnetizer print head 1904 is fixed. Furthermore, movement handler 1902 may be capable of moving both magnetizable structure 1402 and magnetizing print head 1904 in order to print maxels 1404 at desired locations.

Example embodiments for magnetizing printers 1900 are described in co-pending U.S. Nonprovisional patent application Ser. No. 12/476,952, filed 2 Jun. 2009, which is hereby incorporated by reference in its entirety herein. Example monopolar magnetizing circuits and bipolar magnetizing circuits are shown and described. Circular conductors that may be used to produce at least one high voltage inductor coil are also shown and described. Magnetizing inductors from round wires, flat metal, etc. are shown and described. Other example aspects for printing maxels onto magnetizable materials are disclosed in the aforementioned application Ser. No. 12/476, 952.

Figure 19B:
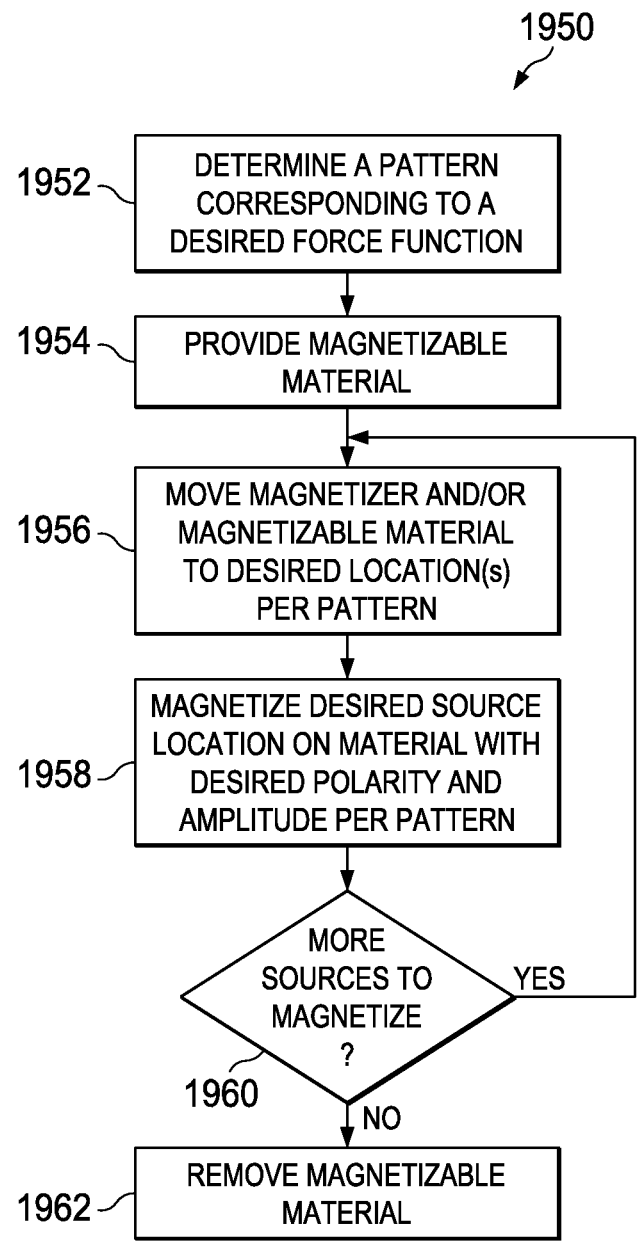
FIG. 19B depicts a flow diagram illustrating example methods relating to magnetizing printers.

FIG. 19B depicts a flow diagram 1950 illustrating example methods relating to magnetizing printers. As shown, flow diagram 1950 may include six stages/operations 1952-1962. Although stages/operations are shown in a particular order in flow diagram 1950, embodiments may be performed in different orders and/or with one or more stages/operations fully or partially overlapping with other stage(s)/operation(s). Moreover, a different number of operations (e.g, more or fewer) may alternatively be implemented.

More specifically, flow diagram 1950 depicts an example patterned magnetic structure manufacturing method. A patterned magnetic structure may comprise multiple different magnetic polarities on a single side. A patterned magnetic structure may include magnetic sources that alternate, that are randomized, that have predefined codes, that have correlative codes, some combination thereof, and so forth. The magnetic sources may be discrete ones that are combined/amalgamated to form at least part of a magnetic structure, may be integrated ones that are printed onto a magnetizable material to create a patterned magnetic structure, some combination thereof, and so forth. For certain example embodiments, at a stage/operation 1952, a pattern corresponding to a desired force function may be determined. A desired force function may comprise, for example, a spatial force function, an electromotive force function, a force function that provides for many different transitions between positive and negative polarities (and vice versa) with respect to a proximate coil that is in motion relative thereto, some combination thereof, and so forth.

At stage/operation 1954, a magnetizable material may be provided to a magnetizing apparatus (e.g., to a magnetizing printer 1900). At stage/operation 1956, a magnetizer (e.g., a magnetizing print head 1904) of the magnetizing apparatus and/or the magnetizable material (e.g., magnetizable structure 1402) to be magnetized may be moved so that a desired location on the magnetizable material can be magnetized in accordance with the determined pattern. At stage/operation 1958, a desired source location on the magnetizable material may be magnetized such that the source has the desired polarity, field amplitude (or strength), shape, and/or size (e.g., area on the magnetizable material), or some combination thereof, etc. as defined by the pattern. At stage/operation 1960, it may be determined whether additional magnetic sources remain to be magnetized. If there are additional sources to be magnetized, then the flow diagram may return to stage/operation 1956. Otherwise, at stage/operation 1962, the magnetizable material (which is now magnetized in accordance with the determined pattern) may be removed from the magnetizing apparatus.

Figure 20:
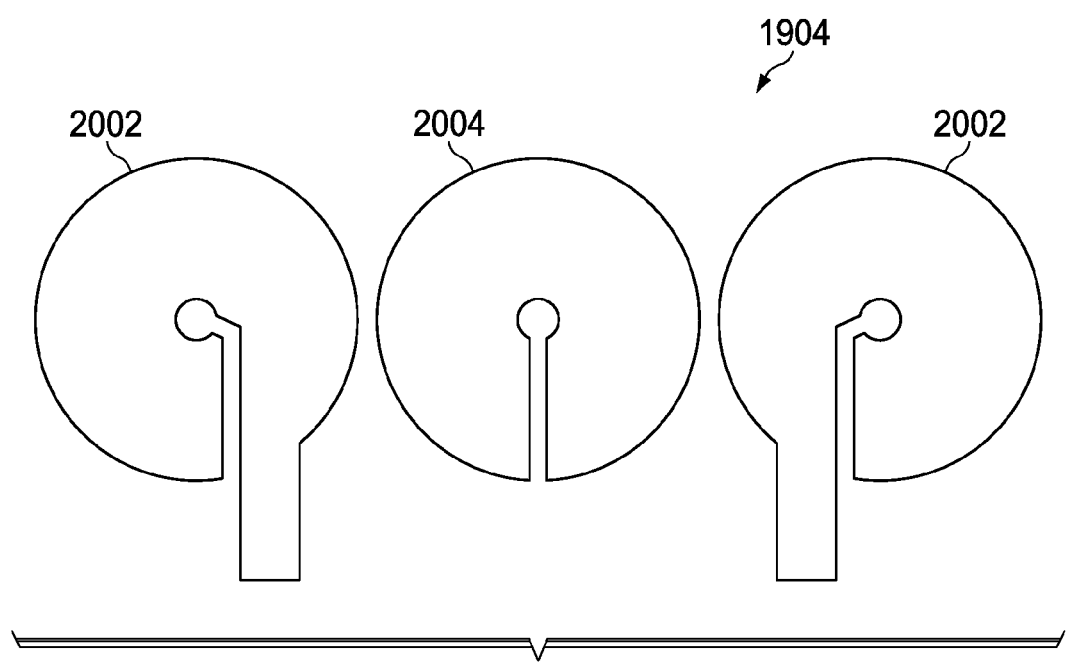
FIG. 20 depicts an example design of layers of a magnetizer print head.

FIG. 20 depicts an example design of multiple layers of a magnetizer print head 1904. As noted above, examples of such a head of a magnetic printer has been described in U.S. application Ser. No. 12/476,952. In one example implementation as described herein, a magnetizing printer head 1904 may be substantially circular with a diameter of approximately 16 mm and a central hole of approximately 3 mm. Generally, each layer may be relatively thin. By way of example but not limitation, for certain example embodiments, each metallic (e.g., copper) layer may be manufactured to be as thin as is feasible. By one example standard, each layer may be made as thin as is possible so long as it is still capable of handling a current that is to be applied during magnetization without experiencing damage (e.g., without coming apart during use). By way of example only, metal (e.g., Cu) layers 2002 having a thickness of approximately 0.015 inches, and insulating layers 2004 (e.g., of Kapton) having a thickness of approximately 0.001 inches may be employed in a magnetizing printer head 1904. In another example implementation, instead of soldering the layers, the layers may be welded (e.g., tig welded), which may make them more durable.

In accordance with one example implementation for creating a magnet having multiple magnet polarities on a single side, a magnetic structure may be produced by magnetizing one or more magnetic sources having a first polarity onto a side of a previously magnetized magnet having an opposite polarity. Alternatively, a magnetizing printer can be used to re-magnetize a previously-magnetized material having one polarity per side (e.g., originally) and having multiple sources with multiple polarities per side (e.g., afterwards). For example, a checkerboard pattern (e.g., alternating polarity sources) may be magnetized onto an existing magnet such that the remainder of the magnet (e.g., the non re-magnetized portion) acts as a bias. In another example, a pattern (e.g., including a code) other than a checkerboard pattern may be used to magnetize an existing magnet such that the remainder of the magnet (e.g., the non re-magnetized portion) acts as a bias.

In accordance with other example approaches for forming magnetic structures, a containment vessel may act as a mold for receiving magnetizable material while in a moldable form. Such a containment vessel may serve both as a mold for shaping the material and also as a protective device to provide support to the resulting magnetic structure so as to prevent breakage, deformation, etc. If the magnetizable material is to be sintered, the containment vessel may comprise a material, e.g., titanium, that can withstand the heat used to sinter the magnetizable material. Should a binder be used to produce the magnets with the mold/containment vessel, other forms of material, such as a hard plastic may be used for the mold/containment vessel. Generally, various types of molds may be used to contain magnetizable material and may be used later to support and protect the magnetic structure (e.g., with coding or other patterning) once the material it contains has been magnetized.

V. Adaptable/Adjustable Correlated Magnetic Devices

For certain example embodiments, coded magnetic structures may be designed to enable selection of the magnetic force between them. In one circularly and/or radially coded arrangement, codes enable a force between two magnetic structures to be selected by rotating a first structure to different possible alignment positions, where each position can correspond to a different amount of force between the two structures (e.g., whether the force is strong, medium, weak, attractive, repellant, combinations thereof, etc.).

FIG. 21 depicts two example coded magnetic structures 2102 and 2104 each having eight radial arms 2106 of five magnet sources 2108 each about a central point 2110. A code 2112 is shown in eight columns in two sets of five rows each, which together correspond to the coding of the forty magnetic sources 2108 that are included in each of the two magnetic structures 2102 and 2104. The rightmost magnetic structure 2104 may be placed over the leftmost magnetic structure 2102 such that when plus symbols (of the magnetic sources 2108) are located over plus symbols or when minus symbols are located over minus symbols an attract force results, given that the bottom of a plus symbol is a minus symbol (and vice versa). Hence, a minus over a plus or vice versa represents a repel force. For an example implementation as illustrated, a peak force of 40 may be produced when the structures are aligned as depicted in the lower right corner. By rotating the right magnetic structure 2104 relative to the left magnetic structure 2102 in rotations of 22.5 degrees, the force may be changed from 40 to 0 to 28 to 0 to 24 to 0 to 28 to 0 and back to 40. The relative ratios are shown as 1, 0.7, 0, and 0.6, and they would then reverse (0, 0.7, 0, and then 1).

Many alternative variations to the described example embodiments may also be implemented in which the magnetic sources 2102 and 2104 are not round (e.g., they may be rectangular, oval, octagonal, etc.) and in which the number of magnetic sources 2108 within each radial arm 2106 may be vary, the source strengths and/or polarities may vary, the number of radial arms may vary, any combination thereof, and so forth. But, generally, by selective cancellation of forces (or lack of such cancellation), a user of a device can select an amount of force produced between two magnetic structures 2102 and 2104. One skilled in the art will also recognize that similar magnetic structures can be produced using linear or other non-circular structures. Below are several other example codes for circular magnetic structures that enable magnets to be rotated in order to select a desired force. However, claimed subject matter is not limited to any particular coding set.

| 72 | 16 | 12 | 36 | 8 | 12 | 52 | 12 | 4 | 28 | 4 | 12 | 52 | 12 | 8 | 36 | 12 | 16 |
|---|---|---|---|---|---|---|---|---|---|---|---|---|---|---|---|---|---|
| 1 | .22 | .17 | 0.5 | .11 | .17 | .72 | .17 | .06 | .39 | | | | | | | | |
| 1 | −1 | 1 | −1 | −1 | 1 | 1 | −1 | 1 | −1 | −1 | 1 | 1 | −1 | 1 | −1 | −1 | 1 |
| 1 | 1 | 1 | 1 | −1 | 1 | 1 | −1 | 1 | −1 | −1 | 1 | 1 | −1 | 1 | −1 | −1 | 1 |
| 1 | 1 | 1 | 1 | 1 | 1 | 1 | 1 | 1 | −1 | −1 | 1 | 1 | −1 | 1 | −1 | −1 | 1 |
| 1 | 1 | 1 | 1 | 1 | 1 | 1 | 1 | 1 | 1 | 1 | 1 | 1 | 1 | 1 | 1 | 1 | 1 |
| 1 | −1 | 1 | −1 | −1 | 1 | 1 | −1 | 1 | −1 | −1 | 1 | 1 | −1 | 1 | −1 | −1 | 1 |
| 1 | 1 | 1 | 1 | −1 | 1 | 1 | −1 | 1 | −1 | −1 | 1 | 1 | −1 | 1 | −1 | −1 | 1 |
| 1 | 1 | 1 | 1 | 1 | 1 | 1 | 1 | 1 | −1 | −1 | 1 | 1 | −1 | 1 | −1 | −1 | 1 |
| 1 | 1 | 1 | 1 | 1 | 1 | 1 | 1 | 1 | 1 | 1 | 1 | 1 | 1 | 1 | 1 | 1 | 1 |

| 48 | 20 | 16 | 12 | 24 | 4 | 0 | 4 | 24 | 12 | 16 | 20 |
|---|---|---|---|---|---|---|---|---|---|---|---|
| 1 | 0.4 | 0.3 | .25 | 0.5 | 0.1 | 0 | | | | | |
| 1 | 1 | −1 | 1 | 1 | 1 | −1 | 1 | 1 | 1 | −1 | 1 |
| 1 | 1 | 1 | 1 | 1 | 1 | −1 | 1 | 1 | 1 | −1 | 1 |
| 1 | 1 | 1 | 1 | 1 | 1 | 1 | 1 | 1 | 1 | −1 | 1 |
| −1 | −1 | −1 | −1 | −1 | −1 | 1 | 1 | 1 | 1 | 1 | 1 |
| 1 | 1 | −1 | 1 | 1 | 1 | −1 | 1 | 1 | 1 | −1 | 1 |
| 1 | 1 | 1 | 1 | 1 | 1 | −1 | 1 | 1 | 1 | −1 | 1 |
| 1 | 1 | 1 | 1 | 1 | 1 | 1 | 1 | 1 | 1 | −1 | 1 |
| −1 | −1 | −1 | −1 | −1 | −1 | 1 | 1 | 1 | 1 | 1 | 1 |

| 60 | 16 | 12 | 36 | 4 | 0 | 20 | 0 | 4 | etc. | | |
|---|---|---|---|---|---|---|---|---|---|---|---|
| 1 | .27 | .2 | .6 | .07 | 0 | .33 | | | | | |
| 1 | 1 | −1 | 1 | 1 | −1 | 1 | 1 | −1 | 1 | 1 | 1 |
| 1 | 1 | 1 | 1 | 1 | −1 | 1 | 1 | −1 | 1 | 1 | −1 |
| 1 | 1 | 1 | 1 | 1 | 1 | 1 | 1 | −1 | 1 | 1 | −1 |
| 1 | 1 | 1 | 1 | 1 | 1 | 1 | 1 | 1 | 1 | 1 | −1 |
| 1 | 1 | 1 | 1 | 1 | 1 | 1 | 1 | 1 | 1 | 1 | 1 |
| 1 | 1 | −1 | 1 | 1 | −1 | 1 | 1 | −1 | 1 | 1 | −1 |
| 1 | 1 | 1 | 1 | 1 | −1 | 1 | 1 | −1 | 1 | 1 | −1 |
| 1 | 1 | 1 | 1 | 1 | 1 | 1 | 1 | −1 | 1 | 1 | −1 |
| 1 | 1 | 1 | 1 | 1 | 1 | 1 | 1 | 1 | 1 | 1 | −1 |
| 1 | 1 | 1 | 1 | 1 | 1 | 1 | 1 | 1 | 1 | 1 | 1 |

| 72 | 28 | 24 | 48 | 16 | 12 | 32 | 12 | 16 | 48 | 24 | 28 |
|---|---|---|---|---|---|---|---|---|---|---|---|
| 1 | .39 | .33 | .67 | .22 | .17 | .44 | | | | | |
| 1 | 1 | −1 | 1 | 1 | −1 | 1 | 1 | −1 | 1 | 1 | −1 |
| 1 | 1 | 1 | 1 | 1 | −1 | 1 | 1 | −1 | 1 | 1 | −1 |
| 1 | 1 | 1 | 1 | 1 | 1 | 1 | 1 | −1 | 1 | 1 | −1 |
| 1 | 1 | 1 | 1 | 1 | 1 | 1 | 1 | 1 | 1 | 1 | 1 |
| 1 | 1 | 1 | 1 | 1 | 1 | −1 | −1 | −1 | −1 | −1 | −1 |
| 1 | 1 | −1 | 1 | 1 | −1 | 1 | 1 | −1 | 1 | 1 | −1 |
| 1 | 1 | 1 | 1 | 1 | −1 | 1 | 1 | −1 | 1 | 1 | −1 |
| 1 | 1 | 1 | 1 | 1 | 1 | 1 | 1 | −1 | 1 | 1 | −1 |
| 1 | 1 | 1 | 1 | 1 | 1 | 1 | 1 | 1 | 1 | 1 | 1 |
| 1 | 1 | 1 | 1 | 1 | 1 | −1 | −1 | −1 | −1 | −1 | −1 |

| 52 | 36 | 32 | 28 | 24 | 20 | 16 | 20 | 24 | 28 | 32 | 36 |
|---|---|---|---|---|---|---|---|---|---|---|---|
| 1 | .69 | .62 | .54 | .46 | .38 | .31 | | | | | |
| 1 | 1 | 1 | 1 | 1 | −1 | −1 | 1 | 1 | −1 | 1 | −1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| −1 | −1 | −1 | −1 | −1 | −1 | −1 | 1 | 1 | 1 | 1 | 1 |
| 1 | 1 | 1 | 1 | 1 | −1 | −1 | 1 | 1 | −1 | 1 | −1 | 1 |
| 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 |
| −1 | −1 | −1 | −1 | −1 | −1 | −1 | 1 | 1 | 1 | 1 | 1 |

| 36 | 0 | 0 | 28 | 0 | 0 | 24 | 0 | 0 | 28 | 0 | 0 |
|---|---|---|---|---|---|---|---|---|---|---|---|
| 1 | | | 0.8 | | | 0.7 | | | | | |
| 1 | 1 | −1 | 1 | 1 | −1 | 1 | 1 | −1 | 1 | 1 | −1 |
| 1 | 1 | 1 | 1 | 1 | −1 | 1 | 1 | −1 | 1 | 1 | −1 |
| 1 | 1 | 1 | 1 | 1 | 1 | 1 | 1 | −1 | 1 | 1 | −1 |
| 1 | 1 | 1 | 1 | 1 | 1 | −1 | −1 | −1 | −1 | −1 | −1 |
| 1 | 1 | −1 | 1 | 1 | −1 | 1 | 1 | −1 | 1 | 1 | −1 |
| 1 | 1 | 1 | 1 | 1 | −1 | 1 | 1 | −1 | 1 | 1 | −1 |
| 1 | 1 | 1 | 1 | 1 | 1 | 1 | 1 | −1 | 1 | 1 | −1 |
| 1 | 1 | 1 | 1 | 1 | 1 | 1 | 1 | 1 | 1 | 1 | 1 |

| 28 | 0 | 0 | 20 | 0 | 0 | 16 | 0 | 0 | 20 | 0 | 0 |
|---|---|---|---|---|---|---|---|---|---|---|---|
| 1 | | | 0.7 | | | 0.6 | | | | | |
| 1 | 1 | −1 | 1 | 1 | −1 | 1 | 1 | −1 | 1 | 1 | −1 |
| −1 | −1 | 1 | 1 | 1 | −1 | 1 | 1 | −1 | 1 | 1 | −1 |
| −1 | −1 | 1 | 1 | 1 | 1 | 1 | 1 | −1 | 1 | 1 | −1 |
| 1 | 1 | 1 | 1 | 1 | 1 | −1 | −1 | −1 | −1 | −1 | −1 |
| 1 | 1 | −1 | 1 | 1 | −1 | 1 | 1 | −1 | 1 | 1 | −1 |
| 1 | 1 | 1 | 1 | 1 | −1 | 1 | 1 | −1 | 1 | 1 | −1 |
| 1 | 1 | 1 | 1 | 1 | 1 | 1 | 1 | −1 | 1 | 1 | −1 |
| 1 | 1 | 1 | 1 | 1 | 1 | 1 | 1 | 1 | 1 | 1 | 1 |

In accordance with other embodiment(s), codes may be implemented using symbols that are themselves defined by a code. For example, a Barker seven code has been described as +1 +1 +1 −1 −1 +1 −1. However, each of the +1's of the code may be replaced by a different symbol (e.g., a Barker 3 code of +1 +1 −1 or any other desired coding). For instance, the corresponding symbol (e.g., −1 in this example) may be replaced with a complementary symbol (e.g., the complementary Barker 3 code of −1 −1 +1 in this example). As such, the Barker 7 code can become, for example, +1+1−1 +1+1−1 +1+1−1 −1−1+1 −1−1+1 +1+1−1 −1−1+1. As an alternative example, the +1 and −1 symbols may be replaced by +1 +1 +1 and −1 −1 −1, respectively, to produce a resulting Barker 7 code of +1+1+1 +1+1+1 +1+1+1 −1−1−1 −1−1−1 +1+1+1 −1−1−1. One skilled in the art of coding will recognize that all sorts of nested levels of codes may be employed to achieve desired correlation properties or other properties.

For certain example embodiments, coding density may be used to produce magnetic fields over different areas having different throws, where the force curve properties over the different areas can be used to convey information and/or to effect how two objects interact. Referring to FIG. 22A, a square shaped material 2200 is magnetized to include an 8×8 array of maxels in each of four quarters labeled Q1, Q2, Q3, and Q4. The maxels of each of the four arrays have four different code densities as shown on the left. Specifically, the four quarters Q1, Q2, Q3, and Q4 have code densities of 2, 4, 16, and 64, respectively. As such, the throws of the four quarters are reduced as code density increases as depicted on the right by the four arrows having four different sizes. Moreover, one skilled in the art will recognize that by increasing the code density, although the throw decreases, the peak attractive (or repulsive) force at the surface between two complementary coded structures is likewise increased. A shortest path effect is described further herein below.

Figure 22B:
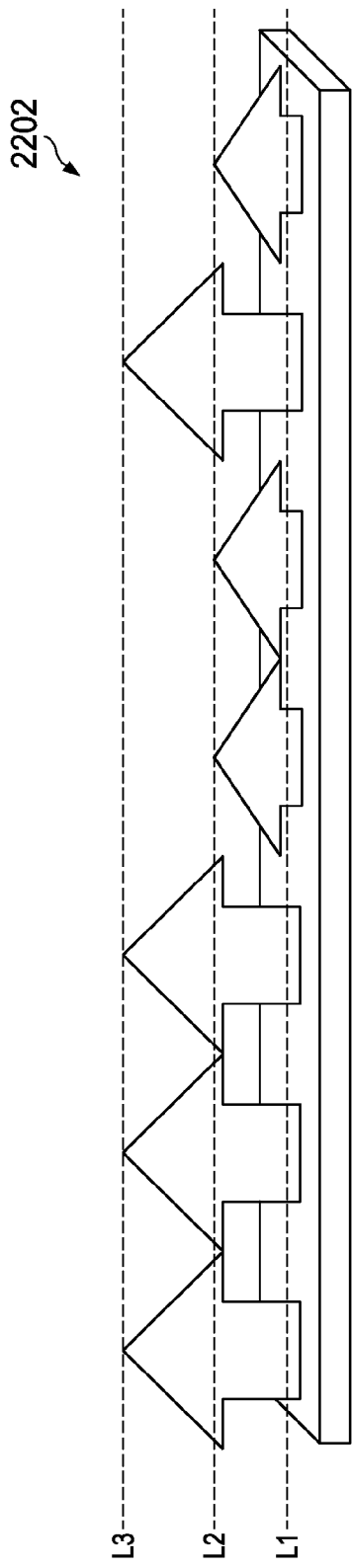

Referring to FIG. 22B, a magnetic structure 2202 is depicted having seven regions each having a respective coding density intended to produce force characteristics above each region corresponding to a Barker 7 code, whereas the larger throw regions may be considered to correspond to a +1 and the smaller throw regions may be considered to correspond to a −1 (or vice versa). Three different levels, L1, L2, and L3 are also shown.

As such, reading from left to right at a level 1 (e.g., L1) height above the structure 2202, a sensor (e.g., a hall-effect sensor) can detect field strengths corresponding to the Barker 7 code. Such coding may be barely detectable at a level 2 (e.g., L2) height above the structure 2202, while only the +1 bits (but not the −1 bits) are barely detectable at a level 3 (e.g., L3) height above the structure 2202. Generally, one skilled in the art will recognize that all sorts of one-, two-, and three-dimensional codes can be implemented whereby the rotational orientation, the translational orientation, and/or the height above a structure determine how information is conveyed.

Figure 22C:
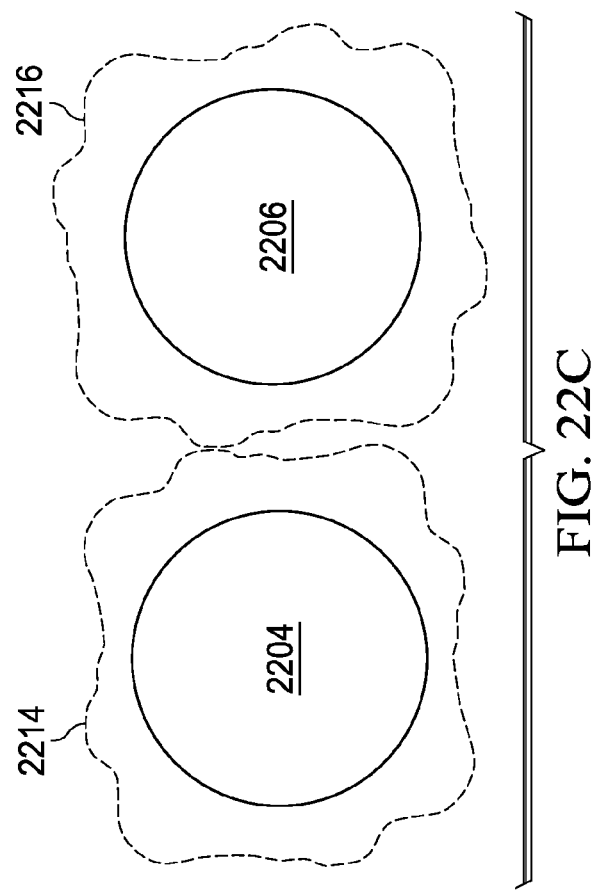

FIG. 22C depicts two example circular magnetic structures 2204 and 2206 coded with varying code densities so that their magnetic force throws 2214 and 2216, respectively, vary about their circumference. As such, when one structure 2204 is rotated relative to the other structure 2206, it can cause movement of the other structure 2206 that is determined based on the interaction of the their magnetic fields 2214 and 2216, which as depicted can have any desired shape. One skilled in the art will recognize that such coding can be used to achieve desired torque or other force properties between two or more coded magnetic structures.

In example embodiments, a correlated magnetic structure may be produced by magnetizing magnetic sources having a first polarity onto a side of a previously-magnetized magnet having an opposite polarity. More generally, a magnetizer/magnetizing printer can be used to re-magnetize a previously-magnetized material having one polarity per side or having multiple sources having multiple polarities per side. Under one example arrangement, a checkerboard pattern (e.g., alternating polarity sources) may be magnetized onto an existing magnet such that the remainder of the magnet (e.g., the non re-magnetized portion) acts as a bias. Under another example arrangement, a pattern (including a code) other than a checkerboard pattern may be used to magnetize an existing magnet such that the remainder of the magnet (e.g., the non re-magnetized portion) acts as a bias.

For certain example embodiments, a correlated magnetic structure may be coded so as to be self-complementary. A self-complementary correlated magnetic structure may correlate with and align with a duplicate structure. For example, a structure may have a first portion opposite a second portion in which a coding of the first portion is complementary to a coding of the second portion. An analogy for such coding is that of identical twin brothers. If they face each other and place their hands flat against each other's hands such that the left hand of each twin is flat against a right hand of the other, it could be said that their hands are self complementary.

Figure 23A:
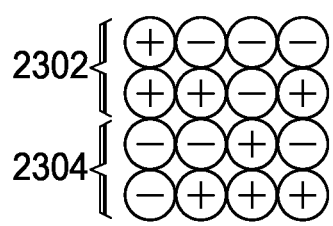
FIGS. 23A-23D depict an example self-complementary correlated magnetic structure.
Figure 23B:
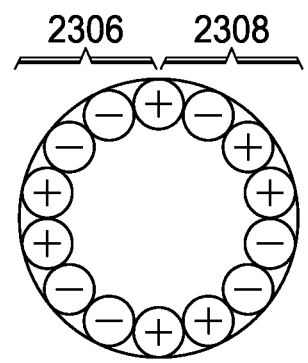
Figure 23C:
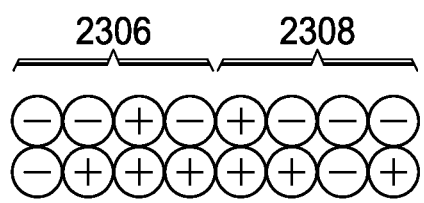

FIGS. 23A, 23B, and 23C depict three example self-complementary correlated magnetic structures. Referring to FIG. 23A, the top two rows 2302 are complementary to the bottom two rows 2304. Referring to FIGS. 23B and 23C, the left halves 2306 are complementary to the right halves 2308. Generally, self-complementary structures are capable of attaching to identical structures. Self-complementary correlated magnetic structures enable, for example, a person to reach into a box that is full of them and pull out two that are complementary, without checking or looking for identifying data. Self-complementary structures may be fabricated in different shapes and/or using different coding than those examples that are illustrated.

Figure 23D:
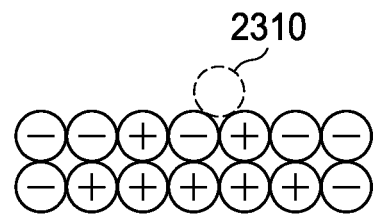

However, structures may furthermore be nearly self-complementary, except that they include one or more magnetic sources that are different in some manner to serve some useful purpose. The different sources may be by way of exclusion, addition, substitution, any combination thereof, and so forth. In FIG. 23D, a magnetic source 2310 is depicted as a dashed circle. Two nearly self-complementary structures might be intended to attach to each other where one used a negative source where there is depicted a dashed circle and the other used a positive source where there is depicted a dashed circle.

Figure 24A:
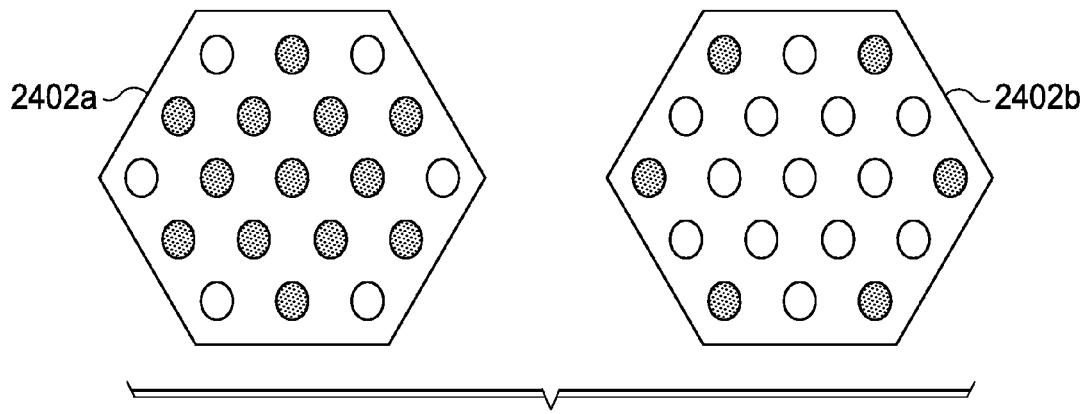
FIGS. 24A and 24B depict examples of complementary coding enabling multiple rotational alignments.
Figure 24B:
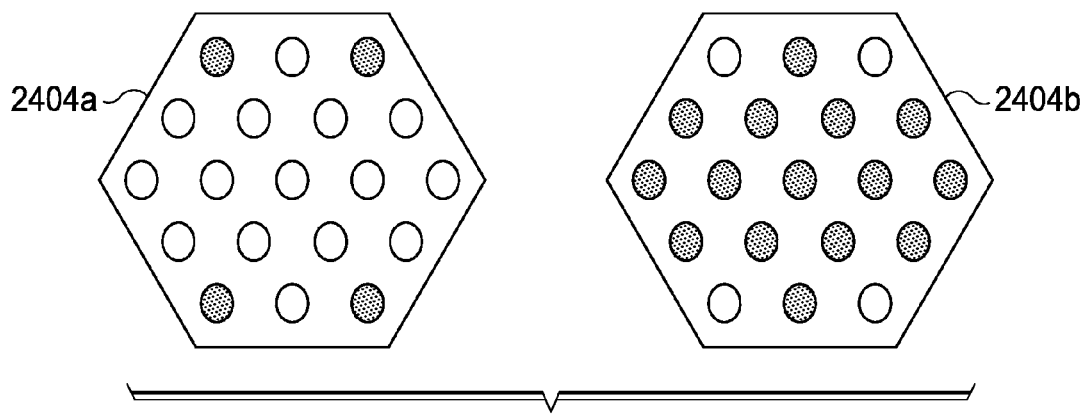

For certain example embodiments, correlated magnetic structures may be designed such that they are capable of attaching at different rotational alignments. FIG. 24A depicts two structures 2402a and 2402b that are adapted to attach at any of six rotational alignments (e.g., every 60 degrees). FIG. 24B depicts two structures 2404a and 2404b that are adapted to attach at any of four rotational alignments (e.g., every 90 degrees). Correlated magnetic structures that are adapted to be attached at different predetermined rotational alignments may be fabricated in different shapes and/or using different coding than those examples that are illustrated.

Figure 25:
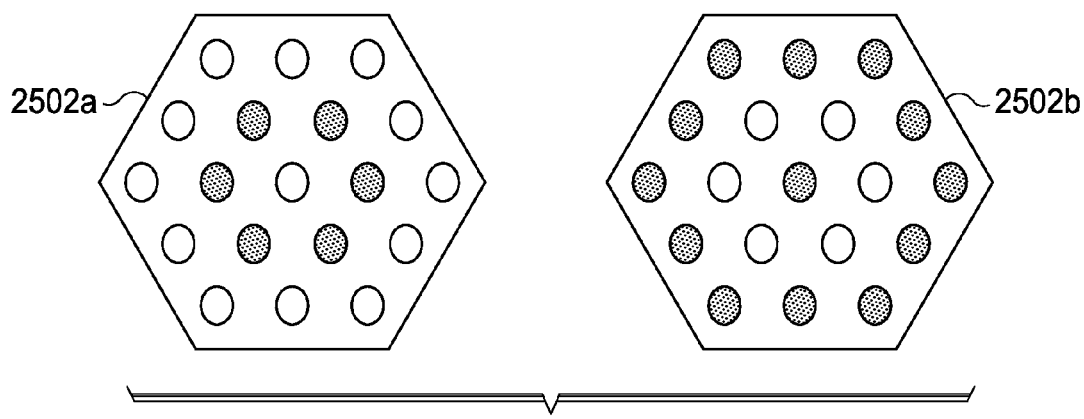
FIG. 25 depicts an example approach to coding complementary correlated magnetic structures.

For an example embodiment, another coding arrangement for complementary magnetic structures is provided. FIG. 25 shows an example coding arrangement for complementary magnetic structures 2502a and 2502b. As illustrated, different polarities are positioned at alternating concentric rings. Although shown with hexagons, concentric coding arrangements, for example, may be fabricated in different shapes and/or using different coding than those examples that are illustrated.

VI. Entertainment Devices

Many different types of entertainment devices can be created and/or improved using magnetic technologies that are described herein. By way of example only, correlated magnets may be applied to structures used in entertainment environments. Entertainment environments may include, by way of example but not limitation, gaming environments, gambling environments, combinations thereof, and so forth.

Figure 26:
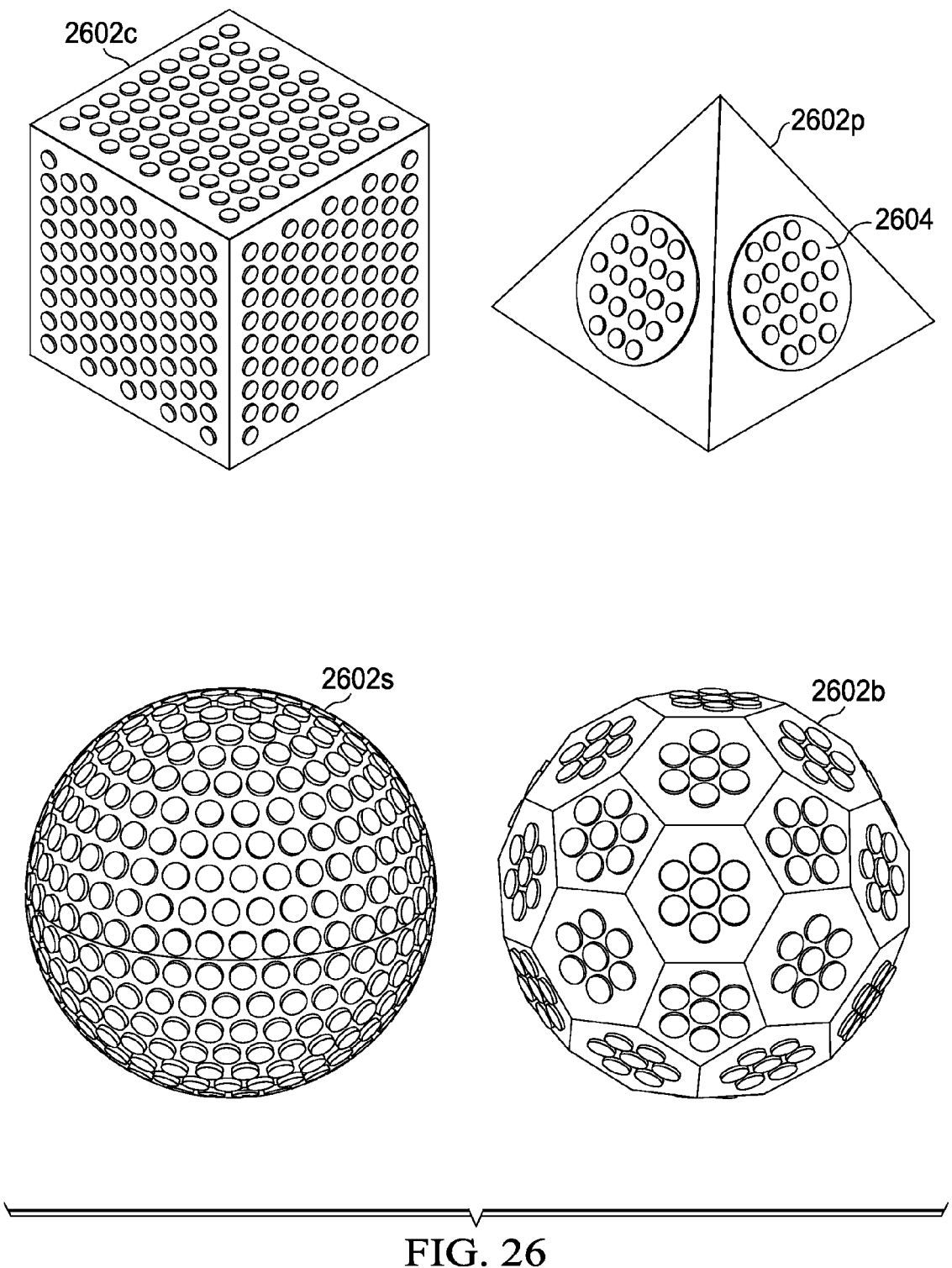
FIG. 26 depicts example gambling devices that may utilize correlated magnetics technology.

FIG. 26 depicts example gambling devices that may be based, at least partly, on correlated magnetics technology. Generally, any object may have correlated magnetic structures embedded within, attached thereto, or otherwise applied therewith. Such correlated magnetic structures may be applied to one or more surfaces of such an object enabling it to act as a gaming piece that can correlate with and attach to (or fail to correlate with or attach to) another object or surface depending at least partly on whether the coding of the correlated magnetic structures are complementary (or not). In FIG.

26, four example shapes 2602 are shown by way of example only. These four shapes are a buckyball 2602b, a cube 2602c, a pyramid 2602p, and a sphere 2602s. To illustrate an example, pyramid 2602p includes at least one correlated magnetic structure 2604 shown on at least one side.

In certain example embodiments, one or more sides of three-dimensional objects may have coded magnets and corresponding identifiers (e.g., numbers, colors, etc.). Other objects and/or a surface (e.g., a gaming table) may have coded magnets for which a particular side of a given three-dimensional object correlates and therefore attaches (e.g., if aligned properly) or otherwise repels. In an example operative play mode, one or more three-dimensional objects are put into motion and then repel against a surface and/or other objects until achieving attraction (e.g., due to magnetic correlation) with another object and/or a surface. The identifiers relating to the correlated objects may be used to decide who wins.

In an example implementation, a buckyball type object (e.g., buckyball 2602b) may have multiple correlated magnetic structures on one or more of its surfaces. It can be rolled across a surface and/or put into play with other objects having magnetic structures. They then repel or attract/attach based at least partly on their respective magnetic codes. The ones that stick together may be used to determine a winner, but other types of gambling devices, games, rules, etc. can alternatively decide a winner when, e.g., objects repel. Correlated magnetic buckyballs can be used, for example, in a gambling game where the sides of the buckyballs are uniquely coded such that they repel unless coded sides align and correlate so that they attach. Identifiers (e.g., numbers, colors, dots, symbols, alphanumeric characters generally, etc.) on the attached (or unattached) balls can then indicate winning results (e.g., with numbers like in a bingo game or roulette wheel). Similarly, a roulette wheel may be configured such that the game can last much longer (and thus be more suspenseful) because the ball has to correlate to attach and come to rest, or it otherwise is repelled out of a given slot.

Figure 27A:
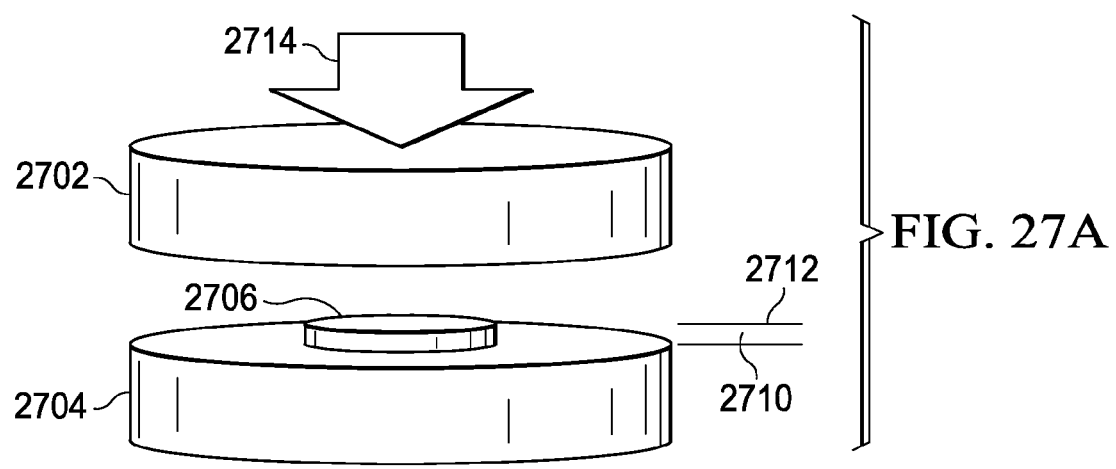
FIGS. 27A and 27B depict an example device that can be used to produce exploding toys and the like and/or can be used to store energy.
Figure 27B:
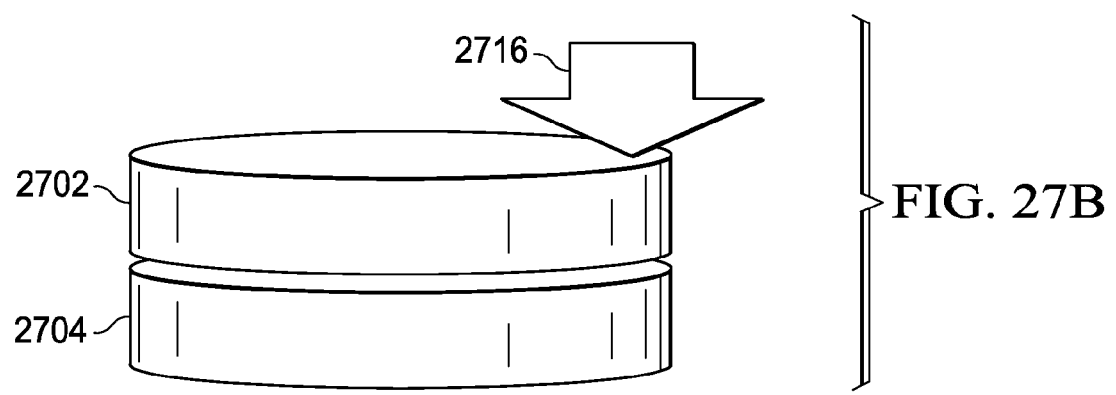

FIGS. 27A and 27B depict an example device that can be used to produce exploding devices (e.g., toys) and the like and/or can be used to store energy. FIGS. 27A and 27B depict two magnets 2702 and 2704 coded to have multi-level repel and snap behavior and having a spacer 2706 in between them with an attract layer 2710 and a repel layer 2712. A force 2714 can be applied on one side to overcome the repel force so the two magnets 2702 and 2704 snap together with the spacer 2706 in between them. After they are snapped together, if a force 2716 is applied to a side of at least one of the magnets, say magnet 2702 for example, that causes that magnet 2702 to pivot on the spacer 2706 then such force 2716 causes the magnets 2702 and 2704 to repel each other (e.g., explode apart or otherwise separate).

Thus, with such an example arrangement, a force 2714 may be applied to overcome a repel force such that magnets 2702 and 2704 snap together with a spacer 2706 in between them. A force 2716 that is applied to at least one side of at least one magnet 2702 and/or 2704 causes at least one magnet to pivot on the spacer 2706, thereby causing the magnets 2702 and 2704 to repel each other and separate. This arrangement provides a relatively unstable device that remains together until it receives an impact or other force of some sort that causes the two magnets 2702 and 2704 to fly apart or otherwise separate energetically (e.g., much like an explosion). As such, various types of toys (e.g., exploding toys that can reflect a crash, that can simulate damage, etc. for walls, cars, tanks, etc.), triggers, and so forth can be produced that employ such a device. The size, thickness, shape, and other aspects of the spacer 2706 can be varied to determine the degree of instability of the device, as well as adjusting coding arrangements for the multilevel magnetism. Such a device can also serve as a form of energy storage whereby a relatively high degree of force can be released with relatively little applied force.

In other example implementations, an external force may be applied to at least one magnetic structure making up a multi-level device with the external force resulting from a change of heat, pressure, or some other external factor, besides mere physical force. For example, a bimetallic strip connected to a multilevel device may be used to produce a desired hysteresis of a thermostat or of a fire suppression system trigger device. Alternatively, pressure may cause a multilevel device to transition from a closed position to an open position, which closed-to-open transition may enable gas to escape a vessel or other confined space.

Figure 28:
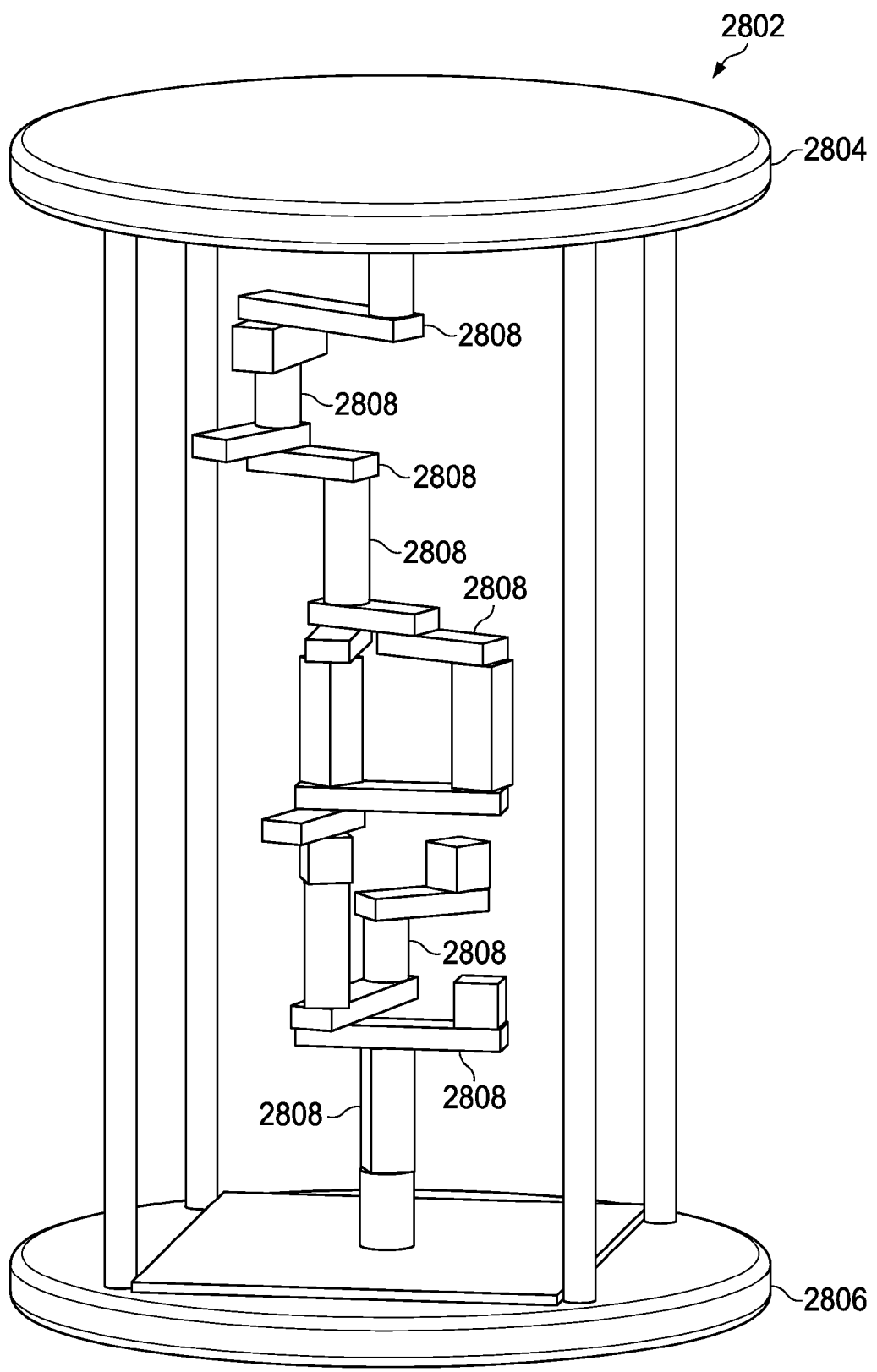
FIGS. 28-32 depict example aspects of a game that may utilize correlated magnetic structures.

FIGS. 28-32 depict example aspects of a game that may utilize correlated magnetic structures. FIG. 28 depicts an example game apparatus 2802. Game apparatus 2802 may include a top platform 2804 and a bottom platform 2806. As shown, a game is being played by building one or more columns between the top platform 2804 and the bottom platform 2806 using game pieces 2808. The bottom platform 2806 may include and/or be supported by a lazy susan apparatus to facilitate rotating game apparatus 2802 to various players (not shown).

Figure 29A:
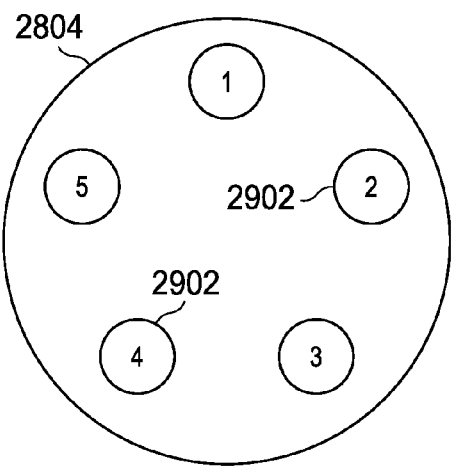
Figure 29B:
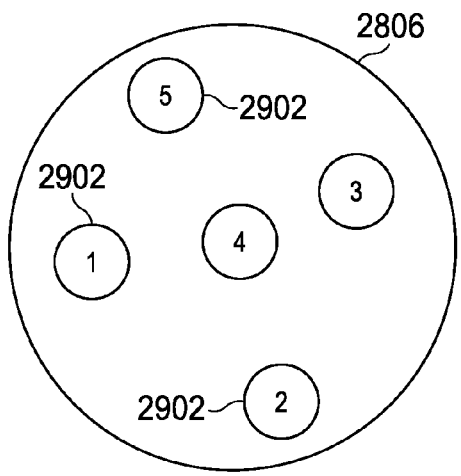

FIGS. 29A and 29B show views of top platform 2804 and bottom platform 2806, respectively. Each platform 2804 and 2806 includes multiple platform attachment points 2902 (less than all are indicated in the figures to avoid clutter). Although five platform attachment points 2902 are shown to support up to five players, more or fewer may alternatively be included. Furthermore, platform attachment points 2902 may be placed in different locations. In a game, game pieces 2808 are coupled using magnets (e.g., correlated magnets) to build a column from top platform 2804 down to bottom platform 2806 (or from bottom platform 2806 up to top platform 2804). Although not reflected in the black and white figures, each player's game pieces 2808 and/or corresponding platform attachment points 2902 may be color-coded (e.g., red, green, blue, yellow, and orange). Such example coloring is reflected in FIGS. 29A, 29B, 30A, and 30B using numerals in place of colors.

In an example implementation, the top platform 2804 is where a player starts the game with his or her respective color. The objective is to make it down to the player's respective color on the bottom platform 2806 using the corresponding game pieces 2808 (e.g., of FIGS. 28 and 32). In doing so, there will likely be hurdles that will have to be overcome in order to succeed. For instance, the ending point may not be right under the starting point. Nevertheless, a player is to find his or her way down and over to the respective color (e.g., by any means necessary).

Figure 30A:
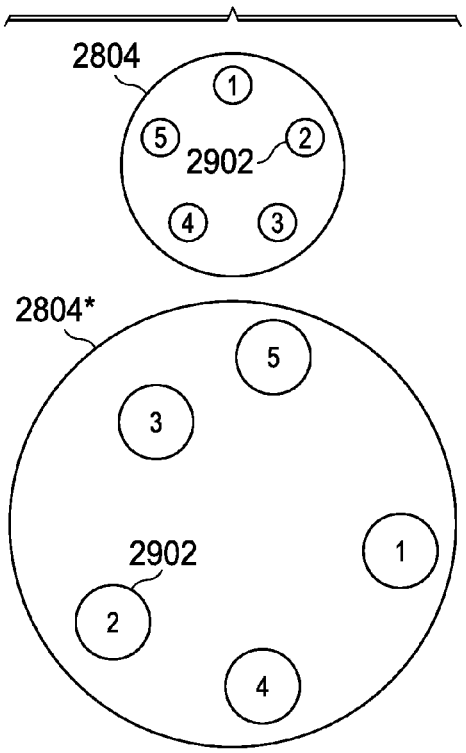
Figure 30B:
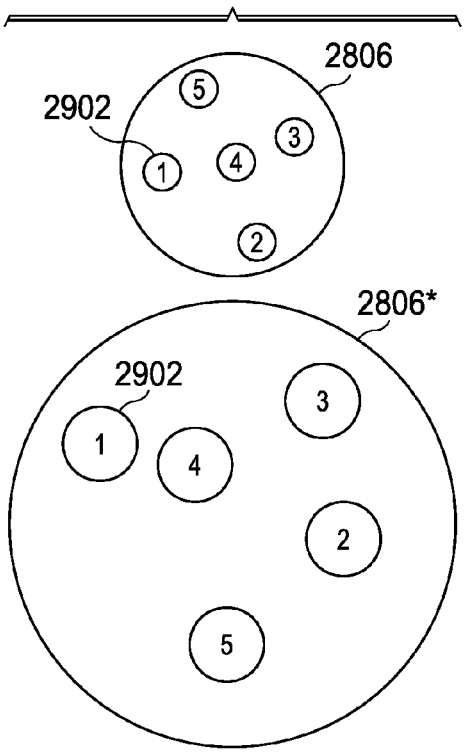

FIGS. 30A and 30B illustrate an example implementation enabling a degree of customization. The top platform 2804 and the bottom platform 2806 as shown in FIGS. 29A and 29B are reproduced here to illustrate an example layout for platform attachment points 2902. However, the platform attachment points 2902 may be rearranged on the top platform 2804 and/or the bottom platform 2806 to make a game more interesting, more fun, more equal for players of different skills, and so forth. The platform attachment points 2902 may be arranged, for instance, so as to make it easier on one player and more challenging on another. An example rearrangement is shown at the top platform 2804* and the bottom platform 2806*. The platform attachment points 2902 may connect to the top platform 2804 and/or the bottom platform 2806 using, for example, a magnetic mechanism that enables such rearrangements.

Figure 31:
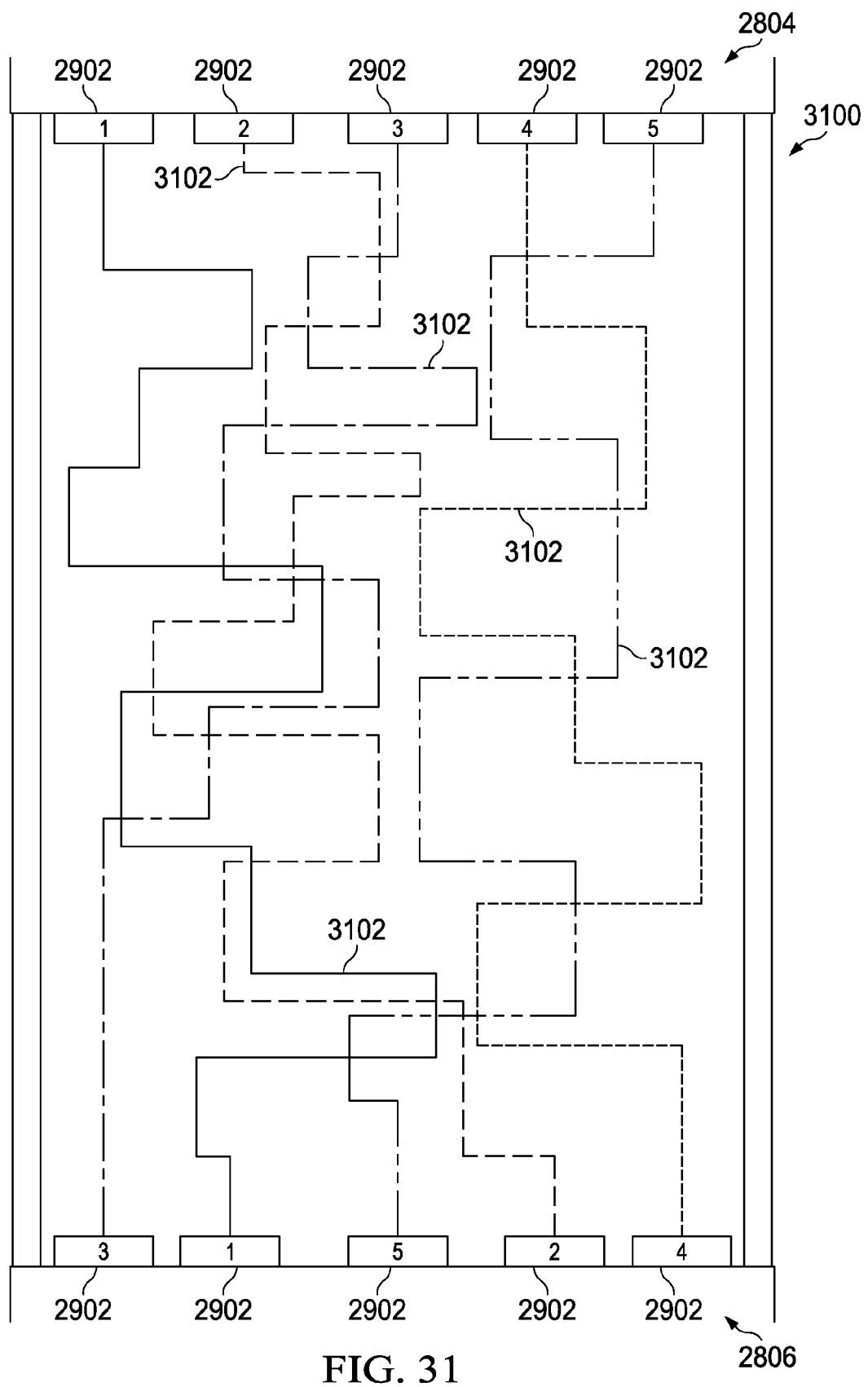

FIG. 31 illustrates an example game situation 3100 using a two-dimensional representation of a three-dimensional gaming environment. In this example game situation 3100, each player has completed a column 3102 from a platform attachment point 2902 of the top platform 2804 to a platform attachment point 2902 of the bottom platform 2806 (or vice versa). The correlated magnets of the game pieces 2808 (e.g., of FIGS. 28 and 32) enable many different types, locations, angles, etc. of attachment. Game situation 3100 illustrates some of what all can happen while playing. There are few if any limitations to creating a column with game pieces 2808, whether a player has started at the top platform 2804 to build a stalactite or has started at the bottom platform 2806 to create a stalagmite. If another player's pieces get in your way, then use your own to go around them. A player can wiggle and weave around anyone to complete his or her column 3102 to win the game.

Figure 32:
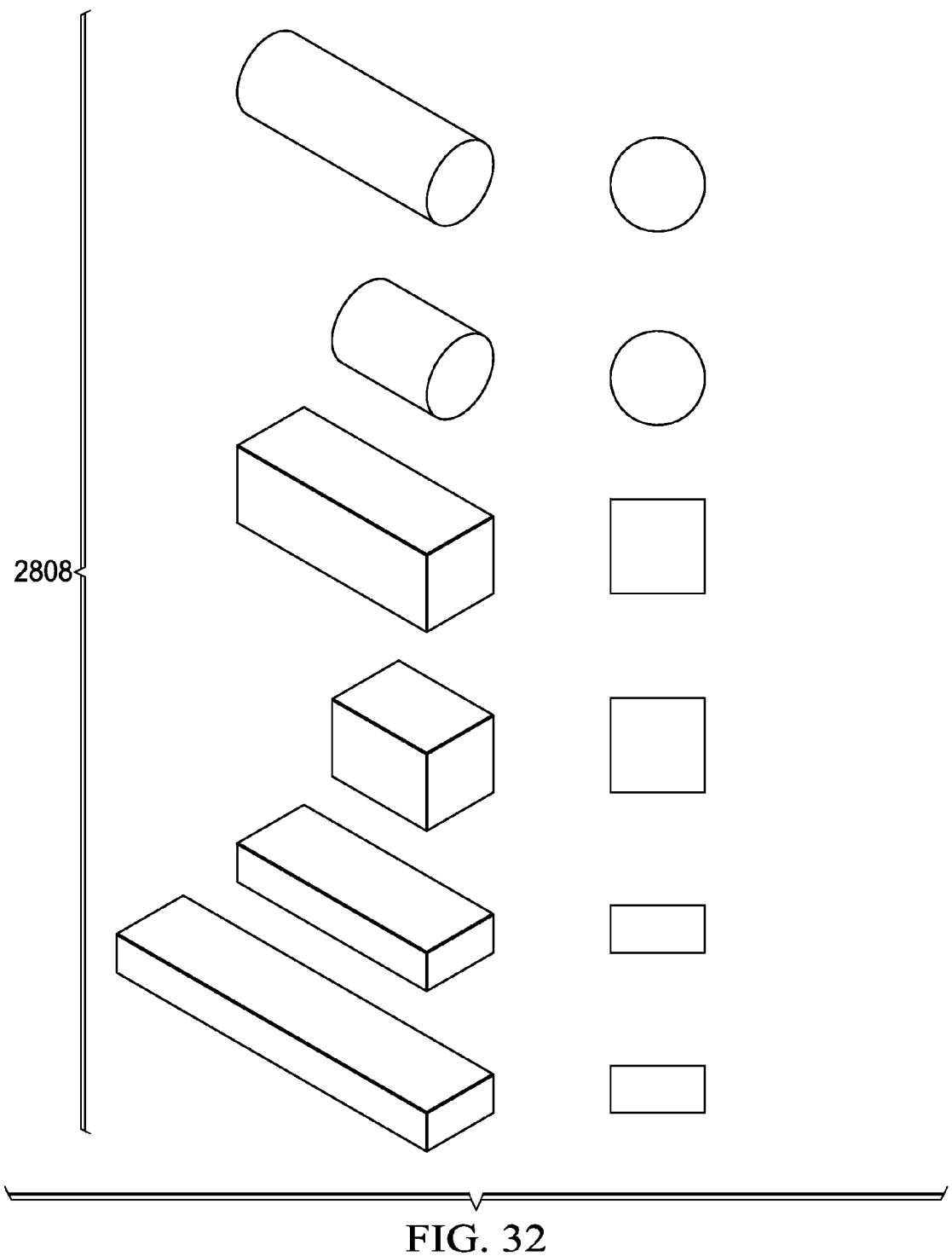

FIG. 32 illustrates some example game pieces 2808. Each player may have multiple shapes, lengths, sizes, etc. of game pieces 2808. Side or perspective views and front views of various different game pieces 2808 are shown. However, a game may alternatively include more, fewer, and or different kinds of game pieces 2808 than those that are shown. Game pieces 2808 may have one or more correlated magnetic structures (not shown) on their ends and/or sides in various combinations. The correlated magnetic structures may have various combinations of codes such that some will attach while others will not. Correlated magnetic structures may also be configured such that the game pieces 2808 are capable of attaching to each other at one or more predetermined angles/ rotations (e.g., 60 and 90 degrees).

VII. Shortest Path Effect (SPE)

As described herein above, recent pioneering innovations involve magnetic structures having designs based, for example, on signal correlation and coding theory. Such innovations enable magnetic forces to be precisely controlled to achieve desired alignments, coupling forces, release force characteristics, etc. and to produce unique magnetic identities to control how these magnetic structures interact. Example implementations of such magnetic structures, which may be referred to as correlated magnetic structures and/or coded magnets, may exhibit magnetic field behavior that enables them to be stronger than conventional magnets yet much safer because they can have less far field strength. This magnetic field behavior is the result of what can be termed a "shortest path effect".

Figure 33:
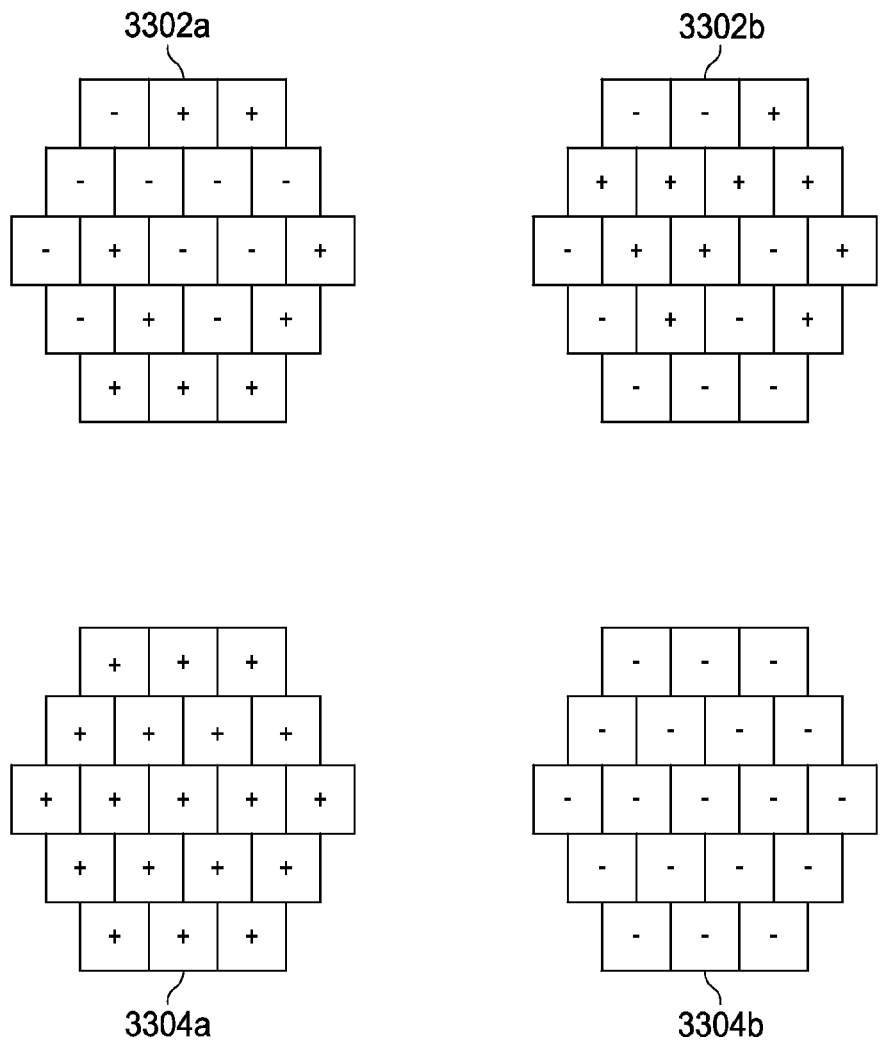
FIGS. 33-35 depict different magnetic structures that illustrate example aspects of a shortest path effect that may impact patterned magnetics technology.
Figure 34:
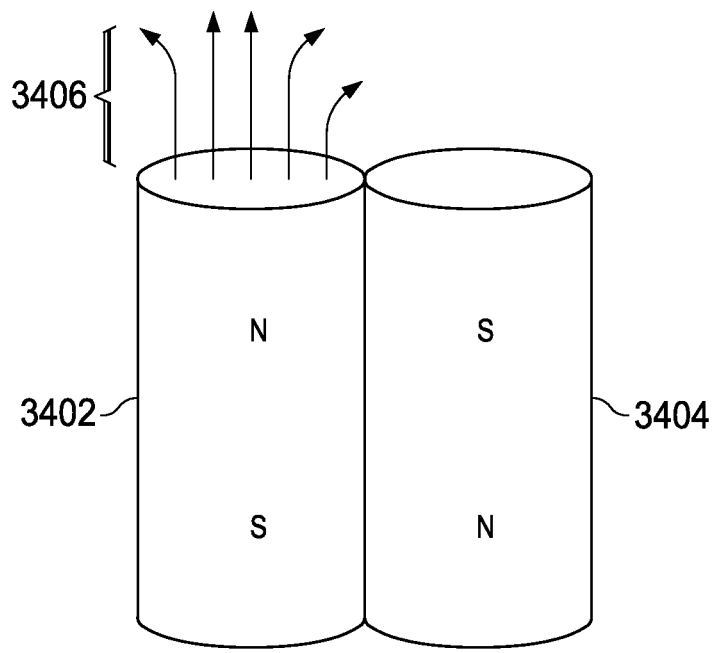
Figure 35:

FIGS. 33-35 depict different magnetic structures that illustrate example aspects of a shortest path effect. FIG. 33 depicts complementary-coded magnet structures 3302 (3302*a* and 3302*b*) and complementary magnet structures 3304 (3304*a* and 3304*b*). Each of the two structures 3302 and 3304 has two halves (a and b) with each half having nineteen magnetic sources arranged into a hexagonal shape. The complementary-coded magnet structures 3302 may be referred to as Yin-Yang coding due to their similarity to a YinYang symbol. The complementary magnet structures 3304 have all the same magnet polarities on each half 3304*a* and 3304*b*, which emulates conventional magnets. Because the same types of (e.g., discrete) magnets were used to produce the complementary-coded magnet structures 3302 and the complementary magnet structures 3304, they can serve as a mechanism to directly compare characteristics of correlated magnetic structures having sources with mixed polarities with the characteristics of conventional magnets.

When comparing the complementary-coded magnet structures 3302 and the complementary magnet structures 3304, it becomes apparent that it takes significantly more pull force to separate the two halves of the complementary-coded magnet structures 3302 than the pull force required to separate the two halves of the complementary magnet structures 3304. Tensile force measurements indicated that it took about twice the pull force, for an example prototype, to separate the complementary-coded magnet structures 3302 than it took to separate the complementary magnet structures 3304. Similarly, shear force measurements indicated that it took about twice the shear force to separate the complementary-coded magnet structures 3302 as it did to separate the complementary magnet structures 3304.

A visual comparison of the magnetic fields of the two magnetic structures 3302 and 3304 using magnetic viewing film reveals a rather dramatic difference in the magnetic field characteristics. Based on visual comparisons of magnetic field characteristics of the complementary-coded magnet structures 3302 and the complementary magnet structures 3304, it is clear that the magnetic structures having sources with mixed polarities (e.g., the complementary-coded magnet structures 3302) have a relatively higher near field density but a relatively lower far field density as compared to conventional magnets (e.g., as represented by the complementary magnet structures 3304). In order to better understand this difference in magnetic field behavior, magnetic field simulation experiments may be performed.

FIG. 34 depicts two discrete magnets 3402 and 3404 that are positioned adjacent to each other. Magnets 3402 and 3404 are arranged such that opposite polarities are adjacent to one another. FIG. 34 also depicts a simplified representation of a portion of a magnetic field 3406 emanating from magnet 3402. It should be understood that an actual magnetic field simulation for magnets 3402 and 3404 would be significantly more complex. For example, an actual magnetic field includes magnetic forces that extend through magnets 3402 and 3404. As shown, the presence of a "South" polarity of magnet 3404 next to a "North" polarity of magnet 3402 causes magnetic field portion 3406 to be effectively warped or bent downward from the North polarity of magnet 3402 to the South polarity of magnet 3404.

More generally, the field vectors of the two pairs of magnets 3402 and 3404 would have a relatively large amount of the magnetic field exiting the North polarity end of magnet 3402 and "immediately" entering the South polarity end of the adjacent magnet 3404. This "shortest path effect" may be analogized to a field density plot (not shown) that resembles an arc across a pair of electrical contacts. Thus, a shortest path effect may be described as being akin to a magnetic short that corresponds to an electrical short. The two ends of each magnet of the magnet pair 3402/3404 create some additional field density between the two pairs of magnets. There may also be a null area between the two pairs of magnets 3402 and 3404 where the fields appear to cancel each other. As a result of a shortest path effect, there may be significantly less far field density and/or significantly more near field density.

A shortest path effect has been described in the preceding paragraphs primarily in relation to discrete magnets. However, it is also applicable to maxels that are "printed" on a magnetizable material. Example embodiments for such a magnetizing printer are described herein above in a section entitled "Magnetizing Printer and Magnetizer Print Head". FIG. 35 depicts two complementary correlated magnetic structures 3502a and 3502b that may be created from maxels that are printed using a magnetizing print head.

Each maxel in the two coded magnets 3502a and 3502b was magnetized the same (e.g., same size and field strength) (except for polarity), a shortest path effect is evident by virture of maxels showing an increased magnetic field strength when in proximity to maxels having an opposite polarity orientation. The magnetic field strength of a given maxel relative to the magnetic field strength of the other maxels is directly attributable to a shortest path effect occurring or not between any two adjacent maxels.

Referring to FIG. 35, two different pairs of complementary maxels 3504 and 3406 are identified by arrows. Specifically, the left most identified maxel 3504 in the top coded magnet 3502a is complementary to the right most maxel 3504 identified in the bottom coded magnet 3502b. The right most identified maxel 3506 in the top coded magnet 3502a is complementary to the left most maxel 3506 identified in the bottom coded magnet 3502b. Each of the four identified maxels 3504 and 3506 has higher field strengths than other maxels. Generally, the intensity is substantially the same for both maxels for any given complementary pair of maxels 3504 and/or 3506. Maxels 3504 and 3506 have or experience relatively more shortest path effects (as compared to other maxels) due to their being in proximity to relatively more other maxels having an opposite polarity. For instance, maxels 3506 are surrounded by five maxels (out of a maximum possible six maxels in the illustrated example coding arrangement) that have an opposite magnetic polarity.

Generally, field strengths of each field source in a coded magnet may be varied relatively precisely. So, by taking into account shortest path effect characteristics as described herein as well as coding principles, the field strengths of field sources can be varied to produce consistent field measurements across a coded magnet to a desired level.

In example implementations, a shortest path effect is shown to increase with the number of maxels having an opposite polarity orientation that are adjacent to a given maxel. In other words, the greater the number of adjacent opposite polarity magnetic sources in a coded magnet, the greater the near field density and the lesser the far field density that may be generated due to a corresponding greater amount of shortest path effect. Thus, there is a scalability aspect of a shortest path effect. Increasing a number (or density) of adjacent opposite polarity maxels in a coded magnet results in an increase of the peak attractive force and also an increase in the rate of decay of the attractive force with separation distance between two magnetic structures. Consequently, appropriately configured coded magnets can produce a magnet pair having a stronger yet safer characteristic. Furthermore, such a characteristic is scalable to a large extent due to more and more occurrences of a shortest path effect as a number of maxels having physically-adjacent, but opposite polarity, maxels is increased.

An analogous situation with respect to potential energy, as compared to magnetic field forces, can be determined and/or established for coded magnets relative to conventional magnets. More specifically, investigation and integration of the available energy of coded magnets shows that their potential force at distances near to the surface is greater than that of conventional magnets. Such a result can be understood by noting that the combination of adjacent opposite polarity maxels results in an increase in the net field flux at certain places within the coded magnetic structure. This effect leads to both a larger concentration of the energy near the surface of a coded magnet and a sharp decline in the energy as the distance away from that surface increases. The total amount of potential energy is not being changed by the coding magnets. Instead, such potential energy is being concentrated into the near field, and it therefore does not extend as significantly into the far field.

Figure 36:
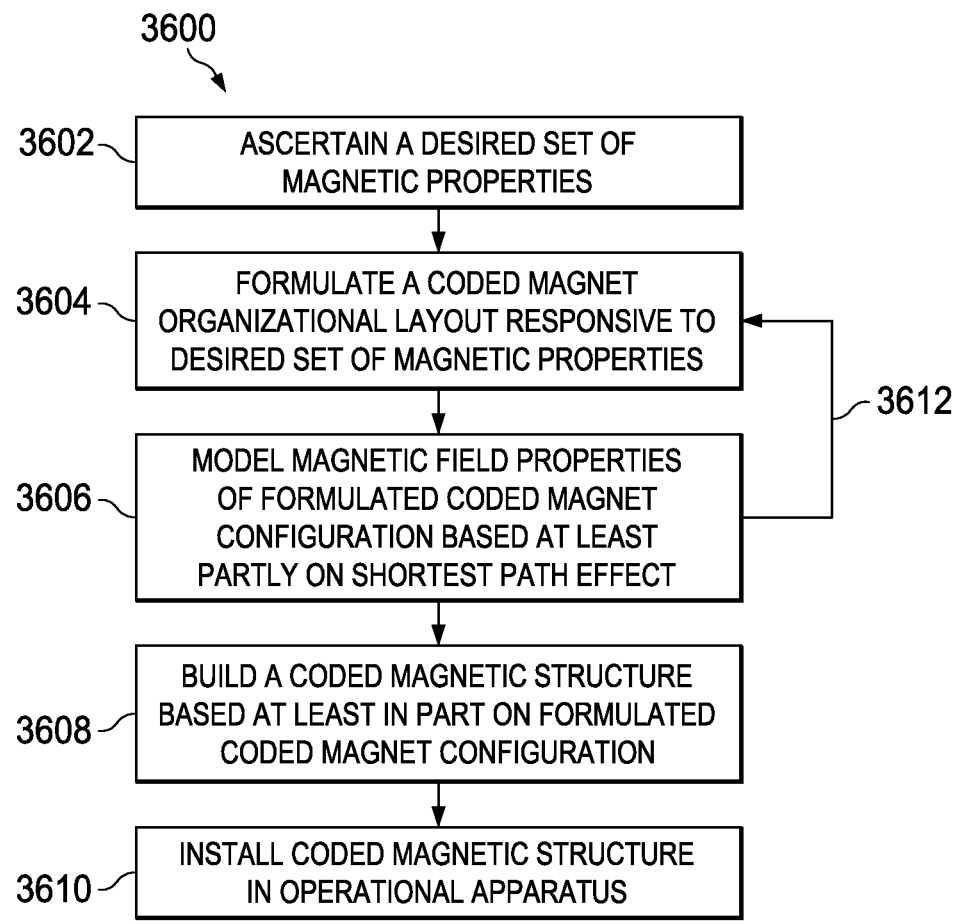
FIG. 36 depicts a flow diagram illustrating example methods for handling a shortest path effect in conjunction with patterned magnetics technology.

FIG. 36 depicts a flow diagram 3600 illustrating example methods for handling a shortest path effect in conjunction with patterned magnetics technology. As shown, flow diagram 3600 may include five stages/operations 3602-3610. Although stages/operations are shown in a particular order in flow diagram 3600, embodiments may be performed in different orders and/or with one or more stages/operations fully or partially overlapping with other stage(s)/operation(s). Moreover, a different number of operations (e.g., more or fewer) may alternatively be implemented.

For certain example embodiments, at stage/operation 3602, a targeted set of magnetic characteristics may be ascertained. For example, a shape, a field strength, a field pattern, a size, interactive behavior, a near vs. far field density/strength, any combination thereof, etc. for a coded magnet may be ascertained based, for instance, on project specifications.

At stage/operation 3604, a coded magnet configuration may be formulated responsive to the targeted set of magnetic characteristics. For example, a number of magnetic sources, a size of an overall magnetic structure, a size or sizes of individual magnetic sources, a layout of such sources, field strengths of individual magnetic sources, polarities of magnetic sources, a code of such sources, any combination thereof, etc. may be formulated.

At stage/operation 3606, magnetic field properties of the formulated coded magnet configuration may be modeled based, at least partly, on shortest path effect. Such modeling may account for the "warping" of a magnetic field due to adjacent magnetic source(s) having opposite polarities. Such modeling may further or instead account for any of the consequential aspects of a shortest path effect that arise between and/or among such magnetic sources as described herein above. For example, magnet field(s) resulting from the formulated coded magnet configuration may be simulated. Such a simulation may be performed through testing using physical materials, through electronic modeling, combinations thereof, and so forth.

Formulating in accordance with stage/operation 3604 and/or modeling in accordance with stage/operation 3606 may be performed, for example, in a fully or partially overlapping manner. They may be performed, additionally and/or alternatively, in an iterative fashion, such as by repeating formulating and modeling stages until a targeted set of magnetic characteristics is achieved, as represented by arrow 3612. Any one or more of at least stages/operations 3602, 3604, or 3606 may be implemented at least partially using a special purpose computing device. For example, one or more processors may be configured by instructions stored by one or more memories to execute such instructions and perform one or more of stages/operations 3602, 3604, or 3606.

At stage/operation 3608, a coded magnetic structure may be built based, at least in part, on the formulated coded magnet configuration. For example, a coded magnetic structure may be built in accordance with the formulated magnet configuration after some level of verification via modeling that such configuration is capable of at least meeting the targeted set of magnetic characteristics. As described further herein, such building may include constructing a coded magnetic structure from discrete magnetic sources, may include printing maxels onto magnetizable material, some combination thereof, and so forth.

At stage/operation 3610, the coded magnetic structure may be installed in an operational apparatus. By way of example only, the coded magnetic structure may be installed (e.g., added to, incorporated into, etc.) one or more of any of the example apparatuses and devices that are described herein (e.g., an energy collecting device in accordance with FIG. 14, 15, or 16; an adjustable correlated magnetic device in accordance with FIG. 21; a complex machine in accordance with FIG. 37; a magnetic foldable frame system in accordance with FIG. 39; those apparatuses that are otherwise listed/illustrated/described; combinations thereof; and so forth).

In an example implementation, consideration of a shortest path effect may enable creation of magnets having different near and far field strengths. By way of example only, a first portion of each of two magnetic structures can be described as being a short range portion, and the second portion of each of the two magnetic structures can be described as being a long range portion, where the short range portion and the long range portion produce opposing forces that effectively work against each other. The short range portion produces a magnetic field having a higher near field density and a lesser far field density than the magnetic field produced by the long range portion. Because of these near field and far field density differences, the short range portion produces a higher peak force than the long range portion yet has a faster field extinction rate such that the short range portion is stronger than the long range portion at separation distances less than a transition distance and weaker than the long range portion at separation distances greater than the transition distance, where the forces produced by the two portions cancel each other when the two magnetic structures are separated by a separation distance equal to the transition distance.

Coded magnetic structures, whether printed coded magnets or coded magnetic structures formed from discrete individual magnets, may have their characteristics tuned by a shortest path effect that occurs between adjacent magnetic sources having opposite polarity. A shortest path effect may result in an increase in a magnetic field density in a near field and a decrease in the magnetic field density in a far field. Such magnetic field behavior can enable coded magnetic structures to be designed, in certain example implementations, to be stronger yet safer than conventional magnets while using the same amount, shape, and/or grade of magnetizable material.

VIII. Example Machines

Figure 37:
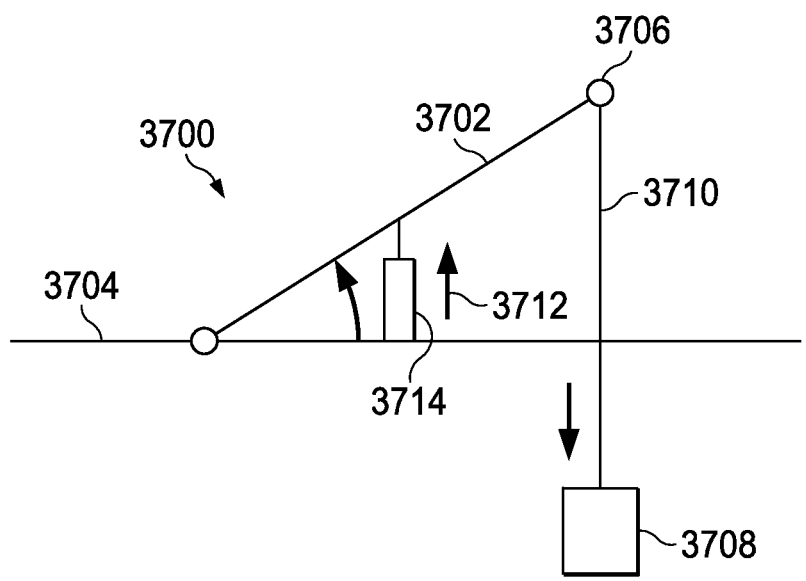
FIG. 37 depicts an example complex machine employing a magnetic force component.

For certain example embodiments, an ability to vary forces between two magnetic structures in a, e.g., non-linear manner may be enabled by varying their relative alignment and/or via multi-level magnetism that varies as a function of separation distance. These approaches can enable new types of simple machines that relate, for instance, to the six classical simple machines (e.g., the lever, the wheel and axle, the pulley, the inclined plane, the wedge, and the screw). Generally, new non-linear design dimensions enable force characteristics to be varied for given distances and alignments. Furthermore, new types of "complex" machines may be created based on combinations of new "simple" machines. FIG. 37 depicts an example complex machine 3700 employing a magnetic force component.

More specifically, FIG. 37 depicts an example complex machine 3700 involving a bar 3702 having one end pivoting on a surface 3704 and a pulley 3706 on an opposite end from which a weight 3708 is suspended via a rope 3710 or the like. At a point along the bar 3702, a force 3712 is applied by a magnetic force component 3714, which may be two or more magnetic structures coded to produce a desired force versus distance curve. By using different magnetic structures having different force versus distances curves (i.e., force curves), different functionalities of the complex machine 3700 can be produced. For example, if a force curve is programmed that exhibits a sinusoidal function with extension, then the force on the weight 3708 will be linear over the range in which that curve is accurate, which simulates the effect of a relatively long spring.

IX. Additional Example Implementations

Multiple additional example implementations are described in this section with particular reference to FIGS. 38-42. Described first are FIGS. 38A-38E, which depict example magnetic dzus devices.

Figure 38A:
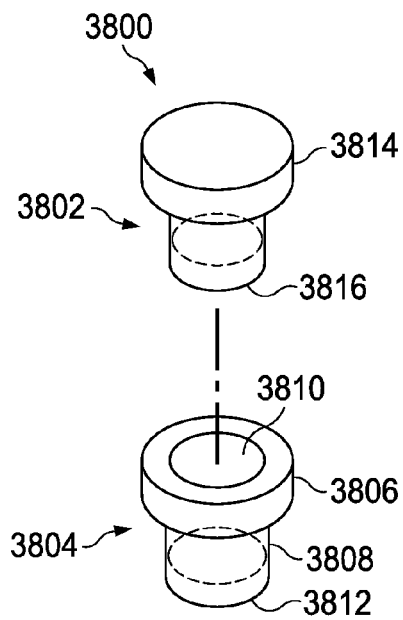
FIGS. 38A-38E depict example magnetic dzus devices.
Figure 38B:
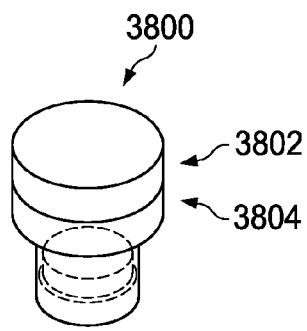

More specifically, for certain example embodiments, FIGS. 38A and 38B depict an exemplary coded magnet Dzus connector 3800 (in three different parts or phases of combination) comprising a male portion 3802 and a female portion 3804. The female portion 3804 has a lip 3806 surrounding cylinder 3808 having an opening 3810 (or hole 3810) within which the male portion 3802 can be inserted. A coded magnet 3812 may be located at the bottom of the cylinder 3808. The male portion 3802 has a top 3814 that marries up with the lip 3806 of the female portion 3804 when inserted. The male portion 3802 has a complementary coded magnet 3816 at the bottom thereof that attaches to the coded magnet 3812 of the female portion 3804 when aligned and easily detaches when rotated out of alignment. The lip 3806 of the female portion 3804 and/or the top 3814 of the male portion 3802 can also or alternatively comprise coded or uncoded magnets, depending on how the Dzus connectors 3800 are to be used.

Figure 38C:
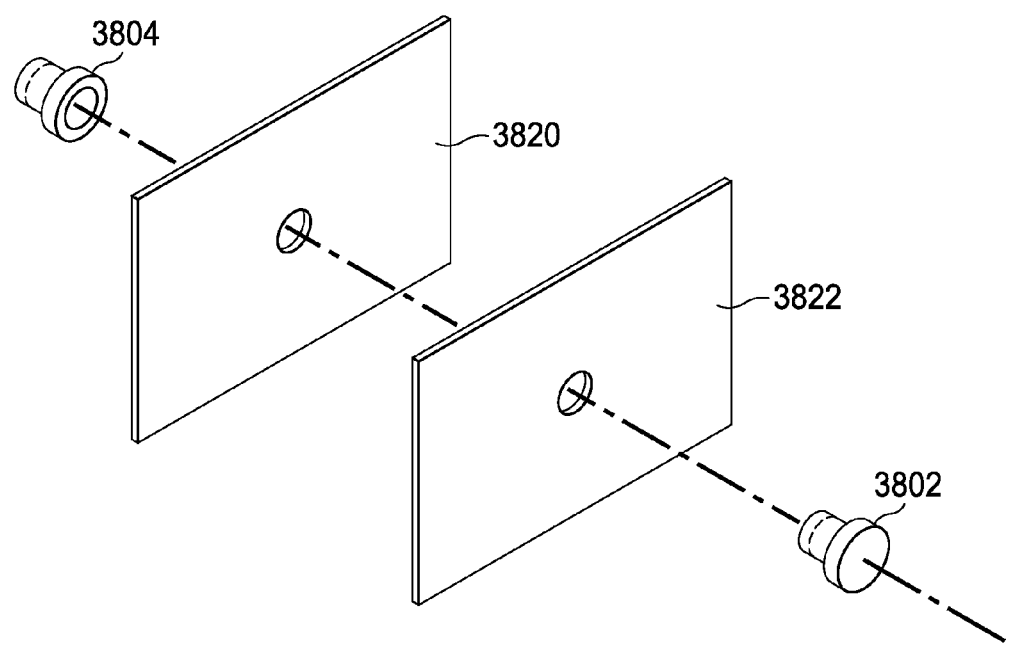
Figure 38D:
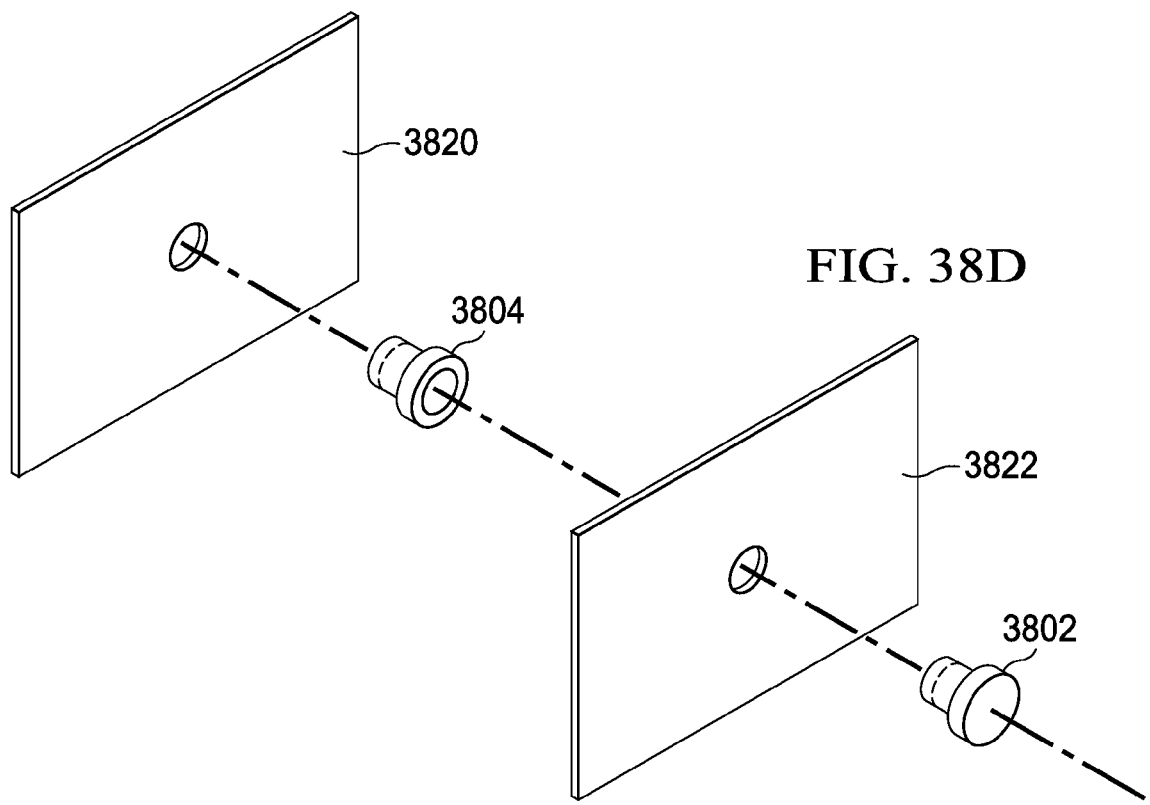

Under an example arrangement shown in FIG. 38C, the female portion 3804 may be attached to one side of a first piece of a material 3820 (e.g., a piece of metal 3820) about a hole in the material. The male portion 3802 can pass through a corresponding hole in a second piece of material 3822 (e.g., another piece of metal 3822) and then through the hole in the first piece of material 3820 such that the two coded magnets 3812 and 3816 interact so as to hold together the two pieces of material 3820 and 3822. The reverse approach can also be employed where the male portion 3802 is instead inserted through a hole in a first piece of material 3822 and then a second piece of material 3820 and then capped by a female portion 3804 to hold together the two pieces of materials 3820 and 3822. Under an example alternative arrangement shown in FIG. 38D, the female portion 3804 may be inserted through a first piece of material 3820 and then the male piece 3802 may be inserted through a second piece of material 3822 and into the female portion 3804 such that the lip 3806 of the female portion 3804 resides between the two pieces of materials 3820 and 3822.

Generally, all sorts of male and female Dzus connectors 3800 and uses thereof are possible whereby the thickness, outside diameter, cylinder size and length, combinations thereof, etc. can be varied for a given application. One of the two portions 3802 and 3804 can be adhered to a material using an adhesive, a weld, etc. and can include plastic or other components intended to be inserted into a hole that prevents a part from exiting such a hole (e.g., similar to certain devices designed to be inserted into a hole in a wall, such as hole in sheet rock, and further designed to prevent or at least retard the device from subsequently exiting the hole).

Figure 38E:
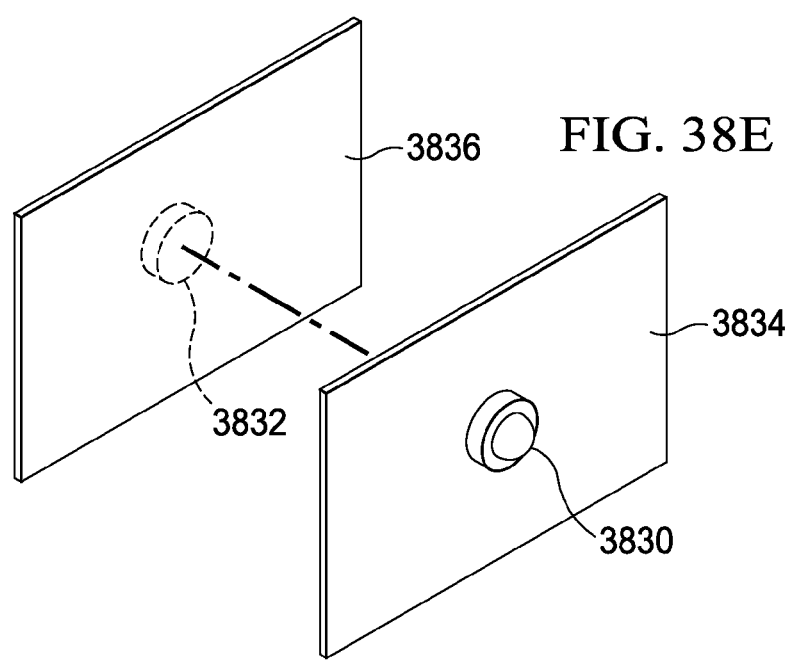

Under another example arrangement depicted in FIG. 38E, the male and female portions are replaced by first and second portions 3830 and 3832 where the first portion 3830 is adhered to one side of a piece of material 3834 (e.g., a thin piece of plastic 3834), and the second portion 3832 is placed on an opposite side of another piece of material 3836 (e.g., another thin piece of plastic 3836). Under such an arrangement, the male and female extensions of the two portions 3802 and 3804 (e.g., of FIG. 38A) may be omitted such that the portions 3830 and 3832 might resemble two conventional (e.g., round) magnets. The two pieces of material 3834 and 3836 may therefore be attached without requiring holes to be drilled in them. With any given implementation, any of various types of approaches may be employed to enable one of the two portions to be turned (e.g., a slot for a tool, a handle to grasp, etc.). Additionally, various approaches can be used to constrain movement, for example, over a desired turning radius.

FIGS. 39A-39G depict an example magnetic foldable frame system. More specifically, FIGS. 39A-39G depict an example foldable frame system 3900 based on correlated magnetic structures. In certain example implementations, magnets in housings are attached to frames. A given housing may have a predetermined alignment between coded magnets within the housing such that they will attach, causing a desired angle between the frames associated with them. By carefully designing tent frames and other structures, the frames can be folded into a small area (e.g., a box, a backpack, etc.). When needed, they can be folded out in a variable or set order of movements to quickly take a desired shape that is structurally strong. Yet, by refolding the structure in a reverse order of movements, the structure is again folded into the small area. Various approaches can be employed to produce various forms of frames, which may include one or more locking mechanisms intended to prevent accidental folding of all or any portion of the frame system.

Figure 39A:
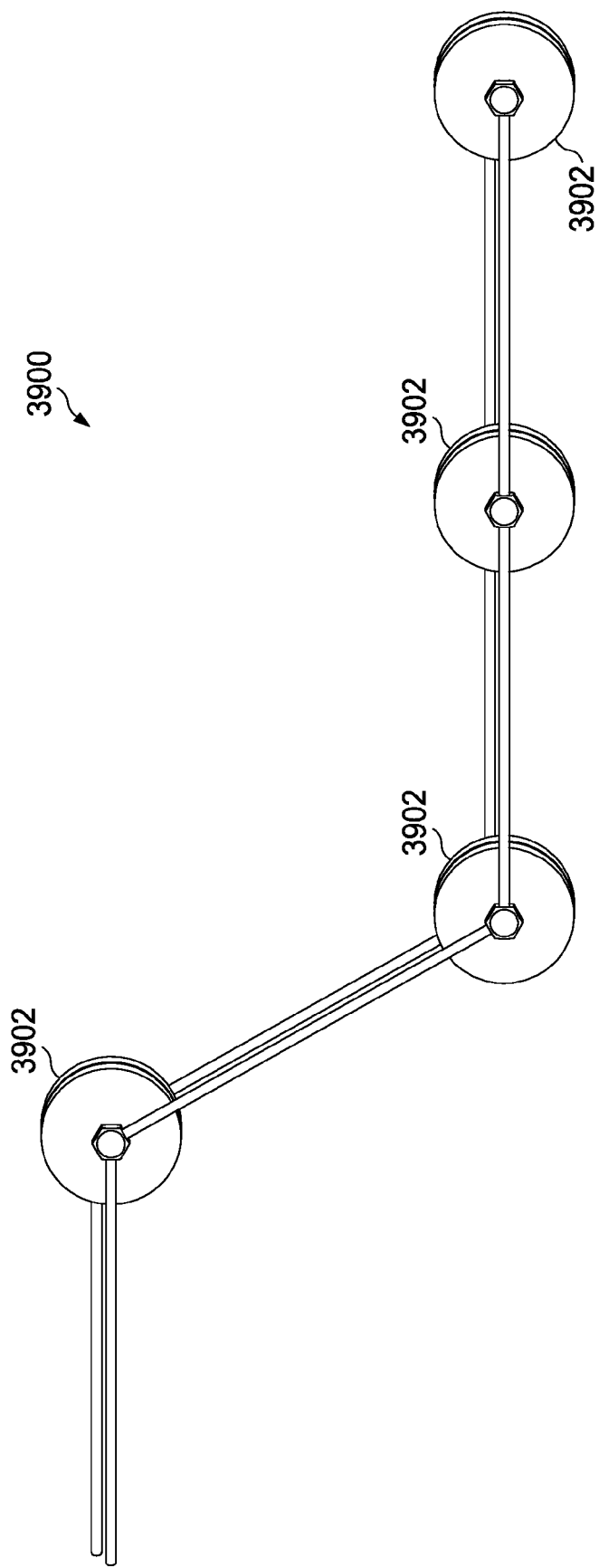
FIGS. 39A-39G depict an example magnetic foldable frame system.
Figure 39B:
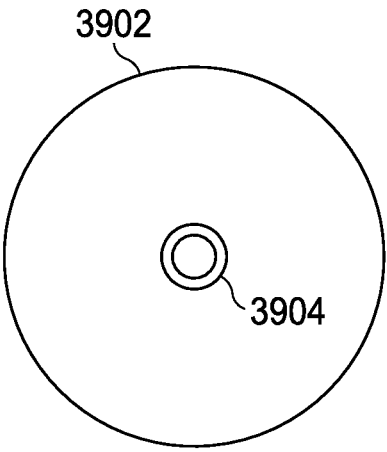
Figure 39C:
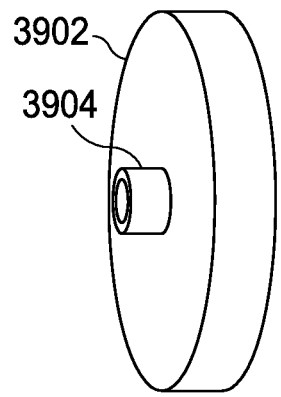

For certain example embodiments, with reference to FIG. 39A, a correlated magnetic foldable frame system is shown. Two ring magnets in housings 3902 may be used for foldable frames that are capable of rapid assembly and/or disassembly for, by way of example but not limitation, general structures, furniture, packing boxes, storage containers, and so forth. Ring magnets may be coded to attract (e.g., to attach) at up to 1–N different locations (e.g., at one location, at every 90 degrees, at every 45 degrees, at 30 degree increments, at 30-60-90-135 degrees, etc.) and to otherwise repel each other. Such devices may be augmented with a mechanical lock/unlock mechanism to disallow and/or allow turning under certain conditions/times but not others.

Figure 39D:
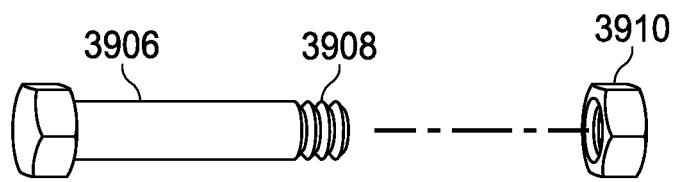
Figure 39E:
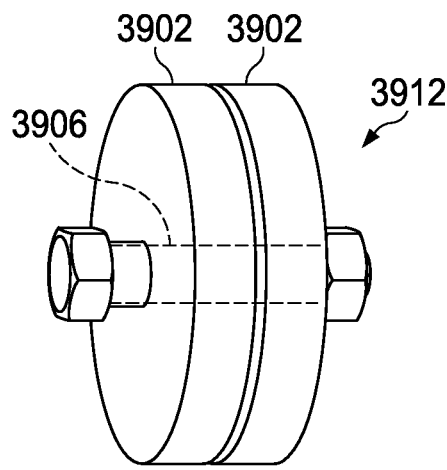

FIGS. 39B-39E illustrate additional example aspects of a correlated magnetic foldable frame system. Two ring magnet housings 3902 are shown as having a sleeve/outer axel 3904 in FIGS. 39B and 39C. A bolt 3906 may include a threaded portion 3908, which is adapted to receive a lock nut 3910, as shown in FIG. 39D. A dual-housing assembly 3912 is shown with the bolt 3906 being inserted within the sleeve/outer axel 3904 in FIG. 39E. Each housing 3902 may include at least one coded magnet (not shown) that is designed to correlate with a corresponding complementary coded magnet on the other housing 3902 of the dual-housing assembly 3912 to establish predetermined angles of assembly. The bolt 3906 may act as an inner axel. The sleeve/outer axel 3904 may enable one or two armatures to pivot, depending on design.

Figure 39F:
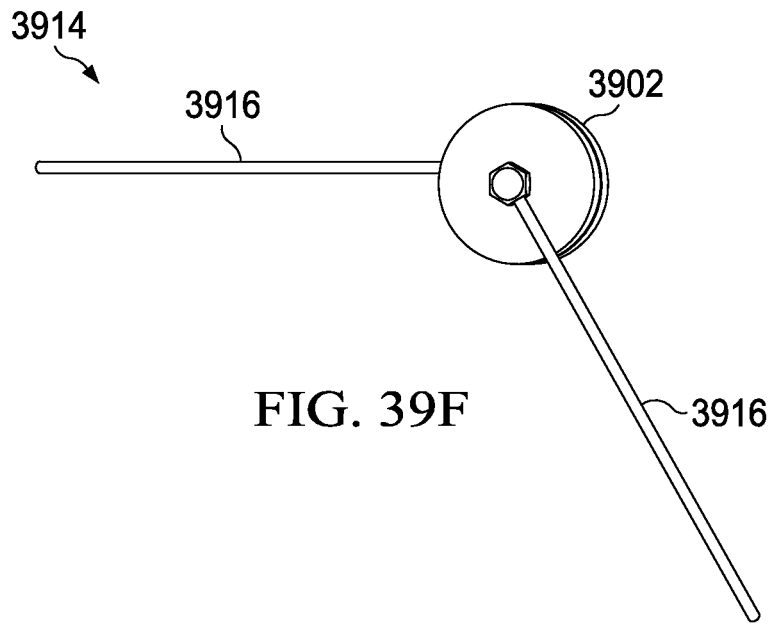
Figure 39G:
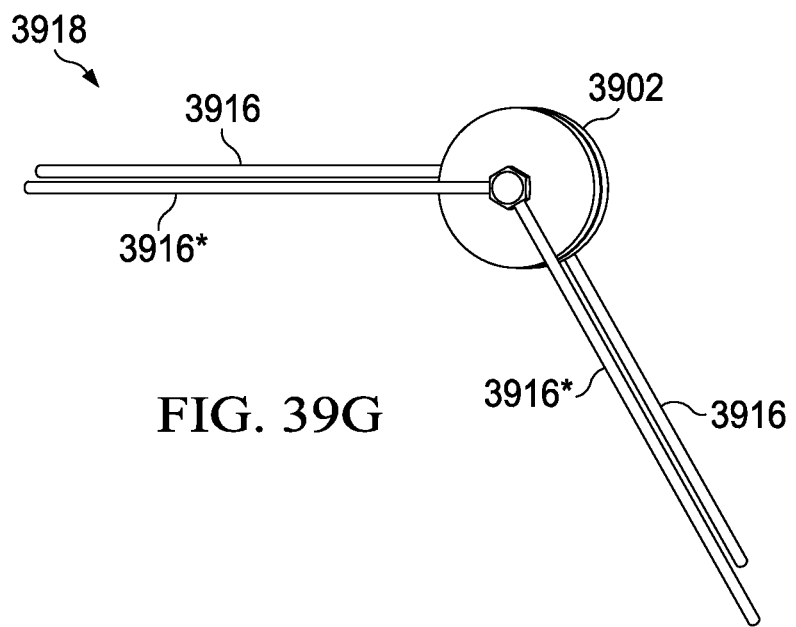

FIGS. 39F and 39G illustrate two example arrangements. At example arrangement 3914 of FIG. 39F, armatures 3916 may be fixed to each of two ring magnet housings 3902 (with one being explicitly visible). Example arrangement 3918 of FIG. 39G may be similar to arrangement 3914. However, arrangement 3918 may further include two additional complementary pivoting armatures 3916\*. Armatures 3916\* that may pivot about the outer axels may complement the armatures 3916 (which are fixed in arrangement 3914). One or more clips (not shown) or other fastening mechanism(s) may secure complementary armatures 3916\*. In an example implementation, an armature 3916\* that is complementary to a given armature 3916 may be configured such that it rotates about the outer axel 3904 of a housing 3902 to which the given armature 3916 is fixed and to be fixed to the housing 3902 that the given armature 3916 is able to rotate about the outer axel 3904 of the housing 3902. Also or alternatively, a given armature 3916/3916\* may be configured to be fixed to one housing 3902 and to rotate about an outer axel 3904 of a successive housing 3902. Inner and outer axels 3904 and/or a bolt 3906 may have a coating thereon for reducing friction.

Figure 40A:
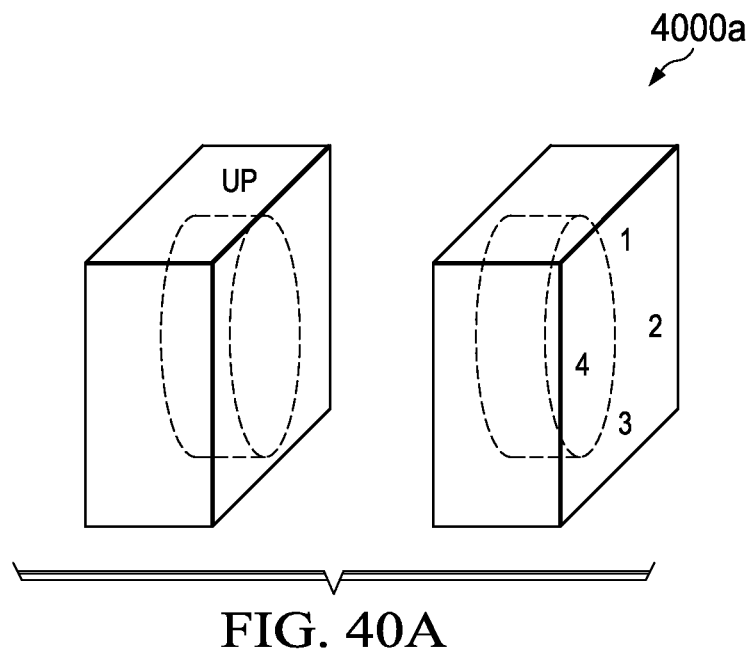
FIGS. 40A-40C depict examples of magnet-based glass cleaning systems.
Figure 40B:
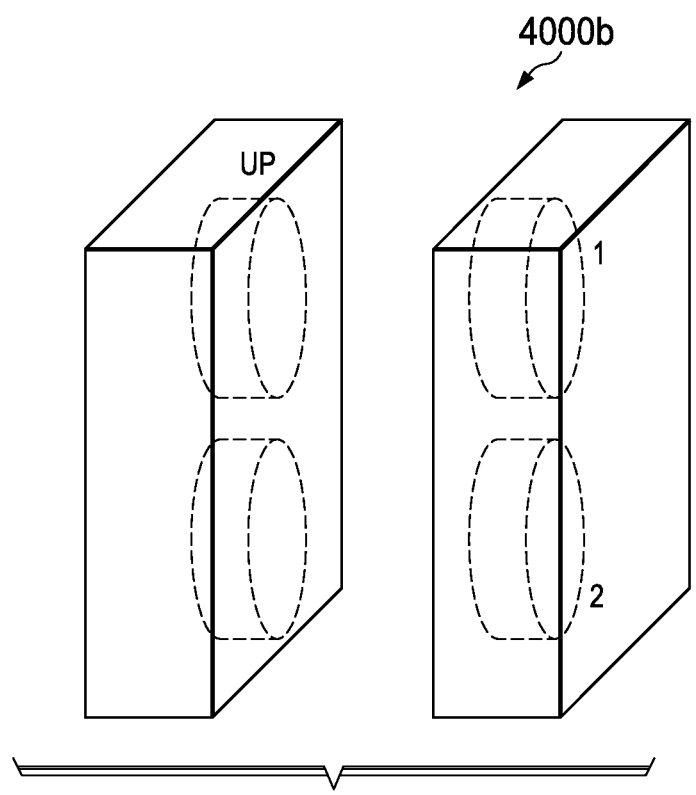
Figure 40C:
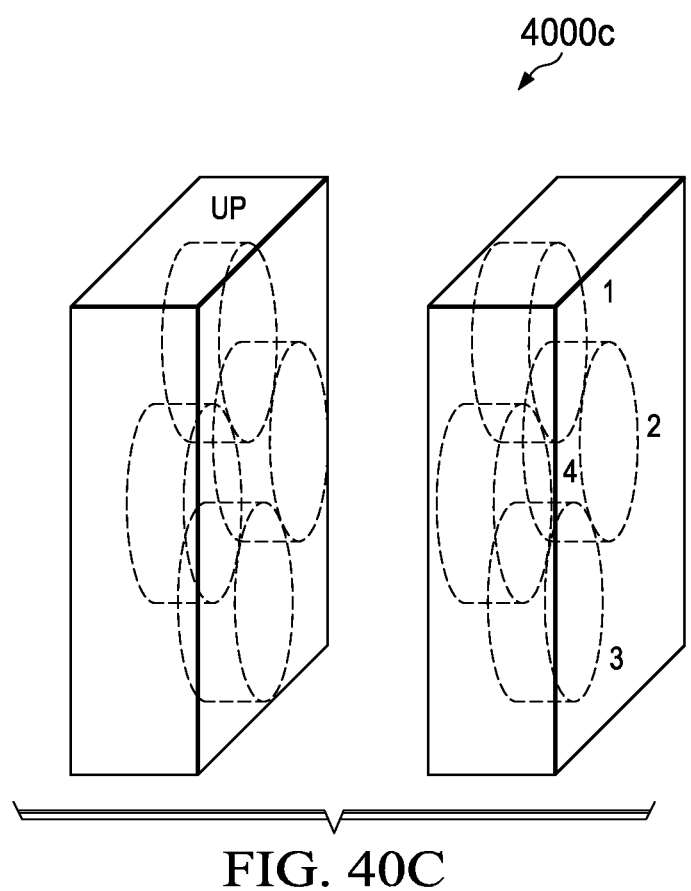

FIGS. 40A-40C depict examples of magnet-based glass cleaning systems 4000. More specifically, FIGS. 40A, 40B, and 40C depict variations of a glass cleaning system 4000a, 4000b, and 4000c, such as, for example, a glass tank cleaning system (e.g., a fish tank, a terrarium, etc.). As shown in the figures, two portions of each system 4000 are each depicted as box-like objects; however, each can have any shape that is capable of containing at least one magnetic structure. In accordance with one example arrangement, one of the two portions (e.g., the left depicted portion) may have a desired orientation (e.g., one side UP) that may be placed on one side of a piece of glass (e.g., inside a fish tank). The other portion (e.g., the right depicted portion) then attracts the one portion with the glass being in between the two portions.

Glass cleaning system 4000a is shown with one magnetic structure for each portion of the two portions. Glass cleaning system 4000b is shown with two magnetic structures for each portion of the two portions. Glass cleaning system 4000c is shown with four magnetic structures for each portion of the two portions. However, a portion may have any number of magnetic structures. In certain example implementations, the magnetic structures may be coded to attract strongly and therefore securely magnetically couple the two portions. Moreover, an appropriately correlated pair (or pairs) of magnetic structures may enable a particular orientation to be maintained between the two portions to prevent relative rotation. In certain example implementations, magnetic structures may be coded so as to exhibit multilevel behavior that has tuned near and far field attract and repel behaviors appropriate to reduce the likelihood that glass is damaged (e.g., scratched, cracked, shattered, etc.) when the two portions are brought together with the glass there between.

One or more coatings (e.g., Velcro or another scrubbing/polishing coating) may be included on one or both of the two portions to assist in cleaning the inside or the outside of a glass tank. In one example approach, both portions may align to produce a peak force when both are positioned with a common orientation (e.g., two sides that are both marked UP are in alignment). Alternatively, one portion might be turned to one of a plurality of relative orientations (e.g., 1 or 2 as shown in cleaning system 4000b; 1, 2, 3, or 4 as shown in cleaning system 4000c, etc.) to achieve one of a plurality of different attractive forces, which may accommodate different thicknesses of glass. Such a cleaning system may furthermore be used to clean materials besides glass, such as other transparent materials (e.g., Plexiglas, plastic, etc.) or other materials generally.

Figure 41:
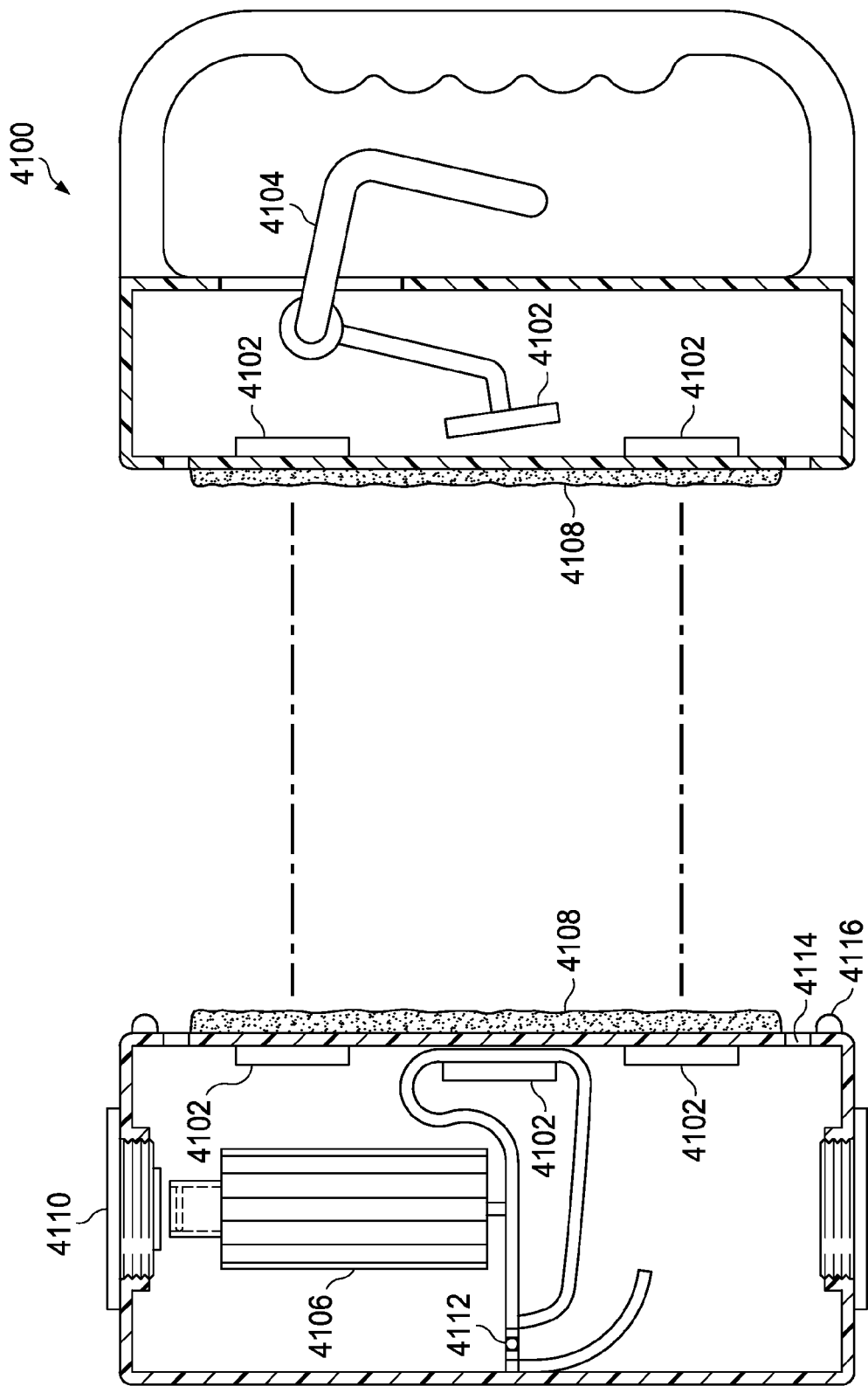
FIG. 41 depicts an example aquarium cleaning system that may be employed with an aquarium.

FIG. 41 depicts an example aquarium cleaning system 4100 that may be employed with aquariums having walls formed from different kinds of materials, including but not limited to transparent materials. Aquarium cleaning system 4100 depicts a relatively aquarium-specific wall cleaning system as compared to the more general systems 4000 of FIG. 40. For an example implementation, aquarium cleaning system 4100 may include at least two magnet pairs 4102 that are used to secure the two portions (which may be analogous to those of FIG. 40). As shown, each of the portions of the cleaning system includes three such magnet pairs 4102, which are arranged vertically in the illustrated cut-away.

In an example implementation, one pair (e.g., the middle pair as shown) may have a pump lever 4104 (that is capable of being manually operated and/or motorized) that is used to move one of two magnets having a contactless attachment behavior (e.g., derived from multilevel magnetism as described herein above). Moving the middle magnet with pump lever 4104 causes the corresponding magnet on the left to compress the tubing. This may be used to pump water through a bladder and/or a filtration system 4106 that is included within (and/or attached to) the portion on the left that is inside the aquarium. Such a pumping and/or filtration system can reduce at least a portion of the algae that is removed from the glass from being dispersed into the aquarium water. A main aquarium filter would therefore no longer be responsible for cleaning up the algae waste produced by cleaning the walls or other panels of the aquarium. The filtration system 4106 may include a flap valve and/or backwash intake, either or both of which may be magnetic.

In accordance with other example implementations, each of the two portions may include material(s) 4108 for cleaning the glass surface. These materials may differ for the water and the dry sides and may be cleanable, replaceable, etc. The tank portion may further include one or more plugs 4110 for rinsing the interior. Such plugs may be sealed magnetically. A ball valve 4112 may be part of the bladder system operated by the pump lever 4104 and middle magnet pairs. At the top, bottom, or both the top and the bottom of the tank portion, hole(s) 4114 for vacuum action and/or a seal/squeegee 4116 may be disposed proximate to the glass face area.

Figure 42:
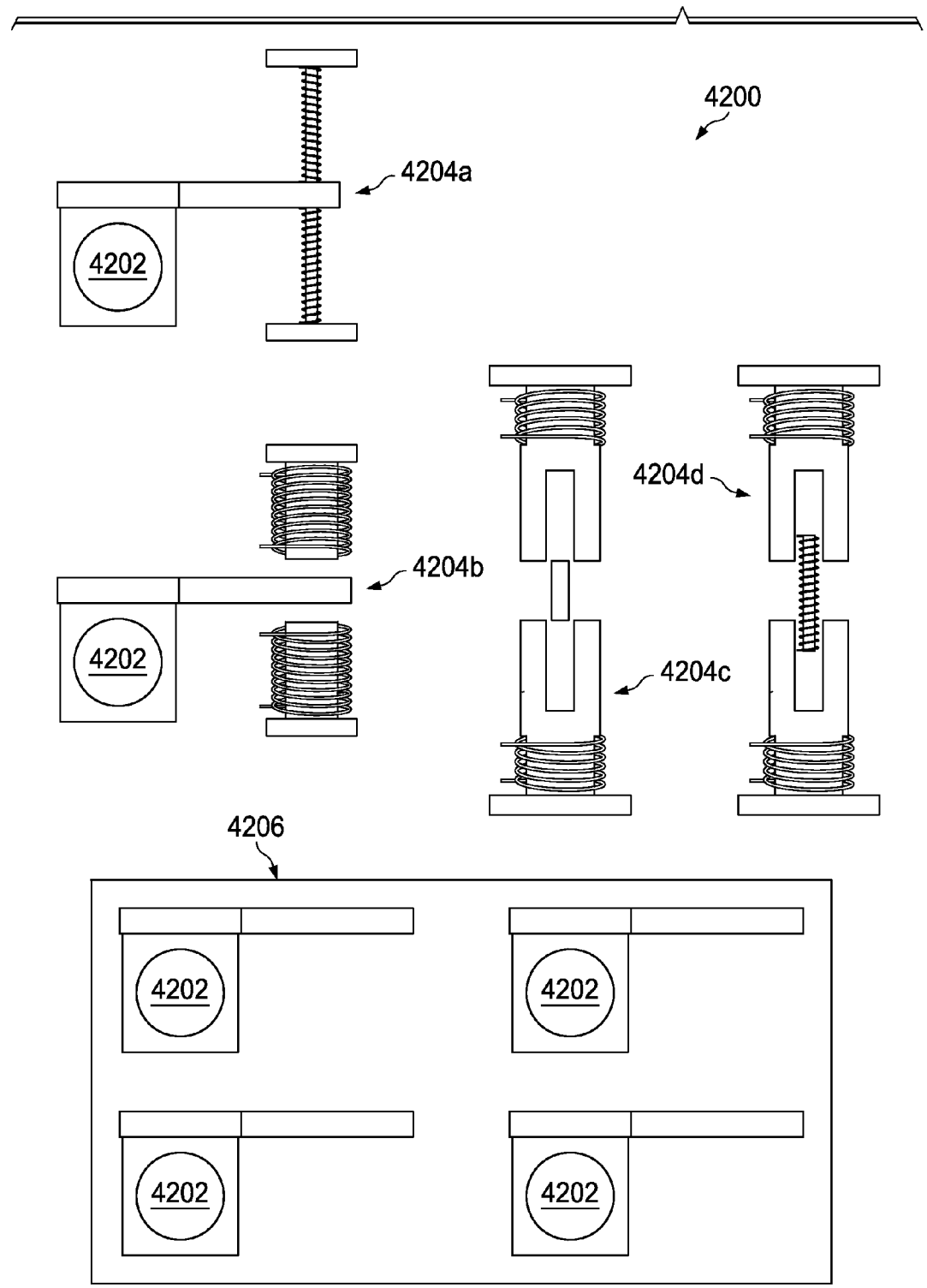
FIG. 42 depicts an example magnetic door latch.

FIG. 42 depicts an example magnetic door latch 4200. More specifically, for certain example embodiments, FIG. 42 depicts example door-locking mechanisms 4200 that are capable of replacing existing electro-magnetic door locks. Existing electro-magnetic door locks currently require power to be on while in a locked position. In contrast, in accordance with example implementations, correlated magnetic locking mechanisms may be locked even while power is not on. A first coded magnetic structure is fixed to a door (not shown) and a second complementary coded magnetic structure 4202 is mounted to a doorframe such that it can rotate. Alternatively or additionally, a rotating magnetic structure may be located on/in the door. The two magnets will align and attract/attach when the door is in a closed state.

When unlocking the door, an electromagnetic device 4204 (e.g., a solenoid) may be used to turn the rotatable magnet 4202, which causes the two magnetic structures to de-correlate and release the lock. By de-correlating the magnets, the door is enabled to be opened. When in an open position, the magnets can be coded to have, for example, a slightly attractive force, a neutral force, or a repulsive force, depending on a desired level of latching bias. A manual safety override may also be included to ensure egress is possible in an emergency.

For an example implementation, a push/pull solenoid of an electromagnetic device 4204a may directly contact a lever or other device to rotate the magnetic structure 4202. Alternatively, other (e.g., pin-less) electromagnetic devices 4204b, 4204c, and/or 4204d may be employed to rotate the magnet in which a (e.g., metal) member acts as a lever. Also and/or alternatively, multiple such magnets 4202 may be used in many of various forms to realize a compound locking mechanism 4206.

X. Further Additional Example Implementations

FIGS. 43-47, by way of example but not limitation, depict correlated magnets that are illustrated in one or more example manners. However, sizes, shapes, numbers, etc. of magnetic sources may be implemented in alternative manners. Furthermore, the size, shape, configuration, coding, etc. of the overall correlated magnetic structures may also be implemented in alternative manners. The depicted example correlated magnets serve to illustrate certain principles, but they may be modified for other implementations in accordance with the teachings herein.

Figure 43A:
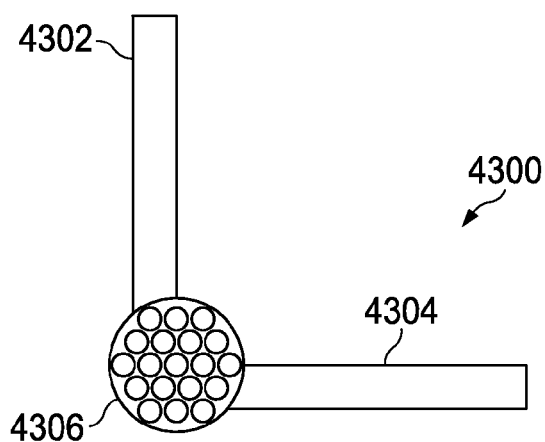
FIGS. 43A and 43B depict an example of a rotating lid that may be manipulated using correlated magnetics.
Figure 43B:
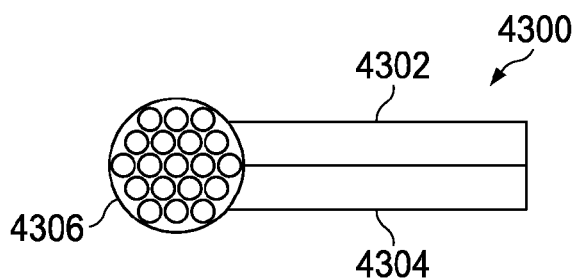

FIGS. 43A and 43B depict an example of a rotating lid apparatus 4300 that may be manipulated using correlated magnetics. As illustrated, the rotating lid apparatus 4300 may include a lid 4302, a rim 4304, and a correlated magnetic hinge 4306. For certain example embodiments, the rotating lid apparatus 4300 may be placed on/over or be part of a container (not shown). Example containers include, but are not limited to, boxes of various purposes, such as storage boxes in a garage, a box in or over a pick-up truck bed, and so forth.

For an example operative implementation, the lid 4302 may be lowered onto the rim 4304 to effectuate a closed position for a container, as shown in the upper diagram of FIG. 43A. The rim 4304 may form an upper portion of such a container. The lid 4302 may be raised away from the rim 4304 to effectuate an open position for a container, as shown in the lower diagram. The lid 4302 may be raised and lowered about a magnetic hinged area 4306. When in a closed position as shown in FIG. 43B, magnetic hinged area 4306 may establish a first magnetic field force level using, e.g., correlated magnets. Such a first magnetic force level may be relatively lower (e.g., approximately 25 pounds) to "merely" secure the lid 4302 to the rim 4304. When in an open position, magnetic hinged area 4306 may establish a second magnetic field force level using, e.g., correlated magnets. Such a second magnetic force level may be relatively higher (e.g., approximately 75 pounds) to secure the lid 4302 away from the rim 4304 at one or more predetermined angles (e.g., 90 degrees to be perpendicular to the earth's surface) and to prevent the lid 4302 from closing/falling on anyone. Although an example correlated magnet is depicted as part of magnetic hinged area 4306, such a correlated magnet may alternatively be concealed within a hinge apparatus.

Figure 44A:
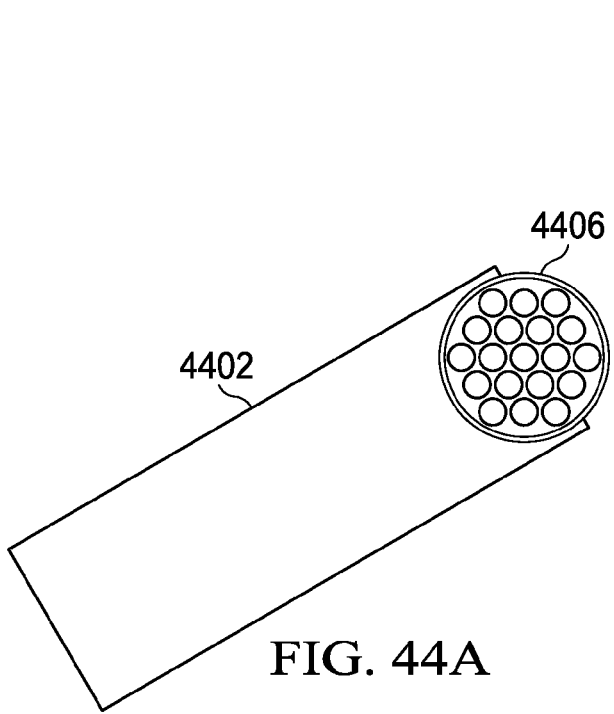
FIGS. 44A and 44B depict two example structures that may be coupled with a high degree of precision using correlated magnetics.
Figure 44B:
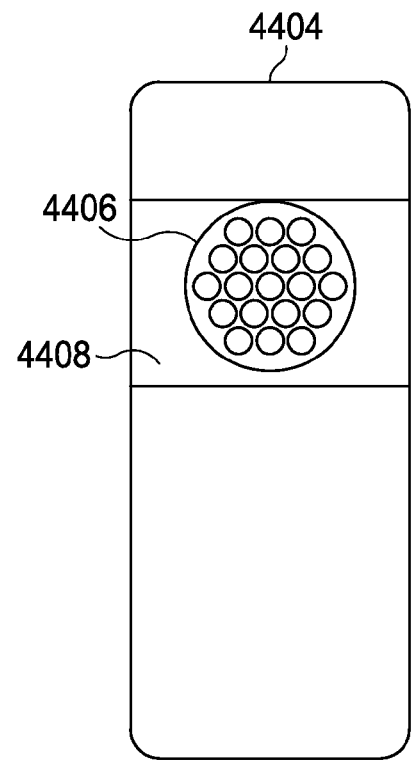

FIGS. 44A and 44B depict two example structures 4402 and 4404 that may be coupled with a high degree of precision using correlated magnetics (e.g., using an enhanced placement technique). As illustrated, a member 4402 may be intended to be connected to an apparatus 4404. Such a connection may have a relatively precise constraint with regard to placement of the member 4402 with respect to the apparatus 4404. In an example implementation, a member 4402 may be a strut or another structure involved in a mechanically-fastened joint. For certain example embodiments, placement may be tightly controlled with relatively high precision using correlated magnets 4406.

In an example operative implementation, a correlated magnet 4406 may be positioned at one end of a member (e.g., strut) 4402 and another correlated magnet 4406 at a targeted location 4408 of an apparatus 4404. The correlated magnets 4406 may be attached and then a load may be added to determine if a moment is created. If so, then placement of member 4402 with respect to apparatus 4404 is not yet sufficiently accurate. The location of the target 4408 may be changed and then the loading may be retested. The member 4402 may be tapped when a sufficiently-precise placement is achieved.

Figure 45:
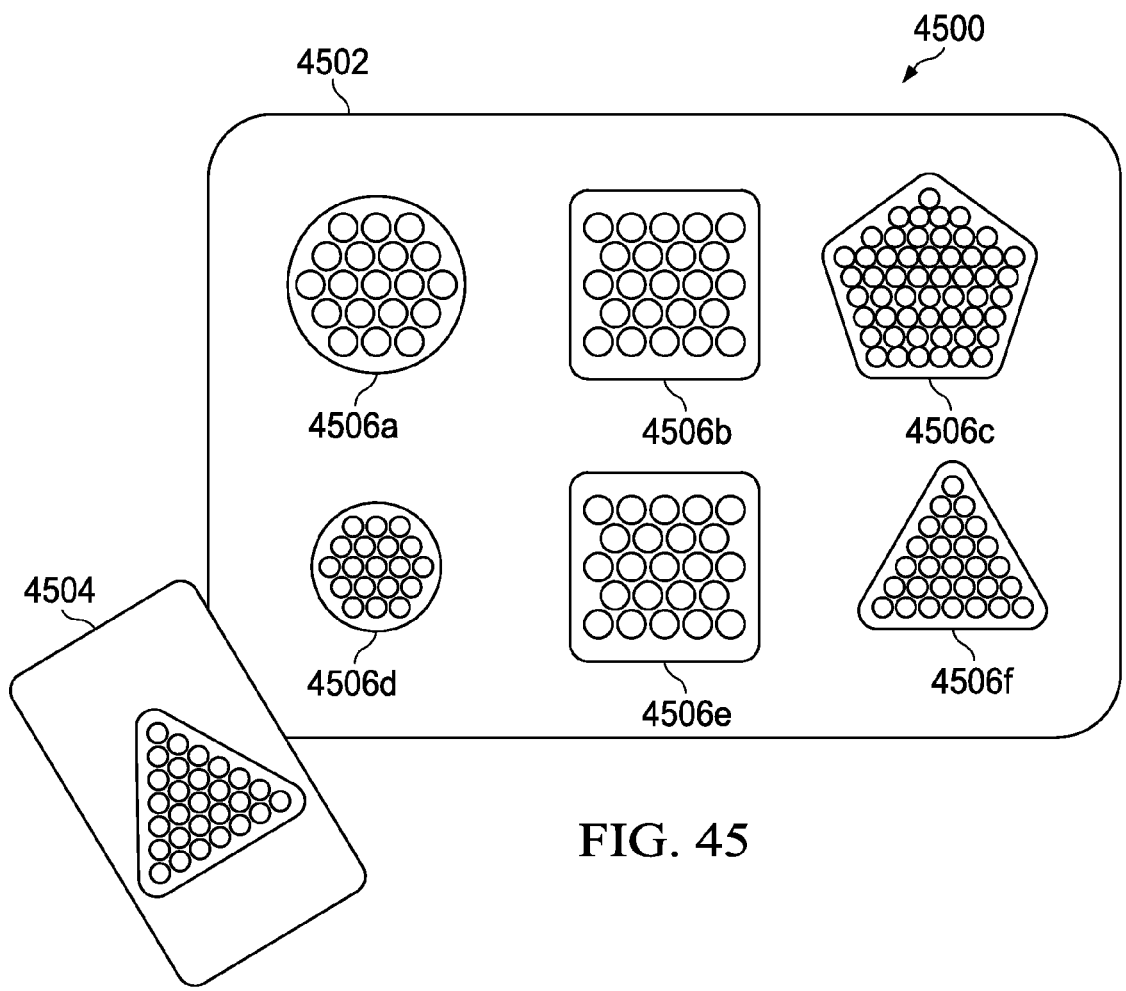
FIG. 45 depicts an example tool or other implement storage mechanism that uses correlated magnetics.

FIG. 45 depicts an example tool or other implement storage mechanism 4500 that uses correlated magnetics. As illustrated, the storage mechanism 4500 may include a storage receptacle 4502 and one or more implements (e.g., tools, utensils, etc.) 4504, such as those that are capable of being used by hand. A storage receptacle 4502 may comprise, by way of example but not limitation, all or at least part of a tool box, a drawer, a wall, a cabinet or other door, and so forth.

For certain example embodiments, a storage receptacle 4502 may include one or more correlated magnets 4506 that are positioned at respective locations of the storage receptacle that correspond to respective implements 4504. As shown, the correlated magnets 4506*a*, 4506*b*, 4506*c*, 4506*d*, 4506*e*, and 4506*f* represent different correlated magnet structures. Such correlated magnet structures may differ by: shape (e.g., the correlated magnet 4506*c* versus the correlated magnet 4506*f*), size (e.g., the correlated magnet 4506*a* versus the correlated magnet 4506*d*), coding (e.g., the correlated magnet 4506*b* versus the correlated magnet 4506*e*), any combination thereof, and so forth, just to name a few examples.

By selectively configuring a given correlated magnet 4506 to match (e.g., correlate) with a complementary correlated magnet on a given implement 4504, but not with those of other implements, the storage receptacle 4502 can effectively "enforce" a predetermined arrangement for where particular implements 4504 are stored with respect to available locations of the storage receptacle 4502. In the example as illustrated in FIG. 45, the correlated magnet of the implement 4504 is configured to correlate and properly attach to the storage receptacle 4502 at one location, which corresponds to the correlated magnet 4506*f*, and at one orientation.

In example implementations, a storage receptacle 4502 may comprise a magnetic tool rack, a tool box (to retard noisy rattling), a truck toolbox, and so forth. Implement-to-storage-location matching may be enforced with complementary correlated magnets. Consequently, tools may hang or otherwise position properly, and such tools may be returned to their proper location.

Figure 46:
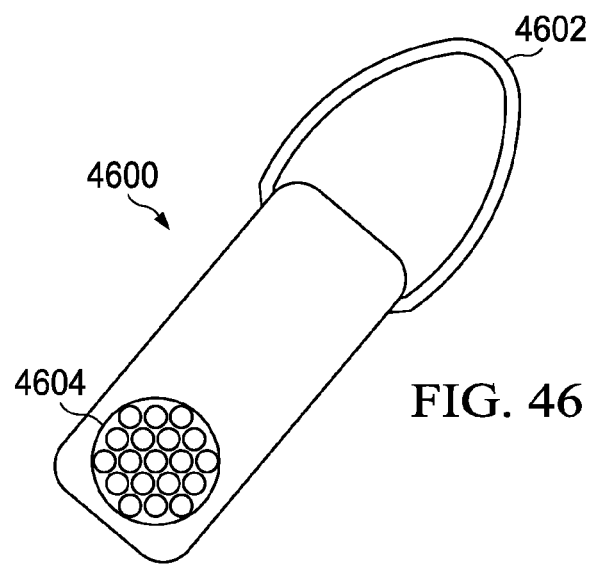
FIG. 46 depicts an example security device that may employ a correlated magnetic release mechanism.

FIG. 46 depicts an example security device 4600 that may employ a correlated magnetic release mechanism. As illustrated, a security device 4600 may include at least one attachment connector 4602 and one or more correlated magnets 4604. For certain example embodiments, the security device 4600 may be attached to an object, such as a piece of inventory, to prevent unauthorized removal of the object. In an example implementation, a security device 4600 may be attached to an article of clothing that is for sale in a store.

In certain example implementations, an attachment connector 4602 may comprise a wire or plastic loop, a needle together with a backing to receive the needle, a wire or plastic look together with an adhesive, combinations thereof, and so forth, just to name a few examples. Generally, an attachment connector 4602 may comprise, for example, any mechanism that enables a security device 4600 to be attached to an object, such as clothing, equipment, a box, and so forth.

A correlated magnet 4604 may be included as part of a security device 4600 and may be located fully or partially internal to or external of a housing of the security device 4600. Hence, although visible in FIG. 46 for the sake of clarity, the correlated magnet 4604 may be located beneath a housing of the security device 4600 and obscured from view. In an example operation, when a matching complementary correlated magnet (not shown) is placed sufficiently proximate to the correlated magnet 4604, the magnetic forces are capable of activating a release mechanism (not explicitly shown) of the security device 4600. This release mechanism may cause attachment connector 4602 to release and thereby enable removal of the security device 4600 from an object to which it is/was attached. For instance, the correlated magnet 4604 may be brought closer to a correlated magnet that is held external to the security device 4600 to thereby release an internal lock (e.g., a spring-loaded lock) and enable the attachment connector 4602 to be disconnected (e.g., one end of a loop may be released). Generally, magnets that do not properly correlate with the correlated magnet 4604 will fail to activate the release mechanism.

In an example retail environment, the security device 4600 may be used as part of an inventory control system. In an example implementation, if the security device 4600 is brought near security monitoring towers at a store's entrance, the monitoring tower's surveillance system may alarm. Alternatively or additionally, the security device 4600 itself may also issue an alarm (e.g., an audible alarm) if it is brought near the security monitoring towers and/or if the attachment connector 4602 is tampered with (e.g., cut). By using a specially-configured correlated magnet 4604, inventory security tags cannot be defeated merely by using a strong conventional magnet.

FIG. 47 depicts example approaches to using correlated magnetics with landscaping equipment. Generally, correlated magnets may be used to secure a first part of a piece of landscaping equipment to a second part of the piece of landscaping equipment. As shown, FIG. 47 depicts a piece of landscaping equipment that comprises a lawnmower 4700 having an engine/cutting portion 4702 and an associated bag 4704.

For certain example embodiments, the lawnmower bag 4704 may be quickly attached and detached from the lawnmower engine (e.g., gasoline, electrical motor, etc. engine) portion 4702. One or more correlated magnets 4706 and 4708 may be included as part of the lawnmower bag 4704 and engine portion 4702, respectively. When initially attached, the correlated magnet pairs 4706 and 4708 may have a relatively low level of attraction, but one that is nevertheless sufficient to hold the lawnmower bag 4704 against the engine portion 4702 (e.g., at least sufficient to overcome gravitational forces pulling an empty lawnmower bag downward). When at least one of the correlated magnets 4706 and 4708 of a given pair is rotated relative to the other one, the magnets may correlate and the level of magnetic attraction may increase so that the lawnmower bag 4704 is securely attached to the engine portion 4702 (e.g., at least sufficient to overcome gravitational forces pulling a full lawnmower bag downward as the lawnmower 4700 is pushed).

As shown, knobs are located at least at one or more of the correlated magnets 4706 that are attached to the lawnmower bag 4704. However, one or more knobs may alternatively and/or additionally be located at any of the correlated magnets 4708 that are attached to the engine portion 4702. Knobs may comprise, for example, any implement that facilitates a manual rotation (e.g., with a hand) of the correlated magnets 4706 and 4708 with respect to each other. Although depicted in particular example locations, correlated magnets 4706 and/or 4708 may alternatively and/or additionally be placed in other locations and/or omitted from certain locations. By way of example only, correlated magnet pairs 4706/4708 may attach on the sides of the engine portion 4702 and/or at the backend of the engine portion 4702. Furthermore, one or more correlated magnet pairs 4706/4708 may be connected along a cross member of the push bar and/or along the extension members of the push bar. Moreover, another fastening type (e.g., hooks, levers, etc.) may be used at one or more locations in conjunction with the correlated magnets at the same and/or at other locations.

In an alternative implementation, a lever (as shown atop the lawnmower bag 4704) may be used to rotate one or more or magnet (two magnets as shown) relative to their matching magnet pair. In another alternative implementation, a lever (not shown) may be included as part of the engine portion 4702 (e.g., at or near where the lawnmower bag 4704 attached). Example levers are shown in FIGS. 47*a* and 47*b* that are adapted for if correlated magnets 4708 were positioned on a backend of the engine portion 4702 facing a person walking behind the mower (which is not shown). When pushed, turned, etc., the lever, which may be attached to at least one bar, may cause one or more of the magnet pairs to rotate simultaneously to expedite removal of the lawnmower bag 4704. In yet another alternative implementation, a cutting blade of a lawnmower may be attached and/or rotated using correlated magnets.

Figure 48A:
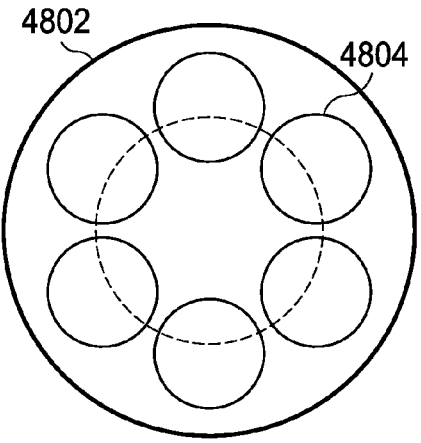
FIGS. 48A-48C depict an example scheme to create a coded magnet that is "enhanced" in terms of rotational cross-correlation.
Figure 48B:
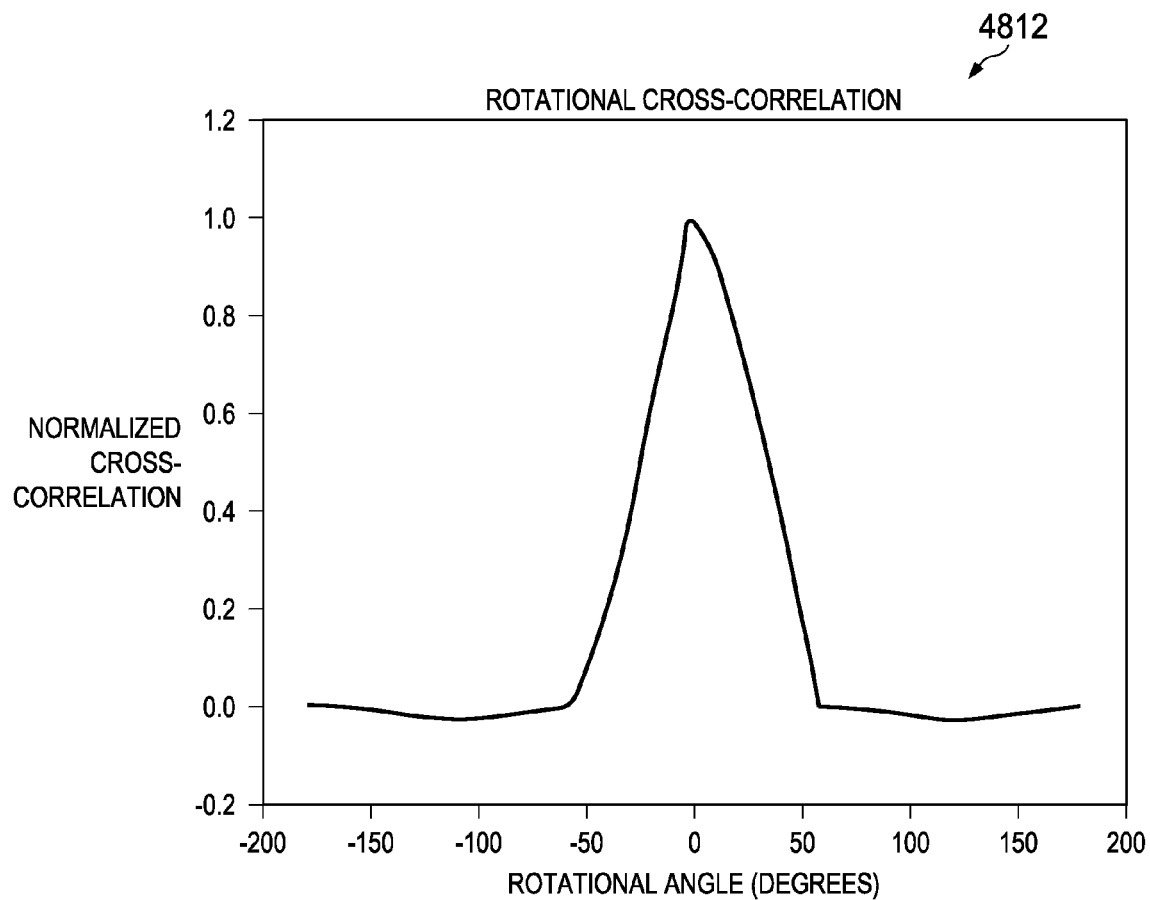
Figure 48C:
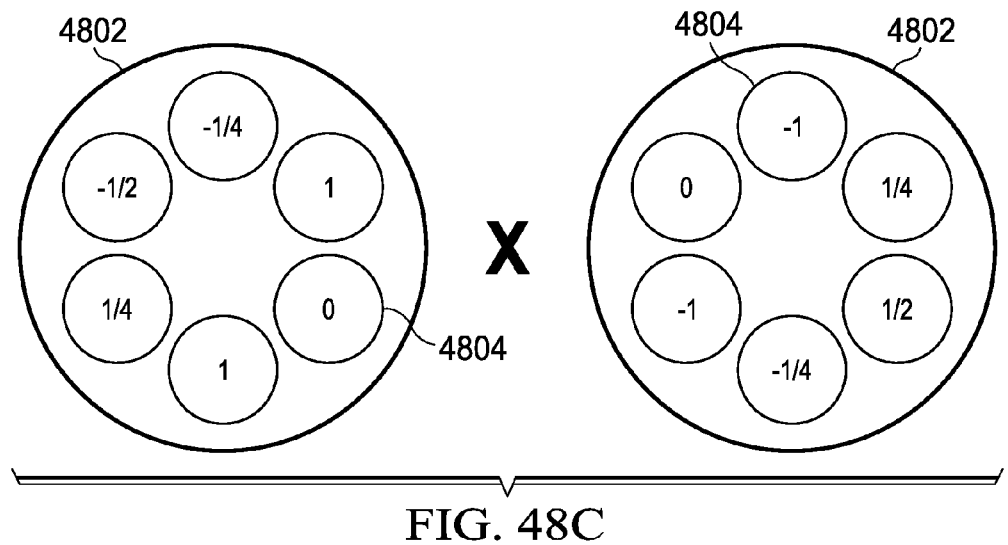

FIGS. 48A-48C depict an example scheme to create a coded magnet that is "enhanced" in terms of rotational cross-correlation. For certain example embodiments, such enhanced coded magnets may exhibit enhanced rotational cross-correlation. FIG. 48A depicts a circular disc 4802 that comprises an example correlated magnet having six circular magnetic sources 4804. In an example implementation, each circular magnetic source 4804 has a radius of R/2 with their centers along a circle of radius R. Here, an example coding for cyclic auto-correlation is: 1, 0, 1, ¼, −½, −¼. A peak/side lobe ratio of 38 may be obtained. Among the six circular magnetic sources 4804, there are seven different magnetic levels (counting both sides of the circular disc 4802 with a discrete magnetic source implementation, for example): −1, ½, −¼, 0, ¼, ½, 1.

Two such circular discs 4802 may exhibit an enhanced rotational cross-correlation. FIG. 48B is a graphical diagram 4812 illustrating an example rotational cross-correlation. A rotational angle (in degrees) extends from −200 to +200 along the abscissa axis. A normalized cross-correlation value extends from −0.2 to 1.2 along the ordinate axis. As shown in graphical diagram 4812, a normalized cross-correlation value of 1 is reached at a rotational angle of zero degrees. The normalized cross-correlation value drops to essentially zero by around the rotational angles of −60 and +60 degrees. This enhanced coding may also be thought of as an example form of zero-side-lobe coding.

FIG. 48C depicts two circular discs 4802, each having six circular magnetic sources 4804. Such circular magnetic sources 4804 may be constructed using individual discrete magnets (e.g., with opposite polarities on opposite sides), printed using a magnetizing printer (e.g., that is applied to opposite sides of the circular discs 4802), and so forth. The upper circular disc 4802 includes six circular magnetic sources 4804 that are coded as follows: 1, 0, 1, ¼, −½, −¼. The lower circular disc 4802 includes six circular magnetic sources 4804 that are coded as follows: −1, 0, −1, −¼, ½, ¼.

Figure 49:
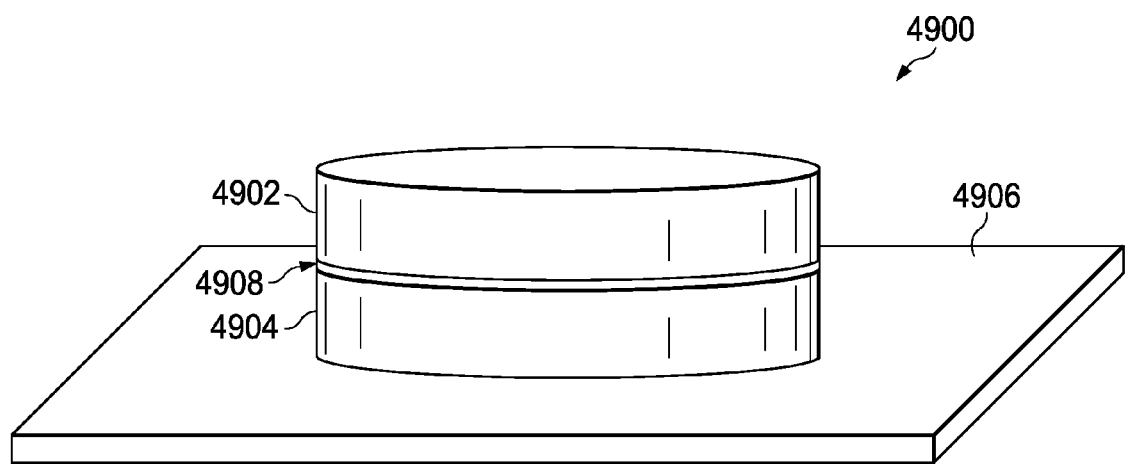
FIG. 49 depicts two coded magnets and a third structure in a context of an example interaction between and among them.

FIG. 49 depicts two coded magnets 4902 and 4904 and a third structure 4906 in a context of an example interaction 4900 between and among the three structures. As illustrated, the example interaction 4900 may include and/or involve a first coded magnet 4902, a second coded magnet 4904, and a third structure 4906. A material 4908 may also be present between the first and second coded magnets 4902 and 4904 to, for example, reduce friction there between. For certain example embodiments, the third structure 4906 may comprise, by way of example but not limitation, a metal, a conventional magnet, any combination thereof, and so forth. The second coded magnet 4904 may be proximate (including in contact with) the third structure 4906. The second coded magnet 4904 may be sufficiently proximate to the third structure 4906 so that, for example, the second coded magnet 4904 can affect (e.g., move) the third structure 4906. The first coded magnet 4902 and the second coded magnet 4904 may be aligned and correlated at times, and they may be unaligned and uncorrelated at other times.

If the first and second coded magnets 4902 and 4904 are fully aligned (e.g., fully correlated), then the magnetic field density may be maximized (or concentrated) around a region where they are in contact (or nearly in contact, such as if the material 4908 is present to reduce friction). On the other hand, if the first and second coded magnets 4902 and 4904 are misaligned (e.g., not fully correlated), then their multiple magnetic sources may substantially cancel each other out. Such cancellation may cause, depending on a coding employed, the magnetic field density to be near zero around where the first and second coded magnets 4902 and 4904 are in contact (or near contact).

A level of attraction between the second coded magnet 4904 and the third structure 4906 may be decreased if the first and second coded magnets 4902 and 4904 are not fully correlated because the cancelation acts as a barrier much like a second piece of metal. (In fact, data comparing one piece of metal versus two can show an increase in attractive strength of around two times under one example set of parameters.) On the contrary, if the first and second coded magnets 4902 and 4904 are fully correlated, then a level of attraction between the second coded magnet 4904 and the third structure 4906 may be increased.

In certain example implementations, such an example interaction 4900 may be utilized so as to operate the first and second coded magnets 4902 and 4904 like a magnetic switch. Generally, if two coded magnets (e.g., the first and second coded magnets 4902 and 4904) are correlated, the resulting magnetic field that is external to the two correlated coded magnets may be increased as well as the resulting magnetic field that is internal to (e.g., located between and/or at a point of contact of) the two correlated coded magnets may be increased. Hence, an amount of attractive force emanating from a second magnet may be adjusted/changed based on whether a first magnet that is paired with the second magnet is correlated or de-correlated with the second magnet. Increasing a correlation between two coded magnets can therefore increase an attractive force emanating external to the two coded magnets.

FIG. 50 depicts an example approach 5000 to securing a lid to a container using coded magnets in which tabs with a travel limiter may be utilized. As illustrated, the example approach 5000 may include a lid 5002 and a container 5004. For certain example embodiments, each of the lid 5002 and the container 5004 may include receptacles 5006 that are adapted to receive coded magnet assemblies 5008. Alternatively, each of the lid 5002 and the container 5004 may have coded magnet assemblies 5008 disposed thereon absent such receptacles 5006.

For example implementations, coded magnet assemblies 5008 may be positioned about the lid 5002 and/or the container 5004 such that one or more coded magnet assemblies 5008 of the lid 5002 are proximate one or more coded magnet assemblies 5008 of the container 5004 when the lid 5002 is placed on the container 5004. Respective pairs of coded magnet assemblies 5008 (e.g., at a given corner of a container 5004) may include complementary coded magnets 5016 to enable each corner to be secured via rotation, for example.

In an example implementation, a coded magnet assembly 5008 may include knob 5010, a cover 5012, a bottom portion 5014, and a coded magnet 5016. The coded magnet 5016 may be positioned about a spindle to enable it to be rotated. Tabs and/or a travel limiter may be included with coded magnet assembly 5008 to limit the turning angle of the knob 5010 (e.g., to between two locations 90 degrees apart, signifying latched and unlatched positions). Cover 5012 may include a hole to expose knob 5010 to manual rotation. Alternatively, a receptacle for a screwdriver or other tool may be provided instead of or in addition to a knob.

In an example implementation, a coded magnet assembly 5008 with a cover 5012 having a hole may be included with the lid 5002, and a coded magnet assembly 5008 with a cover 5012 with no hole may be include with the container 5004. Moreover, the coded magnet 5016 of the coded magnet assemblies 5008 of the container 5004 may be immobile (e.g., not subject to rotation). In another example implementation, a cover 5012 for a coded magnet assembly 5008 of a lid 5002 may be solid (e.g., may not include a hole). In such an implementation, one of the assemblies can be rotated using external magnets that are applied, for example, above a coded magnet assembly 5008 of the lid 5002, beside a coded magnet assembly 5008 of the container 5004, some combination thereof, and so forth. In yet another example implementation, a lid 5002 may be covering an opening other than that for a container. Examples include, but are not limited to, a lid 5002 that comprises a door, or an emergency hatch, and so forth.

Several and various additional example implementations are described below. For example, correlated magnetics technology may be implemented in conjunction with a pool stick (or cue) that uses correlated magnetic structures to attach its multiple parts. For example, the screw and threads of conventional cues are replaced with male and female parts and correlated magnetic structures to attach the two halves of a pool cue. Moreover, the pool cue may further use the quick attachment/detachment capabilities of correlated magnetics to enable multiple cue tips to be used and/or multiple different types of tips based on a current shot, much like a golfer has different clubs. Similarly, a bag of golf clubs may be replaced by a lighter bag having multiple golf club heads and a lesser number of golf club handles that can be attached to any of the multiple golf club heads using correlated magnetic structures. Mechanical latching devices may also be used with the cue sticks or golf clubs, in addition to the correlated magnetic structures, wherein the mechanical latches may be pushed in or slid in one direction or another to unlock the sticks or handles thereby preventing them from becoming accidentally detached.

In accordance with another example implementation, a correlated magnetic pump may be produced either by using a first structure comprising permanent magnets and a second structure comprising an array of electromagnets such as been previously described herein with respect to a magnetic valve and also a magnetic hydraulics system. Alternatively, a multi-level magnetic structure may be employed that is modulated with an external magnetic field in order to act as a pumping mechanism.

In accordance with other example implementations, a correlated magnetic structure may be produced by magnetizing magnetic sources having a first polarity onto a side of a previously magnetized magnet having an opposite polarity. More generally, a magnetizer can be used to re-magnetize a previously magnetized material having one polarity per side or having multiple sources having multiple polarities per side. Under one example arrangement, a checkerboard pattern (e.g., alternating polarity sources) may be magnetized onto an existing magnet such that the remainder of the magnet (e.g., the non re-magnetized portion) acts as a bias. Under another example arrangement, a pattern (or code) other than a checkerboard pattern may be used to magnetize an existing magnet such that the remainder of the magnet (e.g., the non re-magnetized portion) acts as a bias.

In accordance with other example implementations, magnetic gears may be produced using repeating code modulos. For example, a circular ring of ten Barker 3 code modulos (++−) may be placed around the outside edge of a round (e.g., NIB) correlated magnet and a complementary coded magnet (−−+). One skilled in the art will recognize that the gear ratio can be changed by changing the length of the code used and/or the number of code modulos.

In accordance with other example implementations, a physical therapy application for stroke (or other head injury) patients can help retrain them to walk. Correlated magnets on the soles of their shoes can be configured to align with correlated magnets on a treadmill, floor, floormat, stair stepper, and so forth. The correlated magnets may be coded to execute attraction and resistance in a sequence that helps move the patient's feet in a walking motion. If the correlated magnets are electromagnets, they can be controlled electronically by a therapist running a program to adjust stride length, gait, foot separation distance, any combination thereof, and so forth.

In accordance with other example implementations, a home may be outfitted to help patients or the elderly who need help moving about in their home. In addition to outfitting their shoes for a walking motion, correlated magnets can outfit a chair. A chair's feet outfitted with correlated magnets can be propelled along a floor embedded with an array of electromagnets that can be controlled programmatically. A user can then use a remote or hit a button on his/her chair that corresponds to a desired location in the house that he/she wants to go and the chair then transports them there.

Other example implementations may include: Correlated magnets could be used for aligning, closing and sealing a convertible top to the frame of a car.

Correlated magnets could be used in the assembly of parts in manufacturing, such as panels of a car, to facilitate the alignment and installation of the part, and if needed to follow up the assembly of the part with additional attachment means, such as a weld.

A handle with a correlated magnet could attach a cover to a bunt cake pan so as to seal it and allow someone to carry it.

Pegboard and hooks can be replaced by a board having a grid of correlated magnetic structures and modified hooks having correlated magnets that would attach to the magnet structures in the grid.

Model trains could go up walls or be upside down. The same is true for tracks for toy cars.

Correlated magnetic gears can be used for watches and keeping time.

Correlated magnetics can be used with jewelry to allow someone to change out stones, change settings, change styles.

Fire extinguishers, medical kits, and the like could be easily detachable from walls just by turning them if they were attached using correlated magnetic structures.

Correlated magnetics can be used to connect TV cables to TVs.

Correlated magnetics can be used to make easily attachable/detachable water hoses.

Correlated magnetics can be used for electrical connectors to replace conventional plugs and wall outlets, and to replace any kind of electrical connector used for phones, computers, ear buds, etc.

Correlated magnetic structures can be used as a kind of magnetic fuze whereby if an object is struck by another object it can give way to avoid damage. For example, an outboard motor could be configured such that if were to hit a stump while a boat was moving, a magnetic latch in the motor would disengage allowing the motor to swing up such that the motor and the boat aren't damaged.

Correlated magnetic structures can be used for temporary dividers that can be used to divide a road in place of barrels. One half of a magnet pair would be nailed into the asphalt and the other half in a divider. This would enable rapid assembly and disassembly of road divers and allow for dividers to be stackable. Such dividers would be useful for locations where road dividers are temporarily set up, such as for bridge inspections or the like.

An anti-kick blade release mechanism for a saw may activate whereby if a blade bites into an object, e.g., wood, such that it would become locked and would otherwise kick the blade up and/or the object out, the blade would disengage. The saw would automatically turn off upon this occurrence.

Another application of correlated magnets is with flying model aircraft which would allow portions such as wings to be easily attached to enable flying but easily detached for storage and transport.

Described below are some additional example devices in which correlated magnetics technology may be incorporated:

Stackable forks, spoons, knives, plates, and bowls:
  Allows utensils to stack better in drawers
  Less wear and tear when stacked
  Less noise when putting utensils away or getting them out
  Provides spacing so that cleaning is more easily performed by dishwashers Showers and shower storage devices—keeps storage in place and can be removed for easy cleanup of shower. The problem with traditional shower storage is that it's kept in place via suction and/or friction, both of which are unreliable methods of keeping a shower implement in place. Additionally, once you get the implement to "stick", the last thing you want to do is remove that item for cleaning. If shower liner/insert manufacturers and tile manufacturers embed coded magnets into their products, then all sorts of accessories can be made to mount to the side of shower or any bathroom or kitchen wall surface that's constructed of such material. Examples of accessories include soap dishes, shampoo bottle shelves, towel racks, waterproof radios, mirrors, etc.

Construction/farm equipment and accessories—same as above but for heavy equipment and farm implements—in farm implements and heavy machinery, the need exists for cup holders, tool holders, and various other accessories that could be held if the various pieces of metal on this machinery were programmed to accept correlated-magnetic-based accessories.

Embedded into little league baseball home plates throughout the country to support the installation of tees for t-ball. In today's t-ball world, coaches must supply their own tee because putting a hole in the middle of the traditional home plate is unsightly and potentially unsafe. By fitting the traditional home plate with a Correlated Magnetic (CM) technology and a simple drawn circle, the t-ball tee can be attached to the same home plate that coach- and player-pitch little league can use. The magnetic force will be strong enough to support the ball, but will break away (by design) so that they kids can get used to a "real" home plate (rather than dodging the tee when they approach home from third base. Additionally, the tee can easily (and more cheaply) be replaced since it is the piece that receives the most damage from the swings of inexperienced players.

Farm equipment power take off (PTO) quick connect. Includes native operation as well as adapters for existing equipment.

Screws with correlated magnetic heads that are matched to screwdriver bits so that the bit can be "dipped" into a box of these screws for hands free placement and alignment of screw to screwdriver. Same as above with nails/hammers and other fasteners/tools.

Car roof racks (and other external automotive accessories).

License plates, including vanity plates

Expandable dumbbell set

Built-in coded magnets in standard kitchen appliances to allow a whole host of accessories to be developed—similar to the car rack concept, towel racks and other accessories could be mounted.

Adapter hardware for standard fastener sizes—enables coded magnet products to be mounted where traditional objects would normally be screwed or bolted.

Street and road signs that "break away"—For safety purposes, the majority of highway road signs are designed to break off or shear when hit with extreme force (such as a motor vehicle accident. These are typically installed by connecting a piece of the pole that's been buried in concrete with the top section of a pole (with sign) using 4 to 8 small bolts. These bolts (and the associated labor to install them) can be replaced by CM technology.

Patient levitation beds based on magnetic repulsion to reduce/eliminate bedsores during hospital stays. Coded magnets would be built into a patient carrier which would then be supported and held in place by corresponding magnets on the bed.

Patient gurney which uses correlated magnets to lock it into place inside the ambulance. Replaces conventional locks which are subject to spring wear, dirt, corrosion, etc.

Patient restraining device using correlated magnets. Could use keyed magnets on patient clothing and corresponding magnets on a chair, etc.

Engine or motor mounts which use multi-level contactless attachment devices to reduce or eliminate vibration.

Easily removable seat pads.

Boot/shoe fasteners to eliminate strings or Velcro.

Self-aligning hitch for trailers.

Elevator door lock to replace conventional mechanical locks.

Keyed magnet spare tire mount.

Interchangeable shoe soles (sports shoes, personal wear, etc.)

Light bulb bases to replace screw mounts.

Oven rotisserie using slow-motor technology.

Kitchen microwave rotating platform using slow-motor technology.

No-contact clutch plate, eliminating wearable, friction plates.

Longer-lasting exercise bike using variable opposing magnets (eliminating friction-based components).

Purse clasp.

Keyed gate latch.

Using linear magnets to stop runaway elevators or other mechanical devices.

After-market coaxial cable, with end caps that screw on to the tv and wall plate and stay, and a cable that magnetically attaches to those end caps.

Industrial gas cylinder caps that are magnetic instead of the current threaded caps that are exceedingly difficult to use. Magnetic caps would be coded such that all O2 bottle caps work on all O2 bottles, all CO2 caps work on CO2 bottles, etc.

Applications for example biomedical implementations may include, but are not limited to:

- Use of contactless attachment capability for the interface between mechanical and biological elements and for the interface between two biological elements. The reason is that if there is too much pressure placed on biological tissue like skin it impedes the capillaries feeding the tissue and will cause it to die within an hour. This phenomenon, ischemic pressure necrosis, makes interfacing mechanical and biological elements—and often two biological elements that you don't want to permanently join via stitches or other methods, very difficult. The contactless attachment might be a powerful tool to address this problem. Potential applications identified for mechanical to biological attachment included attaching prosthetics where one of the magnets is implanted under the skin, attaching external miniature pumps, and as ways to hold dental implants, something to avoid grinding in TMJ, and as a way to hold dentures in place and aligned. For biological to biological attachment, the example implementations include magnets implanted in the soft palate and the bone above for sleep apnea, and use to address urinary incontinence. Correlated magnets may be the basis of a valve at the top of the stomach that is able to be overcome with swallowing to address acid reflux.
- Magnetically-controlled transmoral necrosis for creating gastrojejunostomy for people with morbid obesity. An implementation may include that you could swallow one magnet and wait until it gets to the right part of the intestine and then you would swallow another. Once the second got into the stomach, it would align and connect to the first causing necrosis of all the tissue in between and creating a bypass between the stomach and the intestine. It would be similar to the surgery people get today but wouldn't require surgery.
- Implanting a CM with a contactless attachment in someone's sinuses who have chronic sinus issues. You could then hold another CM up to your cheek to get the sinus to distend and help fluid inside to flow.
- Use CMs as transducers for hearing aids.
- CM-based rehab equipment.
- CMs that could start out magnetic but lose that ability over time and the opposite, where they start out nonmagnetic but become magnetic over time. One could swallow magnets to do a job and at some point they would release and exit the body. Or, they could be in the body until they got to a certain place, at which they would attach. Could add a battery and small electromagnet bias magnet to a CM to be able to control it. Could put a dissolving material around the magnets that might degrade over time so that it let the magnet do something different once the material was gone.
- prosthetic attachment—snap on, turn to remove
- joint replacement (knee, spinal discs, etc)—with contactless attachment so no wear
- joint positioning (spinal discs, etc)—use alignment to make sure stay in place
- breakaway pad—use breakaway spring capability to eliminate hotspots and thus bedsores
- gene sorting—more advanced gene sorting than possible with conventional magnets
- Rehab equipment—magnet controlled forces for rehab equipment
- placement of feeding tube—guide a nasal feeding tube from outside body through stomach and into intestine
- drug targeting—tag drugs (or stem cells, etc) with magnetic materials and direct them to a specific place in the body
- Flow control devices—precision dispensing using controlled valve
- Control contamination—gears, separators, etc. that don't touch to avoid cross contamination
- Seal-less valves
- Pumps (heart, etc) having new attributes Additional and/or alternative implementations with respect to those examples described above may also be implemented.

Because force curves are now programmable, designers can tailor the magnetic behavior to match application requirements and to support new magnet applications. Magnets may now include combinations of attract and repel forces that enable entirely new application areas. Programming magnets and their force curves provides a powerful new capability for product innovation and increased efficiencies across various industries. Generally, for certain example embodiments, a plurality of regions having different force curves can be configured to work together to produce a tailored composite force curve. The composite force curve can, for example, have a flat portion that represents a constant force over some range of separation distance such that the devices acted similar to a very long spring. Moreover, as previously described, maxels can be printed onto conventional magnets thereby putting surface fields onto them. By putting a thin correlated magnetic layer on top of an already magnetized substrate the bulk field is projected into the far field and the correlated magnetic surface effects modify the force curve in the near field.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims. It should also be noted that the reference to the "present invention" or "invention" used herein relates to example embodiments and not necessarily to every embodiment that is encompassed by the appended claims.

The invention claimed is:

1. A method comprising:
    forming a structure that includes multiple first magnetic sources having at least two polarities and disposed on a first side of the structure, the first side of the structure being substantially flat, the multiple first magnetic sources including multiple magnetic elements magnetically printed into a piece of magnetizable material by positioning a hole of a magnetizing print head adjacent to the piece of magnetizable material at each location where the multiple magnetic elements are to be magnetically printed and applying a current to the magnetizing print head that generates a magnetizing field having a high magnetic flux density in and/or near said hole of the magnetizing print head and a low magnetic flux density elsewhere, the multiple first magnetic sources including at least one magnetic source having a first polarity and at least one magnetic source having a second polarity, the multiple first magnetic sources producing one or more first magnetic fields at the first side;
    providing at least one conductive coil that is capable of interacting at least with the one or more first magnetic fields; and constructing an apparatus that enables the structure and the at least one conductive coil to move relative to each other such that the at least one conductive coil is able to interact at least with the one or more first magnetic fields based at least partly on a relative movement between or among the at least one conductive coil and the structure.

2. The method of claim 1, wherein said forming comprises:
printing the multiple magnetic elements into the first side of the structure to create the multiple first magnetic sources having the at least two polarities using at least one inductance.

3. The method of claim 1, further comprising:
positioning the apparatus so as to enable a force to be applied to at least one of (i) the at least one conductive coil or (ii) the structure such that the relative movement is to occur responsive to the force; and
collecting electrical energy via electrical current that is generated in the at least one conductive coil responsive to the relative movement between or among the at least one conductive coil and the structure.

4. The method of claim 1, wherein said constructing comprises:
constructing the apparatus to establish an axial air gap between at least (i) the at least one conductive coil and (ii) the multiple first magnetic sources disposed on the first side of the structure.

5. The method of claim 1, wherein said constructing comprises:
constructing the apparatus such that the at least one conductive coil is oriented substantially perpendicular to the first side that is substantially flat.

6. The method of claim 1, wherein said constructing comprises:
constructing the apparatus such that the at least one conductive coil is oriented substantially parallel to an axis of rotation of the structure.

7. The method of claim 1, wherein said forming comprises:
forming the structure to include the first side and a second side with the first side opposite the second side, the structure including multiple second magnetic sources having the at least two polarities and disposed on the second side of the structure.

8. The method of claim 7, wherein said forming further comprises:
printing multiple first magnetic elements into the first side of the structure to create the multiple first magnetic sources having the at least two polarities; and
printing multiple second magnetic elements into the second side of the structure to create the multiple second magnetic sources.

9. The method of claim 7, wherein said forming further comprises:
forming the structure to include a disc shape, wherein the first side of the structure includes a first substantially flat side of the disc shape and the second side of the structure includes a second substantially flat side of the disc shape.

10. The method of claim 7, wherein the multiple second magnetic sources produce one or more second magnetic fields at the second side of the structure, and wherein the at least one conductive coil includes at least one first conductive coil and at least one second conductive coil; and wherein:
said providing includes providing the at least one first conductive coil and the at least one second conductive coil; and
said constructing includes constructing the apparatus such that the at least one first conductive coil is to interact with the one or more first magnetic fields at the first side of the structure and such that the at least one second conductive coil is to interact with the one or more second magnetic fields at the second side of the structure.

11. The method of claim 7, wherein said forming further comprises:
forming the structure including the multiple first magnetic sources and the multiple second magnetic sources, respective ones of the multiple first magnetic sources corresponding to respective ones of the multiple second magnetic sources.

12. The method of claim 11, wherein said forming further comprises:
forming first respective corresponding magnetic sources of the multiple first magnetic sources at first respective positions of the first side of the structure and second respective corresponding magnetic sources of the multiple second magnetic sources at second respective positions of the second side of the structure, the first respective positions of the first side of the structure located respectively opposite the second respective positions of the second side of the structure.

13. The method of claim 11, wherein said forming further comprises:
forming first respective corresponding magnetic sources of the multiple first magnetic sources with first respective polarities at the first side of the structure and second respective corresponding magnetic sources of the multiple second magnetic sources with second respective polarities at the second side of the structure, the first respective polarities having respectively opposite polarities to the second respective polarities.

14. The method of claim 1, wherein said constructing comprises:
locating an end of the at least one conductive coil in proximity to a surface of the first side of the structure such that the at least one conductive coil is positioned at least partially within the one or more first magnetic fields.

15. The method of claim 1, wherein said forming comprises:
printing the multiple magnetic elements into the piece of magnetizable material by moving at least one of (i) the magnetizing print head or (ii) the piece of magnetizable material.

* * * * *